(12) United States Patent
Tour et al.

(10) Patent No.: US 10,107,178 B2
(45) Date of Patent: Oct. 23, 2018

(54) SPOOL SHUTTLE CROSSOVER VALVE AND COMBUSTION CHAMBER IN SPLIT-CYCLE ENGINE

(71) Applicant: Tour Engine, Inc., San Diego, CA (US)

(72) Inventors: Benjamin Hugo Tour, San Diego, CA (US); Oded Tour, San Diego, CA (US); Gilad Tour, San Diego, CA (US); Ehud Sivan, Lehavim (IL); Michael H. Wahl, Bonita, CA (US)

(73) Assignee: Tour Engine, Inc., San Diego, CA (US)

( * ) Notice: Subject to any disclaimer, the term of this patent is extended or adjusted under 35 U.S.C. 154(b) by 0 days.

(21) Appl. No.: 15/256,343

(22) Filed: Sep. 2, 2016

(65) Prior Publication Data

US 2017/0058759 A1 Mar. 2, 2017

Related U.S. Application Data

(62) Division of application No. 14/435,138, filed as application No. PCT/US2014/047076 on Jul. 17, 2014, now Pat. No. 9,435,233.

(Continued)

(51) Int. Cl.
*F02B 33/22* (2006.01)
*F02P 13/00* (2006.01)
(Continued)

(52) U.S. Cl.
CPC ............. *F02B 33/22* (2013.01); *F01L 1/46* (2013.01); *F01L 7/02* (2013.01); *F01L 7/16* (2013.01);
(Continued)

(58) Field of Classification Search
CPC ......... F02B 33/22; F02B 41/06; F02B 33/44; F02B 59/00; F02B 69/00
See application file for complete search history.

(56) References Cited

U.S. PATENT DOCUMENTS

| | | | |
|---|---|---|---|
| 1,372,216 A | 3/1921 | Casaday | |
| 1,374,140 A | 4/1921 | Dock | |

(Continued)

FOREIGN PATENT DOCUMENTS

| | | |
|---|---|---|
| CN | 102777253 | 11/2012 |
| FR | 1 084 655 | 1/1955 |

(Continued)

OTHER PUBLICATIONS

Supplementary European Search Report for EP 14825949.2, dated Feb. 17, 2017, 5 pages.

(Continued)

*Primary Examiner* — Long T Tran
(74) *Attorney, Agent, or Firm* — Morrison & Foerster LLP

(57) ABSTRACT

A split-cycle engine includes: a first cylinder housing a first piston, wherein the first piston performs an intake stroke and a compression stroke, but does not perform an exhaust stroke; a second cylinder housing a second piston, wherein the second piston performs an expansion stroke and an exhaust stroke, but does not perform an intake stroke; and a valve chamber housing a valve, the valve comprising an internal chamber that selectively fluidly couples to the first and second cylinders, wherein the valve and internal chamber move within the valve chamber and relative to the first and second cylinders.

36 Claims, 36 Drawing Sheets

Related U.S. Application Data

(60) Provisional application No. 61/847,551, filed on Jul. 17, 2013.

(51) Int. Cl.

| | | |
|---|---|---|
| *F01L 1/46* | (2006.01) | |
| *F01L 7/02* | (2006.01) | |
| *F01L 7/16* | (2006.01) | |
| *F01P 1/02* | (2006.01) | |
| *F01P 3/02* | (2006.01) | |
| *F01P 7/16* | (2006.01) | |
| *F02B 5/02* | (2006.01) | |
| *F02B 9/04* | (2006.01) | |
| *F01L 1/053* | (2006.01) | |
| *F02B 41/06* | (2006.01) | |

(52) U.S. Cl.
CPC .................. *F01P 1/02* (2013.01); *F01P 3/02* (2013.01); *F01P 7/16* (2013.01); *F02B 5/02* (2013.01); *F02B 9/04* (2013.01); *F02P 13/00* (2013.01); *F01L 2001/0535* (2013.01); *F01L 2101/00* (2013.01); *F01L 2101/02* (2013.01); *F01P 2001/023* (2013.01); *F01P 2003/022* (2013.01); *F02B 41/06* (2013.01); *Y02T 10/16* (2013.01)

(56) References Cited

U.S. PATENT DOCUMENTS

| | | | |
|---|---|---|---|
| 2,302,442 A | 11/1942 | Hickey | |
| 2,522,649 A | 10/1945 | Tenney | |
| 3,522,797 A | 8/1970 | Stinebaugh | |
| 3,880,126 A | 4/1975 | Thurston et al. | |
| 4,202,300 A | 5/1980 | Skay | |
| 4,663,938 A | 5/1987 | Colgate | |
| 5,040,498 A | 8/1991 | Scherer | |
| 5,546,897 A | 8/1996 | Brackett | |
| 5,551,382 A * | 9/1996 | Bauer | F01P 1/02 123/193.5 |
| 6,880,501 B2 | 4/2005 | Suh et al. | |
| 7,050,900 B2 * | 5/2006 | Miller | F01L 1/46 701/103 |
| 7,177,751 B2 * | 2/2007 | Froloff | F01L 1/46 123/480 |
| 7,263,963 B2 | 9/2007 | Price | |
| 7,806,101 B2 * | 10/2010 | Hu | F02B 41/06 123/316 |
| 8,006,656 B2 | 8/2011 | Branyon | |
| 8,082,892 B2 | 12/2011 | Zhao | |
| 8,210,138 B2 * | 7/2012 | Scuderi | F16K 1/42 123/68 |
| 8,210,147 B2 | 7/2012 | Cotton | |
| 8,459,227 B2 | 6/2013 | Cotton | |
| 8,590,497 B2 * | 11/2013 | Meldolesi | F02B 33/22 123/431 |
| 8,714,121 B2 * | 5/2014 | Phillips | F02B 33/22 123/542 |
| 8,904,981 B2 | 12/2014 | Fiveland | |
| 2003/0015171 A1 | 1/2003 | Scuderi | |
| 2009/0056670 A1 | 3/2009 | Zhao et al. | |
| 2009/0150060 A1 * | 6/2009 | Branyon | F02B 33/22 701/115 |
| 2009/0199829 A1 | 8/2009 | Branyon et al. | |
| 2009/0250046 A1 * | 10/2009 | Scuderi | F02B 33/22 123/70 R |
| 2010/0012071 A1 | 1/2010 | Cotton | |
| 2010/0186689 A1 | 7/2010 | Tour et al. | |
| 2011/0149034 A1 | 6/2011 | Tsukagoshi | |
| 2012/0080017 A1 * | 4/2012 | Phillips | F02B 33/22 123/70 R |
| 2012/0192841 A1 * | 8/2012 | Meldolesi | F01L 1/08 123/70 R |
| 2012/0255296 A1 * | 10/2012 | Phillips | F02B 21/02 60/526 |
| 2012/0298086 A1 * | 11/2012 | Scuderi | F02B 33/22 123/70 R |

FOREIGN PATENT DOCUMENTS

| | | |
|---|---|---|
| FR | 2 963 644 | 2/2012 |
| GB | 135 571 | 11/1918 |
| GB | 2 469 939 | 11/2010 |

OTHER PUBLICATIONS

International Preliminary Report on Patentability for PCT/US14/47076, dated Jan. 19, 2016, 4 pages.
International Search Report and Written Opinion for PCT/US14/47076, dated Nov. 25, 2014, 5 pages.
Supplemental European Search Report for EP 15736989.3, dated Sep. 13, 2017, 6 pages.
First Office Action (translation) for CN 201480050777.7, dated Sep. 27, 2017, 4 pages.

* cited by examiner

SPOOL SHUTTLE CROSSOVER VALVE AND COMBUSTION CHAMBER IN SPLIT-CYCLE ENGINE

CROSS-REFERENCE TO RELATED APPLICATIONS

This application is a divisional of U.S. patent application Ser. No. 14/435,138 filed Apr. 10, 2015, now U.S. Pat. No. 9,435,233, which is a U.S. national stage application of International Application No. PCT/US2014/047076, filed Jul. 17, 2014, which claims the benefit of U.S. Provisional Application No. 61/847,551, filed Jul. 17, 2013, the contents of which are incorporated herein by reference in their entireties.

BACKGROUND OF THE INVENTION

Field of the Invention

This disclosure relates generally to split-cycle internal combustion engines also known as split-cycle engines and, more specifically, to crossover valves.

Description of the Related Art

Conventional internal combustion engines include one or more cylinders. Each cylinder includes a single piston that performs four strokes, commonly referred to as the intake, compression, combustion/power/expansion, and exhaust strokes. Together, these four strokes form a complete cycle of a conventional internal combustion engine. However, each part of the cycle is affected differently by the heat rejected from the working fluid into the piston and cylinder walls: during intake and compression a high rate of heat rejection improves efficiency whereas during combustion/expansion, little or no heat rejection leads to best efficiency. This conflicting requirement cannot be satisfied by a single cylinder since the piston and cylinder wall temperature cannot readily change from cold to hot and back to cold within each cycle. A single cylinder of a conventional internal combustion engine cannot be optimized both as a compressor (requires cold environment for optimal efficiency performance) and a combustor/expander (requires hot environment and optimal expansion of the working fluid for optimal efficiency performance) at the same time and space.

Conventional internal combustion engines have low fuel efficiency—more than one half of the fuel energy is lost through the engine structure and exhaust outlet, without adding any useful mechanical work. A major cause of thermal waste in conventional internal combustion engines is the essential cooling system (e.g., radiator), which alone dissipates heat at a greater rate and quantity than the total heat actually transformed into useful work. Furthermore, conventional internal combustion engines are able to increase efficiencies only marginally by employing low heat rejection methods in the cylinders, pistons and combustion chambers and by waste-heat recovery methodologies that add substantial complexity and cost.

Further inefficiency results from high-temperature in the cylinder during the intake and compression strokes. This high temperature reduces engine volumetric efficiency and makes the piston work harder and, hence, reduces efficiency during these strokes.

Theoretically, a larger expansion ratio than compression ratio will greatly increase engine efficiency in an internal combustion engine. In conventional internal combustion engines, the maximum expansion ratio is typically the same as the maximum compression ratio. Moreover, conventional means may only allow for a decrease in compression ratio via valve timing (Miller and Atkinson cycles, for example) and may be less efficient than the increase in efficiency, which is possible if all four strokes would have not been executed in a single cylinder.

Another shortcoming of conventional internal combustion engines is an incomplete chemical combustion process, which reduces efficiency and causes harmful exhaust emissions.

To address these problems, others have previously disclosed dual-piston combustion engine configurations. For example, U.S. Pat. No. 1,372,216 to Casaday discloses a dual piston combustion engine in which cylinders and pistons are arranged in respective pairs. The piston of the firing cylinder moves in advance of the piston of the compression cylinder. U.S. Pat. No. 3,880,126 to Thurston et al. discloses a two-stroke split-cycle internal combustion engine. The piston of the induction cylinder moves somewhat less than one-half stroke in advance of the piston of the power cylinder. The induction cylinder compresses a charge, and transfers the charge to the power cylinder where it is mixed with a residual charge of burned products from the previous cycle, and further compressed before igniting. U.S. Pat. Application No. 2003/0015171 A1 to Scuderi discloses a four-stroke cycle internal combustion engine. A power piston within a first cylinder (power cylinder) is connected to a crankshaft and performs power and exhaust strokes of the four-stroke cycle. A compression piston within a second cylinder (compression cylinder) is also connected to the crankshaft and performs the intake and compression strokes of a four-stroke cycle during the same rotation of the crankshaft. The power piston of the first cylinder moves in advance of the compression piston of the second cylinder. U.S. Pat. No. 6,880,501 to Suh et al. discloses an internal combustion engine that has a pair of cylinders, each cylinder containing a piston connected to a crankshaft. One cylinder is adapted for intake and compression strokes. The other cylinder is adapted for power and exhaust strokes. U.S. Pat. No. 5,546,897 to Brackett discloses a multi-cylinder reciprocating piston internal combustion engine that can perform a two, four, or diesel engine power cycle.

SUMMARY OF THE INVENTION

The references described above, however, fail to disclose how to effectively govern the transfer of the working fluid in a timely manner and without pressure loss from the compression cylinder to the power cylinder, using a valve system that is durable with high level of sealing. In addition, the separate cylinders disclosed in these references are all connected by a transfer valve or intermediate passageway (connecting tube) of some sort that yields a substantial volume of "dead space" between cylinders reducing the effective compression ratio of the engine below that of a conventional engine.

In view of the foregoing disadvantages inherent in the known types of internal combustion engine now present in the prior art, embodiments described herein include a Spool Shuttle Crossover Valve and Combustion Chamber (SS-CVCC) internal combustion engine utilizing temperature differentiated cylinders that have the potential of converting fuel energy into mechanical work more efficiently than conventional internal combustion engines. Some exemplary embodiments utilize a novel SSCVCC for facilitating the efficient and reliable transfer of working fluid from a compression chamber to a combustion chamber. Although spool shuttle crossover valves are used, in some instances, to demonstrate some benefits of the embodiments, it should be realized that the claims may not be limited to a spool shuttle valve and may include other valves.

In an exemplary embodiment, an internal combustion engine with SSCVCC includes a first cylinder coupled to a second cylinder, a first piston positioned within the first cylinder and configured to perform intake and compression strokes but not exhaust strokes, and a second piston positioned within the second cylinder and configured to perform power and exhaust strokes but not intake strokes.

Alternatively, the first and second cylinders can be considered as two separate chambers, that could be directly or indirectly coupled by the reciprocating motion of a SSCVCC, wherein the first piston resides in the first chamber and the second piston resides in the second chamber and the combustion chamber within the spool shuttle is a third chamber.

In a further exemplary embodiment, a split-cycle engine further includes an intake valve coupled to the first cylinder, an exhaust valve coupled to the second cylinder and a SSCVCC that couples directly, or indirectly (via a separated combustion chamber, which is part of the spool) an internal chamber of the first cylinder to an internal chamber of the second cylinder.

In a further exemplary embodiment, the engine includes two piston connecting rods, a compression crankshaft, a power crankshaft and two crankshaft connecting rods. The connecting rods connect respective pistons to their respective crankshafts. The compression crankshaft converts rotational motion into reciprocating motion of the first piston. The power crankshaft converts second piston reciprocating motion into engine rotational output motion. The compression crankshaft relative angle, with regard to the power crankshaft relative angle, may differ from each other by implementing a phase angle delay (phase-lag) such that the piston of the power cylinder moves in advance of the piston of the compression cylinder. In some exemplary embodiments the phase-lag could be as such that the piston of the compression cylinder moves in advance of the piston of the power cylinder. In yet another embodiment, the piston of the compression cylinder and the piston of the power cylinder move in-phase (no phase-lag). The crankshaft connecting gearwheels mechanism transfers the power crankshaft rotation into compression crankshaft rotation. The two pistons and two cylinders could be designed in line with each other (parallel) or opposed to each other. In one such embodiment with an in line configuration of the two pistons and two cylinders, an insulating layer of low heat conducting material could be installed, for example, to separate the relatively cold compression cylinder from the relatively hot power cylinder, as is commonly known in the art.

In a further exemplary embodiment, a split-cycle engine further includes an intake port coupled to the first cylinder, an exhaust port coupled to the second cylinder. The intake port and exhaust port open and close by the reciprocating motion of the SSCVCC. The SSCVCC couples directly an internal chamber of the first cylinder to an internal chamber of the second cylinder, or indirectly via a separated combustion chamber which is part of the spool shuttle.

In some exemplary embodiments, the SSCVCC may be constructed of several components: a spool cylinder, a spool shuttle, a combustion chamber, which is located within the spool shuttle, a combustion chamber port, a spool ring on the compression side, a spool ring on the expansion side, a stationary (retracting) ring mounted in the spool cylinder, a spool connecting rod and a spool crankshaft, an intake port and an exhaust port. The combustion chamber may be coupled to or decoupled from a compression chamber and an expansion chamber depending on the relative position of the spool as part of the spool reciprocating motion.

In exemplary embodiments, a split-cycle engine includes: a first cylinder housing a first piston, wherein the first piston performs an intake stroke and a compression stroke, but does not perform an exhaust stroke; a second cylinder housing a second piston, wherein the second piston performs an expansion stroke and an exhaust stroke, but does not perform an intake stroke; and a valve chamber housing a valve, the valve comprising an internal chamber that selectively fluidly couples to the first and second cylinders, wherein the valve and internal chamber move within the valve chamber and relative to the first and second cylinders.

In some exemplary embodiments, the internal chamber fluidly couples with the first cylinder and fluidly couples with the second cylinder during movement of the valve.

In some exemplary embodiments, during movement of the valve, the internal chamber fluidly couples to the first and second cylinders simultaneously, and the valve and internal chamber have a maximum velocity and a minimum acceleration within 15 crankshaft degrees of when the internal chamber is fluidly coupled to the first and second cylinders simultaneously. In some further embodiments, the valve and internal chamber have a maximum velocity and a minimum acceleration when the internal chamber is fluidly coupled to the first and second cylinders simultaneously.

In some exemplary embodiments, the valve fluidly couples with neither the first nor the second cylinders concurrently, and the valve and internal chamber have a maximum velocity and a minimum acceleration within 15 crankshaft degrees of when the internal chamber fluidly couples with neither the first nor the second cylinder. In some further exemplary embodiment, the valve and internal chamber have a maximum velocity and a minimum acceleration when the internal chamber fluidly couples with neither the first nor the second cylinder.

In some exemplary embodiments, the first piston reaches its top-dead center when the internal chamber is fluidly coupled to the first cylinder.

In some exemplary embodiments, the first cylinder has an intake port to receive an air/fuel mixture. In some further exemplary embodiments, the intake port is closed by a surface of the valve. In some exemplary embodiments, the intake port is closed by a poppet valve.

In some exemplary embodiments, a spark plug initiates combustion. In some further exemplary embodiments, the spark plug is positioned on the valve and configured to create a spark within the internal chamber. In some further exemplary embodiments, the spark plug is positioned in the valve chamber and the valve includes a combustion port that aligns with the spark plug to initiate combustion within the internal chamber.

In some exemplary embodiments, the engine is configured to initiate combustion by compressing the fluid.

In some exemplary embodiments, the first piston reaches its top-dead center before the second piston reaches its top-dead center.

In some exemplary embodiments, the second piston reaches its top-dead center before the first piston reaches its top-dead center.

In some exemplary embodiments, the first and second piston reach their respective top-dead centers concurrently.

In some exemplary embodiments, the engine includes sealing rings between the valve and the valve chamber. In some further exemplary embodiments, the sealing rings do not move relative to the valve chamber. In some further exemplary embodiments, the sealing rings move relative to the valve chamber. In some exemplary embodiments, the sealing rings include a first sealing ring that does not move relative to the valve chamber and a second sealing ring that moves relative to the valve chamber.

In some exemplary embodiments, the valve has a port that fluidly couples the internal chamber to the first and second cylinder simultaneously.

In some exemplary embodiments, the valve has a first port that fluidly couples the internal chamber to the first cylinder and a second port that fluidly couples the internal chamber to the second cylinder.

In some exemplary embodiments, an internal volume of the first cylinder when the first piston is at its bottom dead center is greater than an internal volume of the second cylinder when the second piston is at its bottom dead center.

In some exemplary embodiments, an internal volume of the first cylinder when the first piston is at its bottom dead center is less than an internal volume of the second cylinder when the second piston is at its bottom dead center.

In some exemplary embodiments, the engine includes: a first crankshaft coupled to the first piston; a second crankshaft coupled to the second piston; a crankshaft connecting mechanism coupled to the first and second crankshafts and configured to translate motion between the first and second crankshafts, the crankshaft connecting mechanism comprising a crankshaft connecting rod having first and second ends coupled to the first and second crankshafts, respectively.

In some exemplary embodiments, the engine includes a crankshaft coupled to the first and second pistons.

In some exemplary embodiments, the engine includes a first crankshaft coupled to the first piston; a first gearwheel coupled to the first crankshaft; a second crankshaft coupled to the second piston; a second gearwheel coupled to the second crankshaft; a third gearwheel coupled to the first and second gearwheels and configured to translate motion between the first and second gearwheels.

In some exemplary embodiments, the internal chamber, a compression chamber, and an expansion chamber are sized to minimize dead space.

In some exemplary embodiments, an internal volume of the first cylinder at top dead center is less than one fiftieth an internal volume of the first cylinder at bottom dead center.

In some exemplary embodiments, an internal volume of the second cylinder at top dead center is less than one fiftieth an internal volume of the second cylinder at bottom dead center.

In some exemplary embodiments, the first and second cylinders are arranged in a configuration selected from an inline configuration, an opposed configuration, and a V-configuration.

In some exemplary embodiments, the valve and internal chamber move linearly and reciprocally within the valve chamber. In some further exemplary embodiments, the valve is a spool valve.

In some exemplary embodiments, the first and second cylinders are thermally isolated from one another and the first cylinder is maintained at a cooler temperature than the second cylinder.

In some exemplary embodiments, the first cylinder includes a plurality of air cooling ribs located on an external surface of the first cylinder and a plurality of liquid cooling passages within its housing. In some further exemplary embodiments, the engine includes liquid coolant within the air cooling ribs and liquid cooling passages, and wherein a temperature of the liquid coolant is mechanically or electrically controlled.

In some exemplary embodiments, the second cylinder includes a plurality of exhaust heating passages for utilizing heat provided by exhaust gases expelled by the second piston to further heat the second cylinder and is thermally isolated from the surrounding environment so as to reduce leakage of thermal energy from the second cylinder.

In some exemplary embodiments, the valve and internal chamber rotate within the valve chamber. In some exemplary further embodiments, the valve and internal chamber move linearly, as well as rotationally, within the valve chamber.

In some exemplary embodiments, the engine includes: a third cylinder housing a third piston, wherein the third piston performs an expansion stroke and an exhaust stroke, but does not perform an intake stroke, and wherein the internal chamber selectively fluidly couples to the first, second, and third cylinders, and wherein the valve and internal chamber move relative to the third cylinder.

In exemplary embodiments, a method of operating a combustion engine includes compressing a working fluid in a first cylinder, transferring the working fluid to internal chamber of a valve, and transferring the working fluid to a second cylinder. In some exemplary embodiments, the first cylinder houses a first piston that performs an intake stroke and a compression stroke, but does not perform an exhaust stroke. In some exemplary embodiments, the second cylinder houses a second piston that performs an expansion stroke and an exhaust stroke, but does not perform an intake stroke.

In some exemplary embodiments, transferring the working fluid to the internal chamber includes transferring the compressed working fluid from the first cylinder to the internal chamber. In some exemplary embodiments, transferring the working fluid to the second cylinder includes transferring the compressed working fluid from the internal chamber to the second cylinder. The valve may be housed in a valve chamber of the engine. The valve and internal chamber may move within the valve chamber of the engine and relative to the first and second cylinders.

In some exemplary embodiments, the valve and internal chamber move linearly and reciprocally within the valve chamber and relative to the first and second cylinders. In some exemplary embodiments, the valve has a port that fluidly couples the internal chamber to the first and second cylinder simultaneously.

In some exemplary embodiments, the method further includes, during movement of the valve, fluidly coupling the first cylinder and the internal chamber without fluidly coupling the internal chamber and the second cylinder.

In some exemplary embodiments of the method, the valve and internal chamber include a maximum velocity and a minimum acceleration within 15 crankshaft degrees of when the internal chamber is fluidly coupled to the first and second cylinders simultaneously.

In some exemplary embodiments of the method, the valve and internal chamber include a maximum velocity and a minimum acceleration when the internal chamber is fluidly coupled to the first and second cylinders simultaneously.

In some exemplary embodiments of the method, the first cylinder has an intake port, and the method includes receiving an air/fuel mixture through the intake port. In some exemplary embodiments, the method further includes closing the intake port with a surface of the valve. In some exemplary embodiments, the method further includes closing the intake port with a poppet valve.

In some exemplary embodiments of the method, the second cylinder has an exhaust port, and the method includes expelling combusted gases through the exhaust port. In some exemplary embodiments, the method further includes closing the exhaust port with a surface of the valve. In some exemplary embodiments, the method further includes closing the exhaust port with a poppet valve.

In some exemplary embodiments, the method further includes initiating combustion with a spark plug. In some exemplary embodiments of the method, the spark plug is positioned on the valve and the method includes creating, with the spark plug, a spark within the internal chamber. In some exemplary embodiments of the method, the spark plug is positioned in the valve chamber and the valve includes a combustion port that aligns with the spark plug to initiate combustion within the internal chamber.

In some exemplary embodiments, the method further includes initiating combustion by compressing the fluid.

In some exemplary embodiments of the method, a first piston reaches its top-dead center before a second piston reaches its top-dead center. In some exemplary embodiments of the method, a second piston reaches its top-dead center before the first piston reaches its top-dead center. In some exemplary embodiments of the method, the first and second piston reach their respective top-dead centers concurrently.

In some exemplary embodiments of the method, the engine includes sealing rings between the valve and the valve chamber. In some further embodiments of the method, the sealing rings do not move relative to the valve chamber. In some further embodiments of the method, the sealing rings move relative to the valve chamber. In some further embodiments of the method, the sealing rings include a first sealing ring that does not move relative to the valve chamber and a second sealing ring that moves relative to the valve chamber.

In some exemplary embodiments of the method, an internal volume of the first cylinder when a first piston is at its bottom dead center is greater than an internal volume of the second cylinder when a second piston is at its bottom dead center. In some further embodiments of the method, an internal volume of the first cylinder when the first piston is at its bottom dead center is less than an internal volume of the second cylinder when the second piston is at its bottom dead center.

In some exemplary embodiments of the method, the engine includes: a first crankshaft coupled to a first piston; a second crankshaft coupled to a second piston; a crankshaft connecting mechanism coupled to the first and second crankshafts and configured to translate motion between the first and second crankshafts, the crankshaft connecting mechanism including a crankshaft connecting rod having first and second ends coupled to the first and second crankshafts, respectively.

In some exemplary embodiments of the method, the engine includes a single crankshaft coupled to first and second pistons.

In some exemplary embodiments of the method, the engine includes: a first crankshaft coupled to a first piston; a first gearwheel coupled to the first crankshaft; a second crankshaft coupled to a second piston; a second gearwheel coupled to the second crankshaft; and a third gearwheel coupled to the first and second gearwheels and configured to translate motion between the first and second gearwheels.

In some exemplary embodiments of the method, the internal chamber, a compression chamber, and an expansion chamber are sized to minimize dead space.

In some exemplary embodiments of the method, an internal volume of the first cylinder when a first piston is at top dead center is less than one fiftieth an internal volume of the first cylinder when the first piston is at bottom dead center. In some exemplary embodiments of the method, an internal volume of the second cylinder when a second piston is at top dead center is less than one fiftieth an internal volume of the second cylinder when the second piston is at bottom dead center.

In some exemplary embodiments of the method, the first and second cylinders are arranged in a configuration selected from an inline configuration, an opposed configuration, and V configuration.

In some exemplary embodiments of the method, the valve is a spool valve.

In some exemplary embodiments of the method, the first and second cylinders are thermally isolated from one another and the method includes maintaining the first cylinder at a cooler temperature than the second cylinder.

In some exemplary embodiments of the method, the first cylinder includes a plurality of air cooling ribs located on an external surface of the first cylinder and a plurality of liquid cooling passages within its housing. In some exemplary embodiments of the method, the engine further includes liquid coolant within the air cooling ribs and liquid cooling passages, and the method includes mechanically or electrically controlling a temperature of the liquid coolant.

In some exemplary embodiments of the method, the second cylinder includes a plurality of exhaust heating passages for utilizing heat provided by exhaust gases expelled by a second piston to further heat the second cylinder and is thermally isolated from the surrounding environment so as to reduce leakage of thermal energy from the second cylinder.

In some exemplary embodiments of the method, the engine includes a third cylinder housing a third piston, where the third piston performs an expansion stroke and an exhaust stroke, but does not perform an intake stroke, and the internal chamber selectively fluidly couples to the first, second, and third cylinders, and the valve and internal chamber move relative to the third cylinder.

DETAILED DESCRIPTION OF EXEMPLARY EMBODIMENTS

The embodiments are described in detail below with reference to the figures, wherein similar elements are referenced with similar numerals throughout. It is understood that the figures are not necessarily drawn to scale. Nor do they necessarily show all the details of the various exemplary embodiments illustrated. Rather, they merely show certain features and elements to provide an enabling description of the exemplary embodiments.

In some exemplary embodiments described herein, a split-cycle engine includes a valve chamber with a valve residing therein. The valve may include an internal chamber that selectively fluidly couples a cold and a hot cylinder of the engine. The valve and internal chamber may move within the valve chamber and relative to the hot and cold cylinders.

In some exemplary embodiments, the valve may experience reduced inertia forces. This may allow for increased durability and reliability. In some exemplary embodiments, the engine may experience thermodynamic cycles that are similar to the cycles of 4-stroke engines.

In some exemplary embodiments, the valve may have minimal flow restriction. The engine may also allow for a negligible pressure drop across the valve ports, which may provide for efficient transfer of the compressed intake charge from the Cold-Cylinder (compression chamber) to the Hot-Cylinder (power chamber).

The valve may be equipped with common piston rings which may allow for effective high pressure sealing within the chamber.

In some exemplary embodiments, the valve may avoid or limit the detrimental compromises of traditional split-cycle engines: over-compression, charge storage, heat loss and retarded combustion, and reliance on fast-moving valves.

Figure 1:
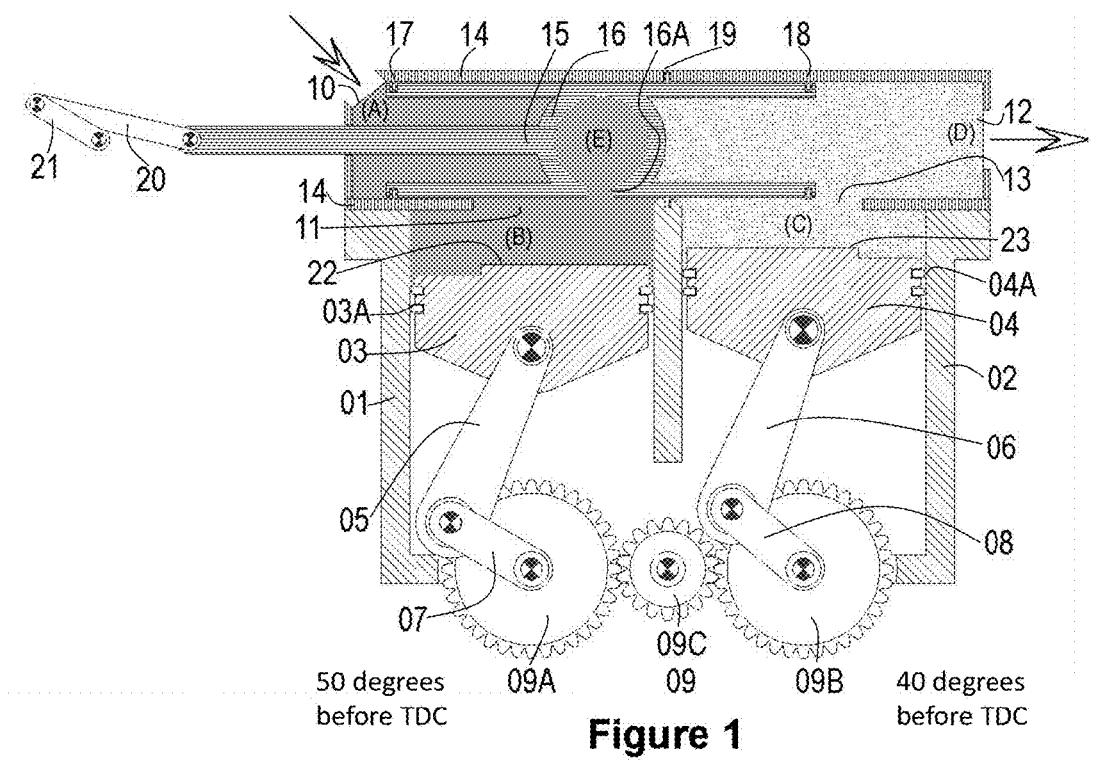
FIG. 1 is a simplified cross-sectional side view of an in line split-cycle SSCVCC apparatus, in accordance with exemplary embodiments, wherein the compression crankshaft angle is illustrated at 50 degrees before the compression piston reaches its Top Dead Center (TDC) and the power crankshaft angle is illustrated at 40 degrees before the power piston reaches its TDC.
Figure 2:
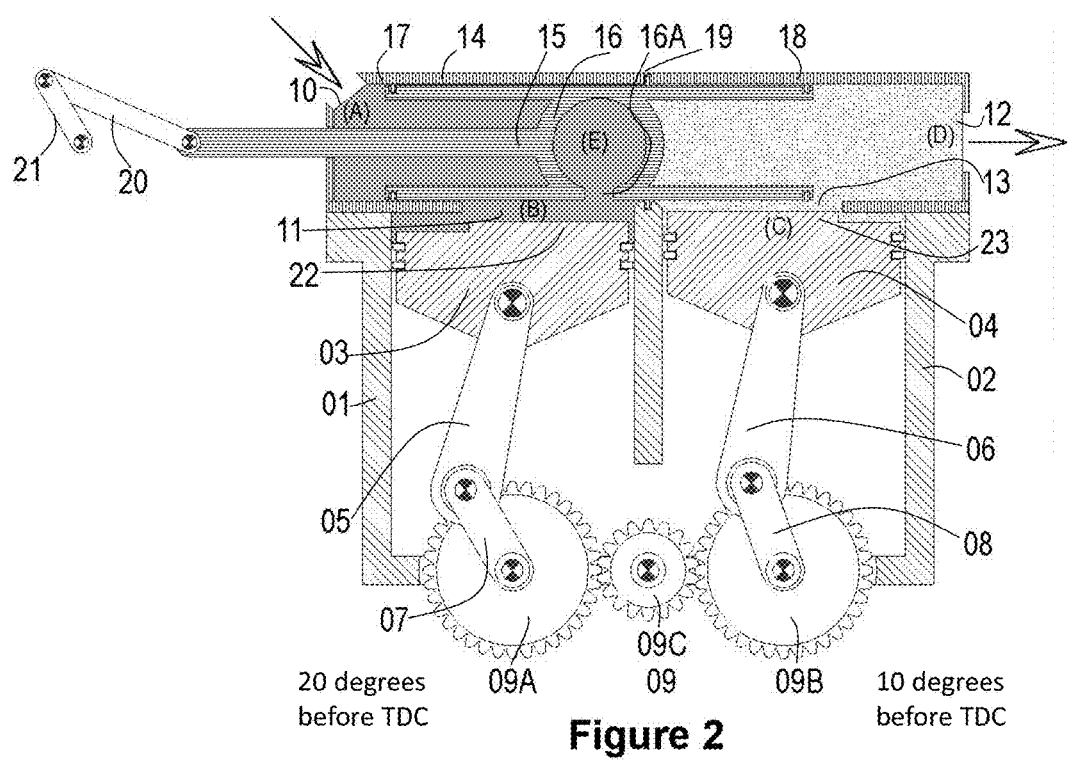
FIG. 2 is a simplified cross-sectional side view of the split-cycle SSCVCC apparatus of FIG. 1, wherein the compression crankshaft angle is illustrated at 20 degrees before its TDC and the power crankshaft angle is illustrated at 10 degrees before the power piston reaches its TDC.

Referring to FIG. 1, in accordance with one embodiment, an in-line configuration of a split-cycle engine includes: a compression cylinder 01, a power cylinder 02, a compression piston 03, compression piston rings 03A, a power piston 04, power piston rings 04A, an intake/compression chamber B, and an expansion/exhaust chamber C (as used herein, "expansion" may include or may not include combustion within chamber C). It also includes two respective piston connecting rods 05 and 06, a compression crankshaft 07, a power crankshaft 08, a crankshaft connecting gear-wheels mechanism 09 that includes the compression gear-wheel 09A, the power gearwheel 09B, and third gearwheel 09C that connects power gearwheel 09B to compression gearwheel 09A. Still referring to FIG. 1, the split-cycle engine also includes an intake manifold 10, chamber A, an intake port 11, an exhaust manifold 12, chamber D, and an exhaust port 13. It also includes a spool cylinder 14 (also called valve chamber 14), a spool shuttle 15, a combustion chamber structure 16, which is located within the spool shuttle 15, a combustion chamber port 16A, a spool ring on the compression side 17, a spool ring on the expansion side 18, stationary (retracting) ring 19 mounted in an annular groove of spool cylinder 14, a spool connecting rod 20 and a spool crankshaft 21. Still referring to FIG. 1, the split-cycle engine also includes a compression piston protrusion 22 and a power piston protrusion 23. The compression cylinder 01 is a piston engine cylinder that houses the compression piston 03, the intake or compression chamber B, and the intake port 11. The power cylinder 02 is a piston engine cylinder that houses the power piston 04, the expansion or exhaust chamber C and the exhaust port 13. The compression piston 03 and compression chamber B serves the intake and the compression engine strokes (but not the exhaust stroke). The power piston 04 and expansion chamber C serves the power and the exhaust strokes (but not the intake stroke). The connecting rods 05 and 06 connect their respective pistons to their respective crankshafts. The compression crankshaft 07 converts rotational motion into compression piston 03 reciprocating motion. The reciprocating motion of the power piston 04 is converted into rotational motion of the power crankshaft 08, which is converted to engine rotational motion or work (e.g., the power crankshaft may also serve as the engine output shaft). The three gearwheels 09A, 09B and 09C (that are collectively referred to as crankshaft connecting gearwheels mechanism 09) translate the rotation of power crankshaft 08 into rotation of the compression crankshaft 07. Both compression piston 03 and power piston 04 may have or may not have irregular structure or protrusion 22 and 23, respectively. The function of these protrusions may be to decrease the dead space. In an exemplary embodiment, the spool cylinder 14 houses the spool shuttle 15 and both are placed on top and perpendicular to both compression cylinder 01 and power cylinder 02. Spool connecting rods 20 connect spool shuttle 15 to spool crankshaft 21. Spool crankshaft 21 converts rotational motion into spool shuttle 15 reciprocating motion. Spool crankshaft 21 is mechanically connected via a mechanical linkage mechanism to power crankshaft 08, thus power crankshaft 08 drives spool crankshaft 21. In another exemplary embodiment, a swash plate mechanism or a camshaft mechanism could be used to drive spool shuttle 15. Spool shuttle 15 houses a spherical combustion chamber structure 16, combustion chamber structure port 16A and a combustion chamber E (Chamber E may be thermally insulated). During spool shuttle 15 reciprocating motion, combustion chamber E alternates between being fluidly connected to compression chamber B and expansion chamber C. At a fraction of spool 15 reciprocating motion, combustion chamber E could be fluidly connected to both compression chamber B and expansion chamber C.

During spool shuttle 15 reciprocating motion, intake port 11 may open or close as spool shuttle 15 blocks or unblocks intake port 11. Thus, spool shuttle 15 reciprocating motion fluidly couples or decouples chamber A and chamber B.

During spool shuttle 15 reciprocating motion, exhaust port 13 may open or close as spool shuttle 15 blocks or unblocks exhaust port 13. Thus, spool shuttle 15 reciprocating motion fluidly couples or decouples chamber C and chamber D.

During spool shuttle 15 reciprocating motion, combustion chamber structure 16, via combustion chamber port 16A, may fluidly couple or decouple from chamber B.

During spool shuttle 15 reciprocating motion, combustion chamber structure 16, via combustion chamber port 16A, may fluidly couple or decouple from chamber C.

For a small predetermined portion of spool crankshaft 21 cycle, ±30 degrees, for example, from the point in which spool shuttle 15 reciprocating motion passes through its mid stroke point, chambers B, E and C may be all fluidly connected via combustion chamber port 16A.

In exemplary embodiments, predetermined phase delay is introduced via the crankshafts 07 and 08, such that power piston 04 leads or follows compression piston 03. FIGS. 1-15 depicts one such exemplary embodiment in which the predetermined phase delay that is introduced via the crankshafts 07 and 08, is such that power piston 04 leads the compression piston 03 by 10 degree crank angle. In some exemplary embodiments, there may be no phase-lag between the pistons (pistons are in-phase).

In exemplary embodiments, the working fluid (air-fuel charge) resides between intake manifold 10 and intake port 11 is defined as chamber A. The intake port 11, located on the compression cylinder 01, may govern the flow of the naturally aspirated ambient air or the carbureted air/fuel charge, or forced induction of the charge, into the compression cylinder 01. The location of the compression piston 03 when the intake port opens and/or closes may vary. In some exemplary embodiments, the timing of the opening and/or closing of the intake port may vary. In one example, the intake port may open within the range of a few crankshaft degrees before the compression piston 03 reaches its TDC through approximately 50 crankshaft degrees after the compression piston 03 reaches its TDC. In one example, the intake port may close within the range of a few crankshaft degrees around compression piston 03 Bottom Dead Center (BDC) through approximately 70 crankshaft degrees after the compression piston 03 reaches its BDC.

In one embodiment, the intake port may open in a range of crankshaft degrees starting when compression piston 03 reaches its TDC through approximately 10 crankshaft degrees after the compression piston 03 reaches its TDC. At BDC, which is the end of the intake stroke, working fluid may continue to enter the cylinder due to the wave dynamics in the intake system and fluid inertia. For this reason it may be advantageous to close the intake port after the compression piston BDC. In one embodiment, the intake port 11 may close within the range of a few crankshaft degrees before the compression piston 03 reaches its BDC until approximately 70 crankshaft degrees after the compression piston 03 reaches its BDC. In one example, the intake port may close within a narrower range starting when compression piston 03 reaches its BDC until approximately 50 crankshaft degrees after the compression piston 03 reaches its TDC.

In exemplary embodiments, the exhaust port 13 located on the power cylinder 02 may govern the exhalation of burned gases. The location of the power piston 04 when the exhaust port opens may vary. In some exemplary embodiments, the exhaust port may open approximately 60 crankshaft degrees before power piston 04 reaches its BDC through approximately 20 crankshaft degrees after power piston 04 reaches its BDC. The location of the power piston 04 when the exhaust port closes may also vary. In some exemplary embodiments, the exhaust port may close approximately 15 crankshaft degrees before power piston 04 reaches its TDC through approximately 5 crankshaft degrees after power piston 04 reaches its TDC.

In one embodiment, the exhaust port may open within a range starting when power piston 04 is 15 crankshaft degrees before its BDC through approximately 15 crankshaft degrees after the power piston 04 reaches its BDC. In one embodiment, the exhaust port may close within a narrower preferred range starting 5 degrees before power piston 04 reaches its TDC through approximately when power piston 04 reaches its TDC.

In one embodiment, the spool cylinder 14 houses the spool shuttle 15 and both are placed on top and perpendicular to both compression cylinder 01 and power cylinder 02. The spool connecting rods 20 connect spool shuttle 15 to spool crankshaft 21. The spool crankshaft 21 converts rotational motion into spool shuttle 15 reciprocating motion. Spool shuttle 15 houses a spherical (for example) combustion chamber structure 16, combustion chamber structure port 16A and a combustion chamber E. During spool shuttle 15 reciprocating motion, combustion chamber E alternates between being fluidly connected to compression chamber B and/or expansion chamber C. During the same spool shuttle 15 reciprocating motion, intake port 11 and exhaust port 13 may move toward the open or closed position.

Referring again to FIG. 1, within the compression cylinder 01 is compression piston 03. The compression piston 03 moves relative to the compression cylinder 01 in the upward direction toward its TDC (gearwheel mechanism 09A rotates clockwise). Within the power cylinder 02 is a power piston 04. The power piston 04 moves relative to the power cylinder 02 in the upward direction as well (gearwheel mechanism 09B rotates clockwise), toward its TDC. The compression cylinder 01 and the compression piston 03 define chamber B. The power cylinder 02 and the power piston 04 define chamber C. The volume within combustion chamber structure 16 defines combustion chamber E. In some exemplary embodiments, the power piston 04 moves in advance of the compression piston 03. Chamber B may be in fluid communication with chamber C when combustion chamber E is in fluid communication with both chambers B and chamber C (See for example FIGS. 5 and 6). Chamber B, through intake port 11, may be fluidly connected with incoming working fluid (carbureted naturally aspirated fuel/air charge or forced induced fuel/air charge) via chamber A. Chamber C, through exhaust port 13, may be fluidly connected with ambient air D, through exhaust manifold 12 and potentially other apparatus (such as turbo charger, catalytic convertor, or other apparatus as commonly known to the art). When in an open state, exhaust port 13 allows exhaust gases to exhale.

During a combustion stroke, the power piston 04 may push the power connecting rod 06, causing the power crankshaft 08 to rotate clockwise as illustrated in FIGS. 5, 6, 7, 8, 9, 10, and 11. During an exhaust stroke, inertial forces (which may be initiated by a flywheel mass—not shown) cause the power crankshaft 08 to continue its clockwise rotation, and cause the power connecting rod 06 to move power piston 04, which in turn exhales burnt fuel exhaust through port 13 as illustrated in FIGS. 12, 13, 14, 15, 1, 2, and 3. The power crankshaft 08 rotation articulates rotation, through a crankshaft connecting gearwheels mechanism 09, of the compression crankshaft 07 to move compression piston 03 in synchronous but phase-shifted rotation (i.e., both crankshafts rotate at the same speed but differ in their respective crank angles). In other embodiments, there may be no phase-shift between the pistons, resulting in both crankshafts rotating at the same crank angle.

In exemplary embodiments, the relative positions of the power piston 04 and the compression piston 03 may be phase-shifted by a pre-determined amount to achieve a desired engine compression ratio. In some exemplary embodiments, the split-cycle engine dual cylinder apparatus utilizes conventional pressurized cooling and oil lubrication methods and systems (not shown). In some exemplary embodiments, the components of the power chamber C are temperature controlled using a cooling system, thereby cooling the power chamber C structure components (such as the cylinder 02, piston 04, and parts of spool cylinder 14 and spool shuttle 15). In some exemplary embodiments, some or all of the components may be fabricated out of high-temperature resistant materials such as ceramics or utilizing ceramic coatings, cast iron, titanium, nickel-alloy steel, nano-composites, matrix composites, or stainless steel. In some exemplary embodiments, the split-cycle apparatus may utilize well-known high voltage spark ignition systems (not shown), as well as an electrical starter motor to control engine initial rotation.

As explained above, the compression connecting rod 05 connects the compression crankshaft 07 with the compression piston 03 causing the compression piston 03 to move relative to the cylinder in a reciprocating manner. The power connecting rod 06 connects the power crankshaft 08 with the power piston 04. During the combustion phase, the power connecting rod 06 transfers the reciprocating motion of the power piston 04 into the power crankshaft 08, causing the power crankshaft to rotate. During the exhaust phase, the power crankshaft 08 rotation and momentum pushes the power piston 04 upward toward its TDC, which causes the burned gases to be exhaled via the exhaust port 13 (exhaust stroke).

Referring to FIG. 1, the compression crankshaft 07 converts rotational motion into compression piston 03 reciprocating motion. The compression crankshaft 07 connects the compression connecting rod 05 with the crankshaft connecting gearwheels mechanism 09. Motion of the crankshaft connecting gearwheels mechanism 09 causes the compression crankshaft 07 to rotate. Compression crankshaft 07 rotation produce motion of the compression connecting rod 05 that in turn moves the compression piston 03 relative to its cylinder housing 01 in a reciprocating manner.

In various exemplary embodiments, the compression crankshaft 07 and power crankshaft 08 structural configurations may vary in accordance with desired engine configurations and designs. For example, possible crankshaft design factors may include: the number of dual cylinders, the relative cylinder positioning, the crankshaft gearing mechanism, and the direction of rotation. In one exemplary embodiment (not shown), a single crankshaft would actuate both compression piston 03 and expansion piston 04 via compression connecting rod 05 and power piston connecting rod 06. Such single crankshaft could actuate multiple pairs of compression piston 03 and expansion piston 04.

The power crankshaft 08 connects the power connecting rod 06 with the crankshaft connecting gearwheels mechanism 09. As combustion occurs, the reciprocating motion of power piston 04 causes, through the power connecting rod 06, the power crankshaft 08, which may also be coupled to the engine output shaft (not shown), to rotate, which causes the connecting gearwheels mechanism 09 to rotate the compression crankshaft 07, thereby generating reciprocating motion of the compression piston 03 as described above.

The crankshaft connecting gearwheels mechanism 09 connects the power crankshaft 08 with the compression crankshaft 07 and thus provides both crankshafts with synchronous rotation. Alternative embodiments may include, for the crankshaft connecting gearwheels mechanism 09, standard rotational energy connecting elements such as timing belts, multi rod mechanisms gears, for example.

FIGS. 1 through 15 illustrate perspective views of the crankshaft connecting gearwheels mechanism 09 coupled to crankshafts 07 and 08, which are coupled to respective piston connecting rods 05 and 06. The crankshafts 07 and 08 may be oriented relatively to each other such as to provide a predetermined phase difference between the otherwise synchronous motion of pistons 03 and 04. A predetermined phase difference between the TDC positions of the compression piston and power piston may introduce a relative piston phase delay or advance. In exemplary embodiments, as illustrated in FIGS. 1 to 15, a phase delay is introduced such that the power piston 04 moves slightly in advance of compression piston 03, thereby permitting the compressed charge to be delivered under nearly the full compression stroke and permitting the power piston 04 to complete a full exhaust stroke. Such advantages of the phase delays where the power piston leads the compression piston are also described in U.S. Pat. No. 1,372,216 to Casaday and U.S. Pat. Application No. 2003/0015171 A1 to Scuderi, the entire contents of both of which are incorporated by reference herein in their entireties. Control and modulation of the degree of the phase lag would alter the engine effective compression ratio. The smaller the phase lag is, the larger the compression ratio. Modulation of the phase lag could serve as to set a compression ratio that would better fit the combustion of a particular fuel, for example, higher phase lag and smaller compression ratio for gasoline and spark ignited (SI) fuels and smaller phase lag and higher compression ratio for diesel and compression ignited (CI) fuels. Modulation of the split-cycle engine phase lag could attribute multi-fuel capabilities to the engine. In farther embodiment, dynamic phase lag changes (modulation) may be implemented while the engine is in operation mode or at rest mode. Phase lag dynamic modulation as function of engine loads, speed, temperature etc may increase engine performance significantly.

Figure 3:
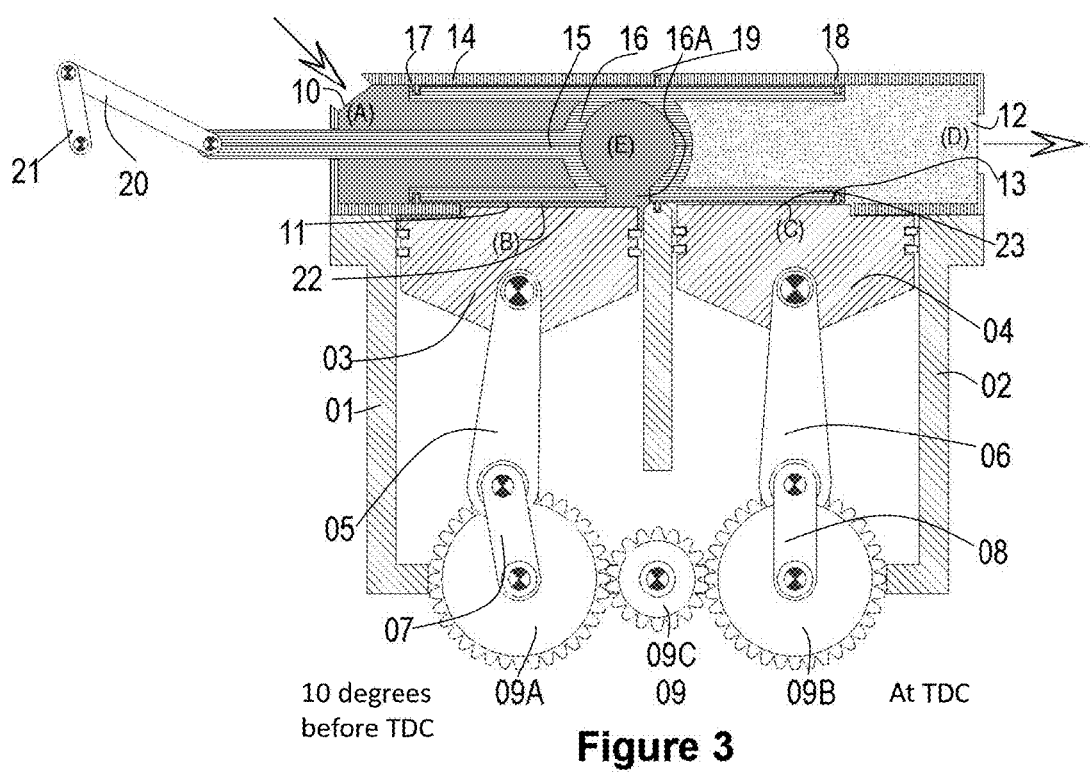
FIG. 3 is a simplified cross-sectional side view of the split-cycle SSCVCC apparatus of FIG. 1, wherein the compression crankshaft angle is illustrated at 10 degrees before its TDC, and the power crankshaft angle is illustrated at its TDC.
Figure 4:
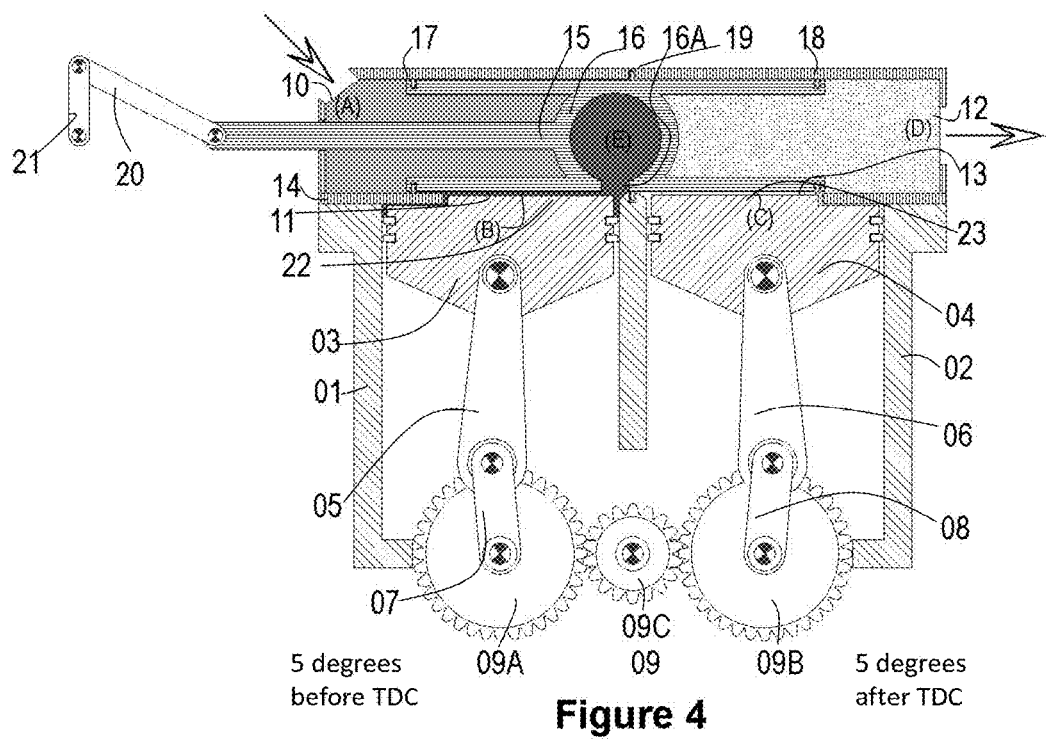
FIG. 4 is a simplified cross-sectional side view of the split-cycle SSCVCC apparatus of FIG. 1, wherein the compression crankshaft angle is illustrated at 5 degrees before its TDC, and the power crankshaft angle is illustrated at 5 degrees after the power piston reaches its TDC.
Figure 5:
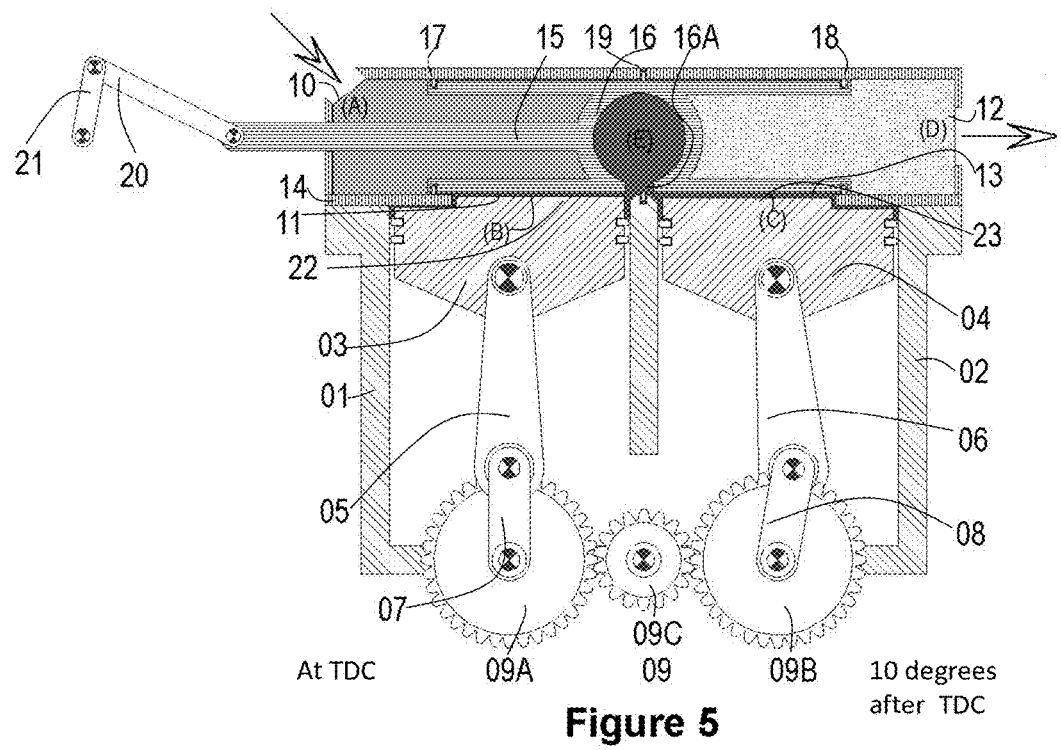
FIG. 5 is a simplified cross-sectional side view of the split-cycle SSCVCC apparatus of FIG. 1, wherein the compression crankshaft angle is illustrated at its TDC, and the power crankshaft angle is illustrated at 10 degrees after its TDC.
Figure 6:
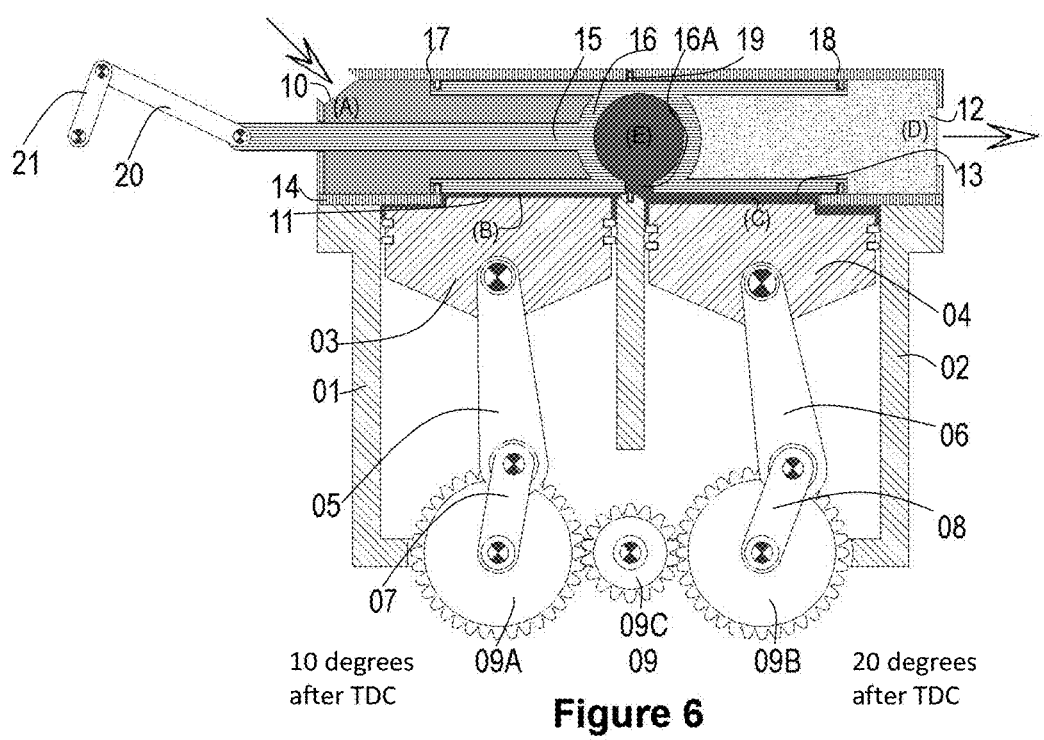
FIG. 6 is a simplified cross-sectional side view of the split-cycle SSCVCC apparatus of FIG. 1, wherein the compression crankshaft angle is illustrated at 10 degrees after its TDC, and the power crankshaft angle is illustrated at 20 degrees after its TDC.
Figure 7:
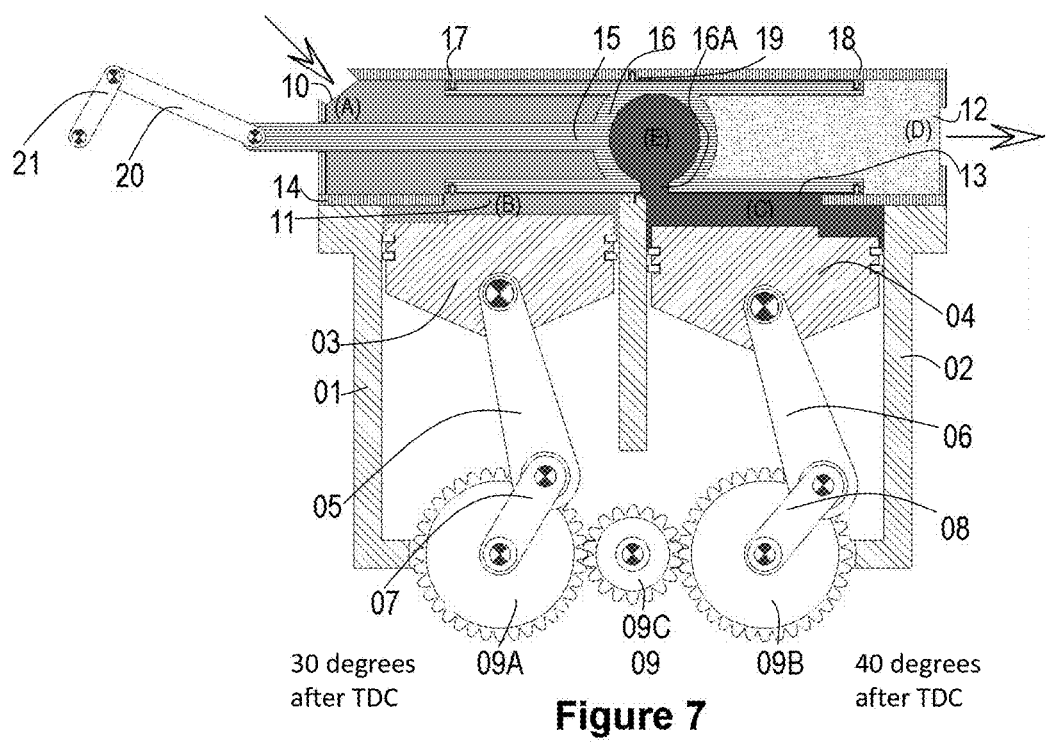
FIG. 7 is a simplified cross-sectional side view of the split-cycle SSCVCC apparatus of FIG. 1, wherein the compression crankshaft angle is illustrated at 30 degrees after its TDC, and the power crankshaft angle is illustrated at 40 degrees after its TDC.
Figure 8:
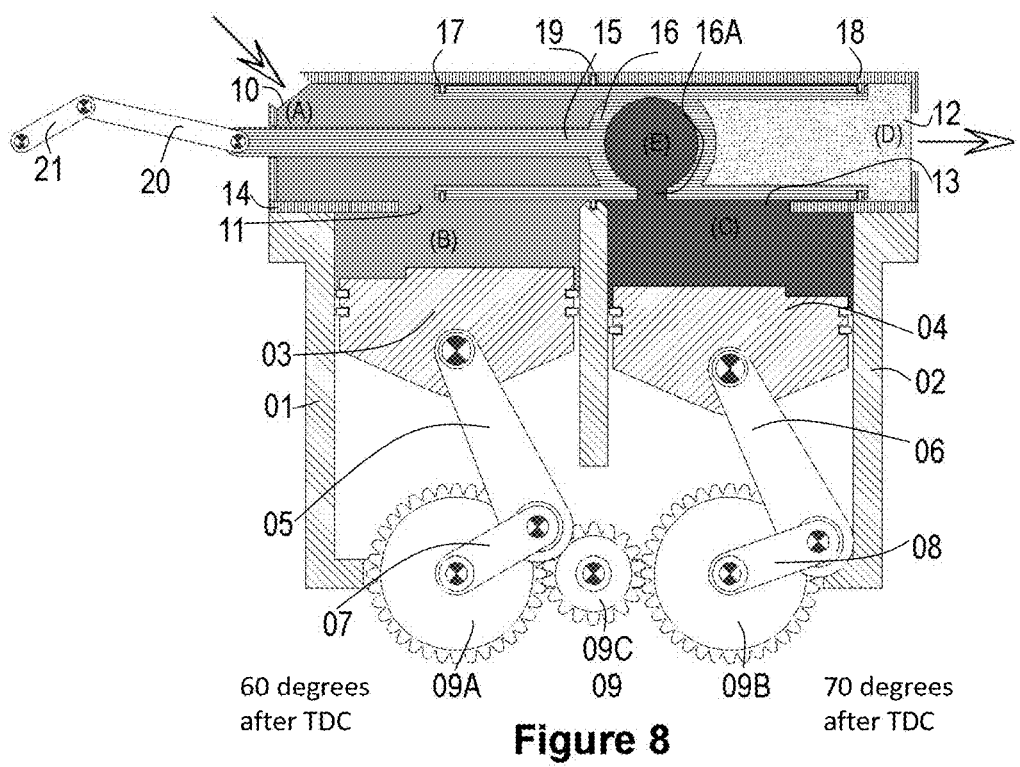
FIG. 8 is a simplified cross-sectional side view of the split-cycle SSCVCC apparatus of FIG. 1, wherein the compression crankshaft angle is illustrated at 60 degrees after TDC, and the power crankshaft angle is illustrated at 70 degrees after its TDC.
Figure 9:
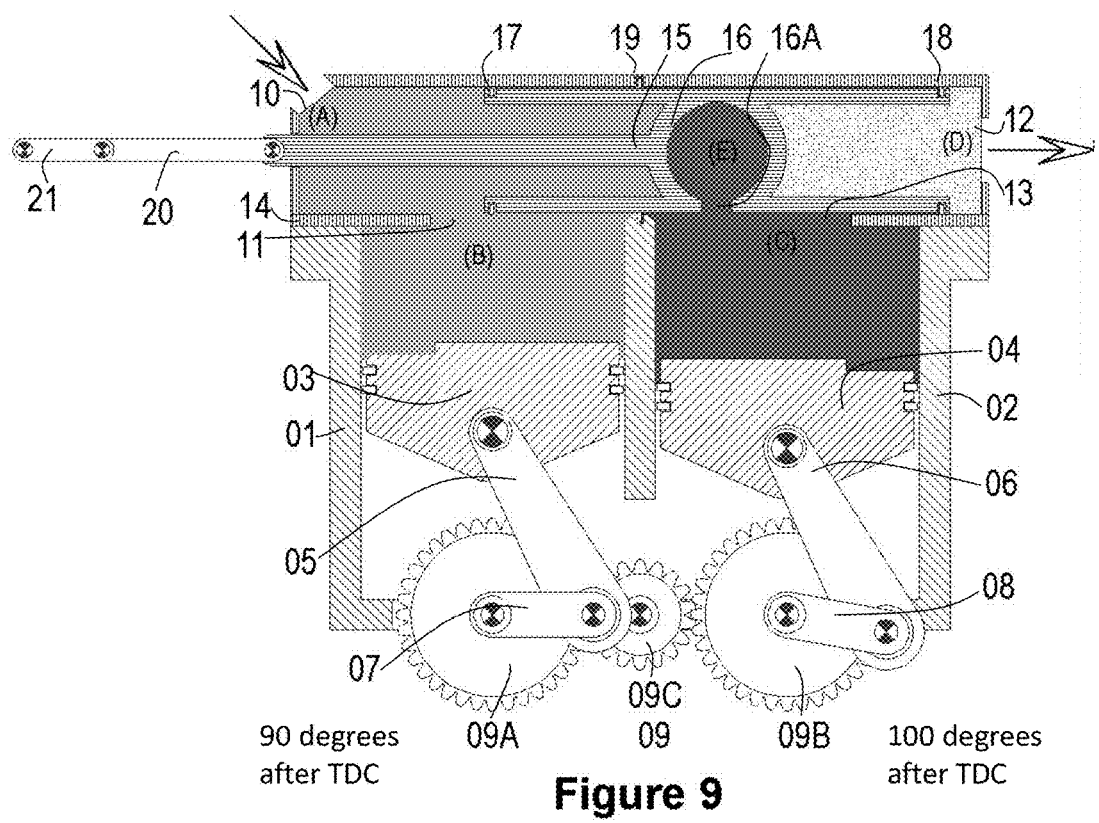
FIG. 9 is a simplified cross-sectional side view of the split-cycle SSCVCC apparatus of FIG. 1, wherein the compression crankshaft angle is illustrated at 90 degrees after its TDC, and the power crankshaft angle is illustrated at 100 degrees after its TDC.

As illustrated in FIGS. 1 through 15, while an electrical starter (not shown) engages the split-cycle output shaft (not shown), both crankshafts 07 and 08 start their clockwise rotation and both pistons 03 and 04 begin their reciprocating motion. As illustrated in FIG. 7, the compression piston 03 and the power piston 04 move in the direction that increases chamber B and chamber C volume (downward in FIG. 7 toward BDC of both pistons). Since intake port 11 is in its open state and because chamber B volume constantly increases at this stage, carbureted fuel or fresh air charge (when using a fuel injection system) flows from chamber A through intake port 11 into chamber B. The location of the compression piston 03 when the intake port opens may vary. In one example, the intake port may open a few crankshaft degrees before compression piston 03 reaches its TDC through approximately 50 crankshaft degrees after compression piston 03 reaches its TDC. As shown in FIGS. 08 through 12, respectively, chamber B volume increases while the fuel-air charge flows in. As compression piston 03 passes beyond its BDC point (for example, between 25 degrees before BDC to 70 degrees after BDC, as shown in FIG. 12), intake port 11 closes, trapping chamber B air-fuel charge (working fluid) content. While crankshafts clockwise rotation continues (as shown in FIGS. 13, 14, 15, 1, 2, 3, 4 and 5), chamber B volume decreases and the temperature and pressure of the air-fuel charge increases. During this portion of the cycle where chamber B volume decreases (FIGS. 13-15 and 1-5) spool shuttle 15 position is such that the spherical combustion chamber structure 16 via combustion chamber structure port 16A is fluidly coupled with compression cylinder 01, thus chamber B is fluidly coupled with combustion chamber E. During the entire compression stroke the working fluid is being compressed into chamber E such as at the end of the compression stroke when compression piston 03 approached its TDC almost all the working fluid has been transferred from chamber B to chamber E and almost no working fluid remains in chamber B (FIGS. 3, 4 and 5). As the power piston 04 approaches its TDC (FIGS. 2 and 3), almost all of the burned working fluid is pushed out from chamber C through the open exhaust port 13. This is because the SSCVCC split-cycle engine is designed, in one embodiment, to minimize the volume of chamber C when piston 04 is at its TDC (FIG. 3). This is also because of protrusion 23 further decreases chamber C dead volume when piston 04 is at TDC, filling and eliminating, for example, potential dead space at the vicinity of exhaust port (13). As the power piston 04 passes through its TDC (FIG. 2 through 6), spool shuttle 15 reciprocating motion shuttles combustion chamber structure 16 and combustion chamber E from being fluidly connected to chamber B and accepting the compressed working fluid as chamber B volume approaches zero, to be fluidly connected to chamber C, as chamber C volume approaches zero volume followed by a gradual increase in chamber C volume. Thus, fuel-air charge in chamber B flows via chamber E into chamber C, which is gradually increasing in volume due to piston 4 movement away from TDC. Notice that in some exemplary embodiments, for a small fraction of the cycle, all three chambers (B, C and E) might be fluidly connected (FIGS. 5 and 6).

As mentioned above, during the part of the SSCVCC engine cycle depicted in FIG. 12 through 15 and FIGS. 1 through 5, which constitutes the entire compression stroke, the air-fuel charge in chamber B flows into chamber E. During the part of the engine cycle depicted in FIG. 5 through 11 that constitute the expansion (power) stroke, the air-fuel charge in chamber E flows into chamber C. In one embodiment, during the part of the cycle that is depicted in FIG. 4 and FIG. 5, the point in the cycle in which the maximum compression of the working fluid is achieved. This could also be described as the point in which the sum of the volumes of cambers B, E, and C is the smallest, when these three chambers are all fluidly coupled. In one embodiment, the pressure build-up due to combustion may be timed to compound on top of this point of maximum compression. At a certain predetermined point (for example, while the compression piston 03 approaches its TDC, as illustrated in FIGS. 3 through 5, although, some exemplary embodiments may introduce delay or advance), combustion of the air-fuel charge is initiated via an ignition mechanism, such as spark plug firing or compression ignition. In compression ignition engine configurations, a high pressure fuel injection system is incorporated with the timing of fuel injection determining combustion timing. As the compression piston 03 approaches its TDC (FIGS. 3 and 4), almost all of the compressed working fluid was pushed through combustion chamber port 16A from chamber B to chamber E. This is because the SSCVCC split-cycle engine is designed, in one embodiment, to have minimal clearance, which is to have chamber B volume as low as possible when piston 03 is at its TDC (FIG. 5). This is also because of protrusion 22 that further decreases chamber B volume when piston 03 is at TDC, filling and eliminating, for example, potential dead space at the vicinity of intake port 11. As the compression piston 03 passes through its TDC (FIGS. 4-6), combustion is developing in combustion chamber E followed by the decoupling of combustion chamber E from compression chamber B (FIG. 7). This decoupling is due to spool shuttle 15 reciprocating motion away from chamber B and the presence of retracting (stationery) ring 19.

In other embodiments, there could be at least one retracting (stationery) ring, or 2 or 3 or more retracting rings 19, as well as single or multiple expanded sealing rings mounted in annular grooves on the shuttle spool or a combination of expanding and retracting stationary rings.

FIGS. 4 through 12 illustrate the power stroke, according to exemplary embodiments. As combustion occur, the pressures in chambers B, E and C increase. The net torque turns the power crankshaft clockwise (as well as the coupled compression crankshaft). In some exemplary embodiments, spool timing and spark timing could be set such that the pressure increases only in chambers E and C.

Sparkplug firing or compression ignition (timed with fuel injection) may occur at a predetermined location within the engine cycle that is illustrated in FIGS. 2 through 7, although some deviation may be permitted in some exemplary embodiments. The sparkplugs could be located on Spool cylinder 14 and the spark could reach combustion chamber E once an aperture in combustion chamber structure 16 (not shown) is lined up with the sparkplug electrodes. Alternatively, the sparkplugs could be located on compression cylinder 01 near intake port 11 or on power cylinder 02 near exhaust port 13.

Referring now to FIG. 7, when compression piston 03 is pulled back from its TDC position, according to exemplary embodiments, intake port 11 reopens, thus allowing a new air-fuel charge A to enter chamber B throughout the entire intake stroke (FIGS. 7 through 12).

Figure 10:
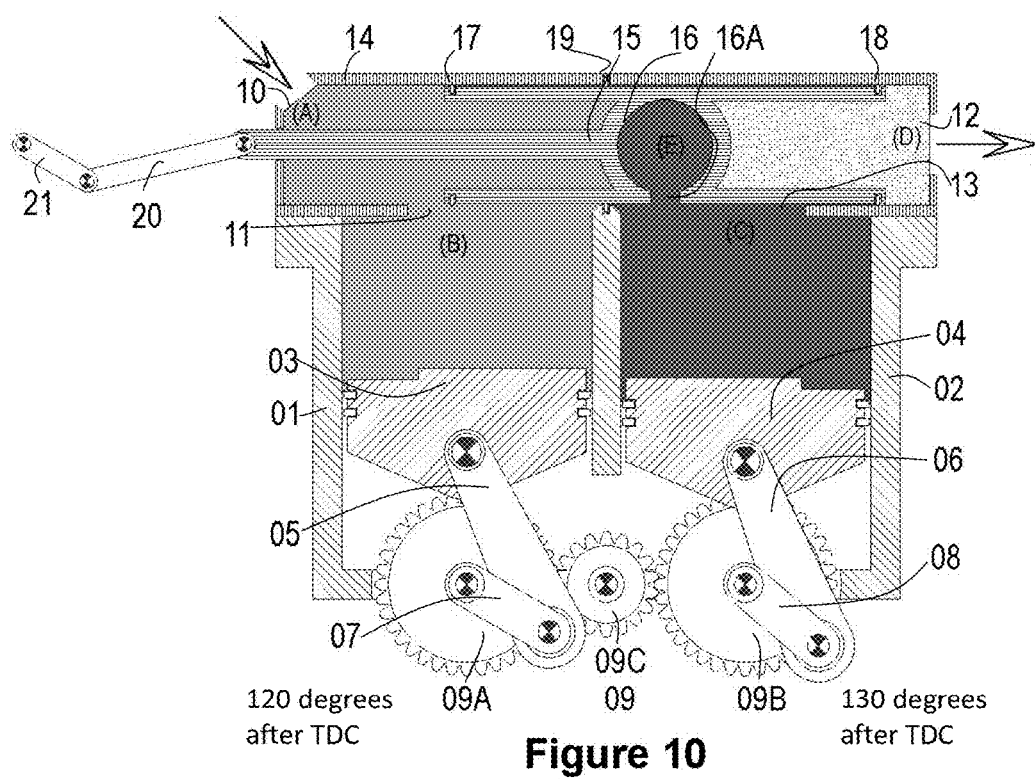
FIG. 10 is a simplified cross-sectional side view of the split-cycle SSCVCC apparatus of FIG. 1, wherein the compression crankshaft angle is illustrated at 120 degrees after its TDC, and the power crankshaft angle is illustrated at 130 degrees after its TDC.
Figure 11:
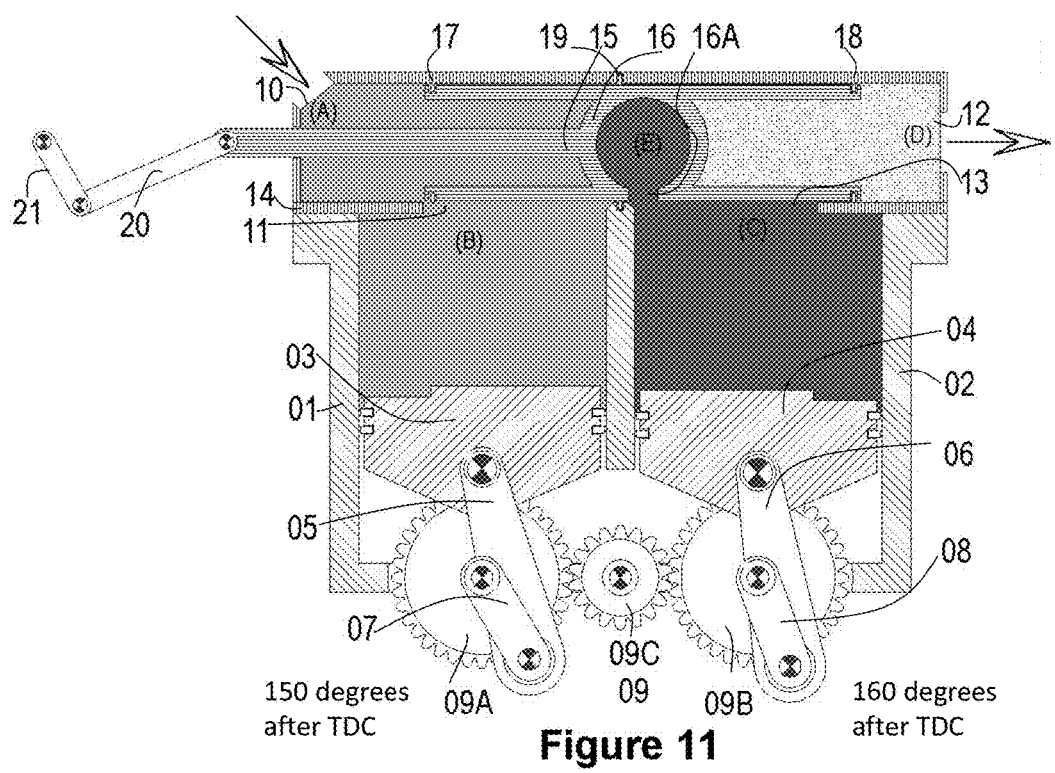
FIG. 11 is a simplified cross-sectional side view of the split-cycle SSCVCC apparatus of FIG. 1, wherein the compression crankshaft angle is illustrated at 150 degrees after its TDC, and the power crankshaft angle is illustrated at 160 degrees after its TDC.
Figure 12:
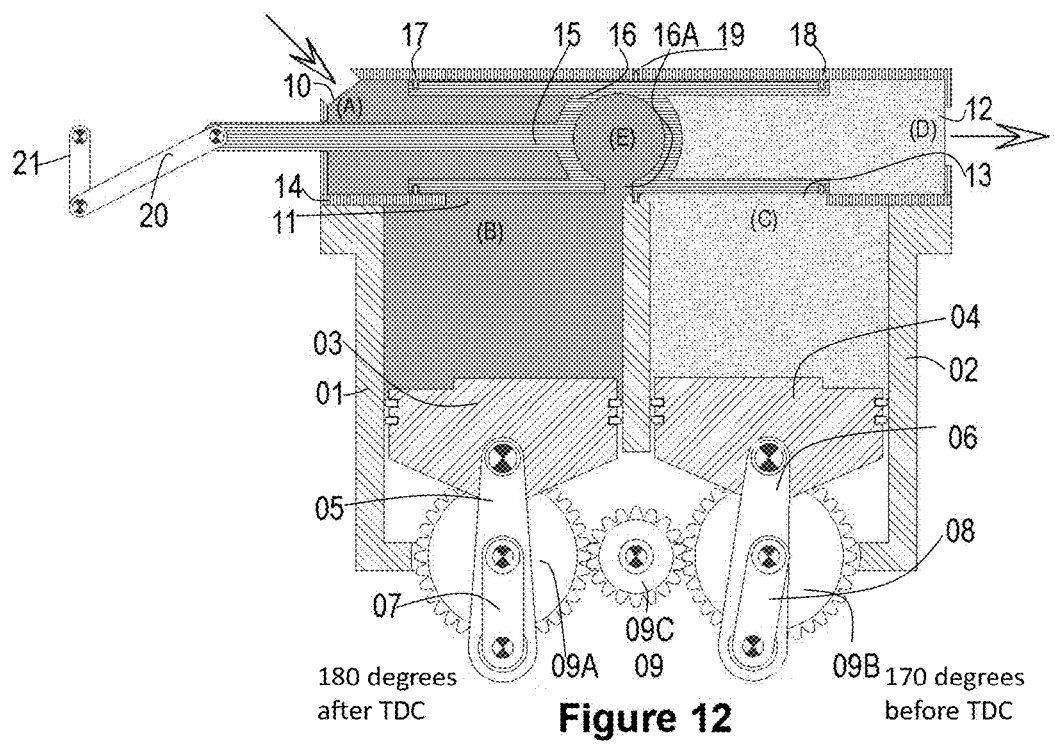
FIG. 12 is a simplified cross-sectional side view of the split-cycle SSCVCC apparatus of FIG. 1, wherein the compression crankshaft angle is illustrated at 180 degrees after its TDC, which is its Bottom Dead Center (BDC), and the power crankshaft angle is illustrated at 170 degrees before its TDC.
Figure 13:
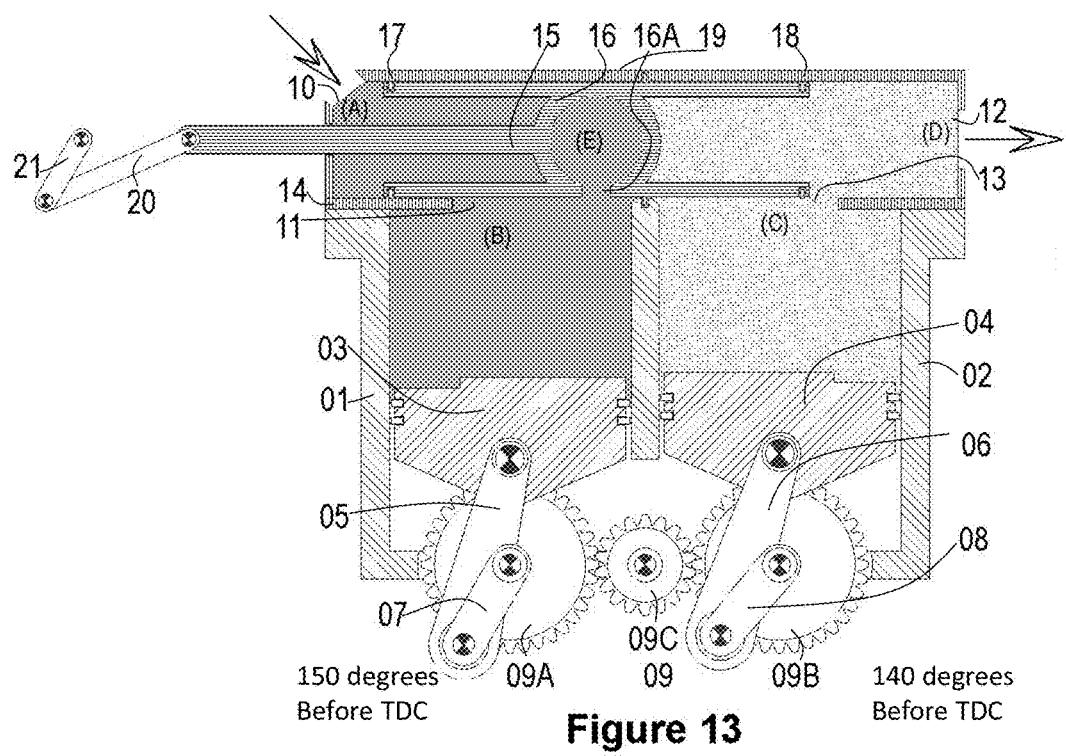
FIG. 13 is a simplified cross-sectional side view of the split-cycle SSCVCC apparatus of FIG. 1, wherein the compression crankshaft angle is illustrated at 150 degrees before its TDC, and the power crankshaft angle is illustrated at 140 degrees before its TDC.
Figure 14:
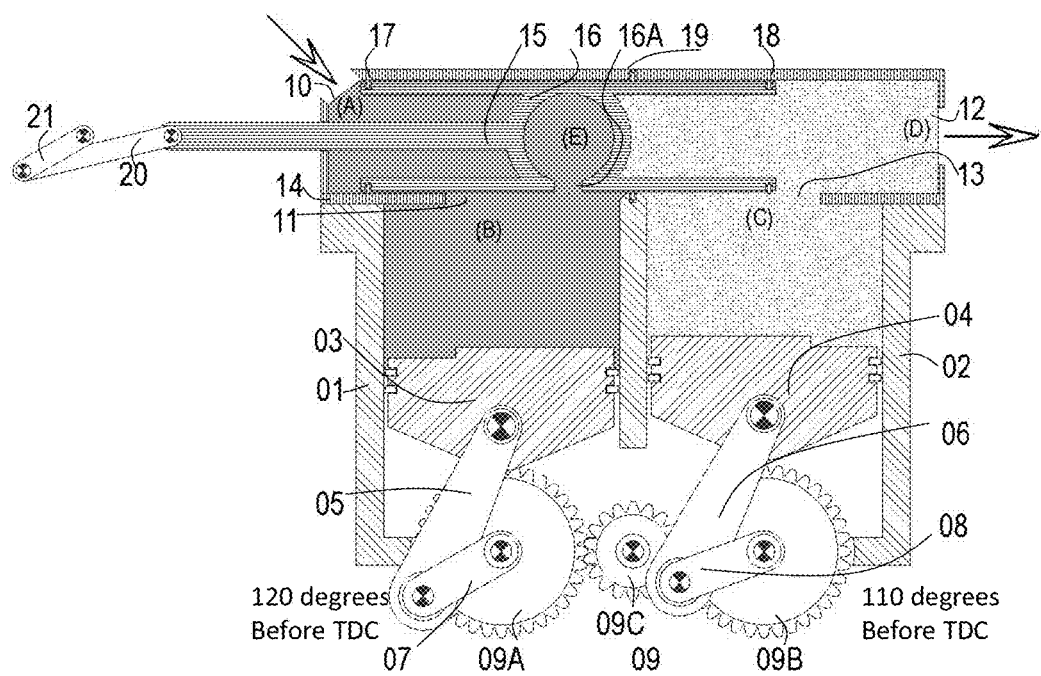
FIG. 14 is a simplified cross-sectional side view of the split-cycle SSCVCC apparatus of FIG. 1, wherein the compression crankshaft angle is illustrated at 120 degrees before its TDC, and the power crankshaft angle is illustrated at 110 degrees before its TDC.
Figure 15:
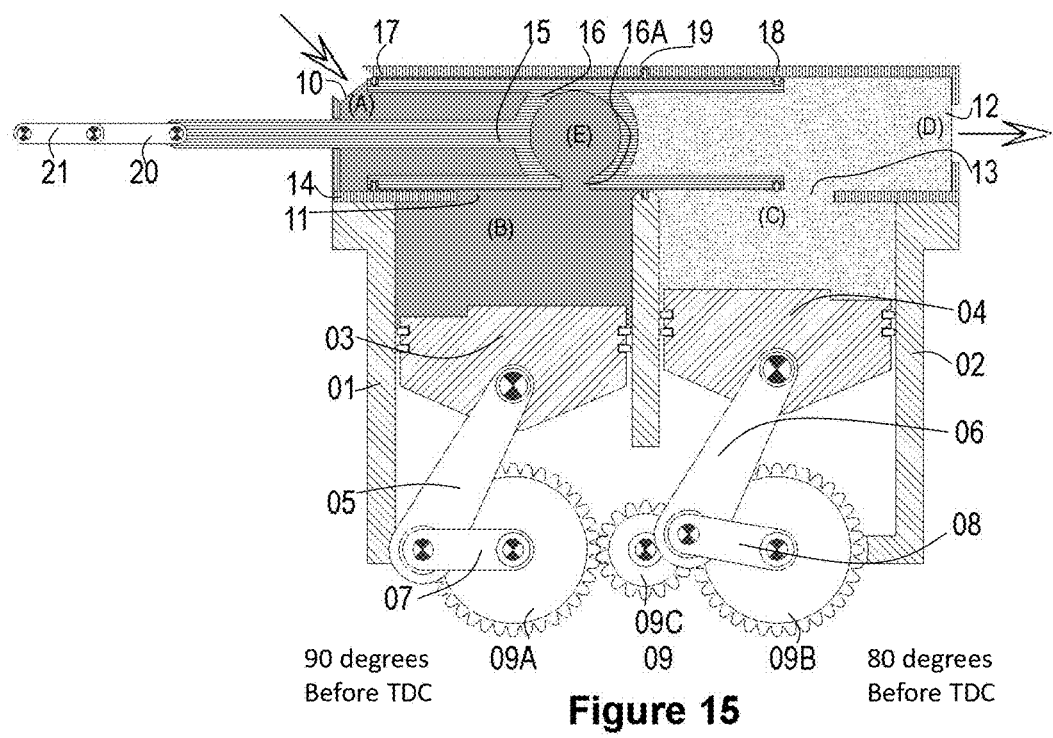
FIG. 15 is a simplified cross-sectional side view of the split-cycle SSCVCC apparatus of FIG. 1, wherein the compression crankshaft angle is illustrated at 90 degrees before its TDC, and the power crankshaft angle is illustrated at 80 degrees before its TDC.

Referring now to FIGS. 10 through 12, in exemplary embodiments, the exhaust stroke may begin about 40 to 60 crankshaft degrees before power piston 04 reaches its BDC position (FIG. 12). In the cycle that is given as an example of one embodiment, the exhaust stroke begins when power piston 04 reaches its BDC position (FIG. 12). The exhaust port 13 opens and the burned exhaust gases are pushed out from chamber C through open exhaust port 13 into the ambient environment D. Although the timing of the strokes of the engine is given in exemplary embodiments, it should be understood that the timing described herein may be adjusted in some exemplary embodiments.

In some exemplary embodiments, combustion initiation occurs (initiated/timed) shortly before or after total compression cylinder volume plus expansion cylinder volume plus combustion chamber E volume (chambers B, C and E) reaches its combined-minimum-volume (for example, 20 crankshaft degrees before or after the point of combinedminimum-volume, and in some exemplary embodiments, 5 crankshaft degrees before or after the point of combined-minimum-volume). This minimum volume may be reached while combustion chamber E is fluidly coupled to both chambers B and C .i.e. fluid may flow from the compression chamber B into the combustion chamber C (FIGS. 5-6) through combustion chamber E. For a spark ignited (SI) engine, peak pressure at the combustion may occur 0-40 crankshaft degrees after the point of minimal volume and, in some exemplary embodiments, 5-25 crankshaft degrees after the point of minimum volume, while chamber E is fluidly coupled with chamber C. For a compression ignited (CI) engine, peak pressure of combustion may occur 0-25 crankshaft degrees after the point of minimum volume and, in some exemplary embodiments, 5-15 crankshaft degrees after the point of minimum volume.

In some exemplary embodiments, an engine may reach Minimum Best Timing (MBT) 14 to 28 power crankshaft degrees after total compression cylinder volume plus expansion cylinder volume plus chamber E reaches its combined-minimum-volume.

Referring to FIG. 1, SSCVCC may generally include a spool cylinder 14, a spool shuttle 15, a combustion chamber 16, which is located within the spool shuttle 15, a combustion chamber port 16A, a spool ring on the compression side 17, a spool ring on the expansion side 18, a spool cylinder stationary (retracting) ring 19, a spool connecting rod 20 and a spool crankshaft 21. When used in the embodiments of FIGS. 1-15, the SSCVCC may separate compression chamber B and combustion chamber C. In this situation each chamber may include regions of different fluid pressure. The movement of SSCVCC within spool cylinder 14 may allow the coupling or decoupling of fluid communication between chamber B and chamber C via chamber E. During the compression stroke, as illustrated in FIGS. 12-15 and 1-4, SSCVCC position within spool cylinder 14 may prevent high pressure fluid transfer from compression chamber B into power chamber C as the working fluid of the compression stroke is being restricted from passing laterally through the gaps between spool cylinder 14 and spool shuttle 15 due to spool ring 17 and spool cylinder retracting (stationary) ring 19. During the compression stroke (FIGS. 12-15 and 1-4) the working fluid is being transferred from chamber B to chamber E. Once chamber E contains the vast majority of compressed working fluid, during spool shuttle 15 reciprocating motion, combustion chamber E first couples chamber B with chamber C such as chambers B, E and C are fluidly coupled (FIGS. 5 and 6), followed by the decoupling of chamber B (FIG. 7) from chamber E and C. In one exemplary embodiment, at this part of crankshaft 08 cycle (FIG. 7), both the intake stroke (of the next cycle) begins in cylinder 01 and the power stroke continues in power cylinder 02. The SSCVCC position within spool cylinder 14 may prevent high pressure fluid transfer from power chamber C into compression chamber B as the working fluid of the power stroke is being restricted from passing laterally through the gaps between spool cylinder 14 and spool shuttle 15 due to spool ring 18 and spool cylinder retracting (stationary) ring 19. The power stroke is depicted in FIGS. 4-12, in which the combusted working fluid is expanding in both chamber E and chamber C. As illustrated in FIG. 7, when power piston 04 approaches its BDC exhaust port 13 opens and the burnt gaseous exhale and the residual pressure in chamber C diminishes. The entire exhaust stroke is depicted in FIGS. 12-15 and 1-3, in which the already expanded combusted working fluid is exhausted from chamber C via exhaust port 13 to ambient point D. The intake stroke is depicted in FIGS. 7-12, in which the next quantum of working fluid is induced into chamber B via intake port 11. Once intake port 11 closes, (FIG. 12), the compression stroke is depicted in FIGS. 12-15 and 1-4, in which the next quantum of working fluid is being compressed from chamber B into chamber E via combustion chamber port 16A.

Figure 16:
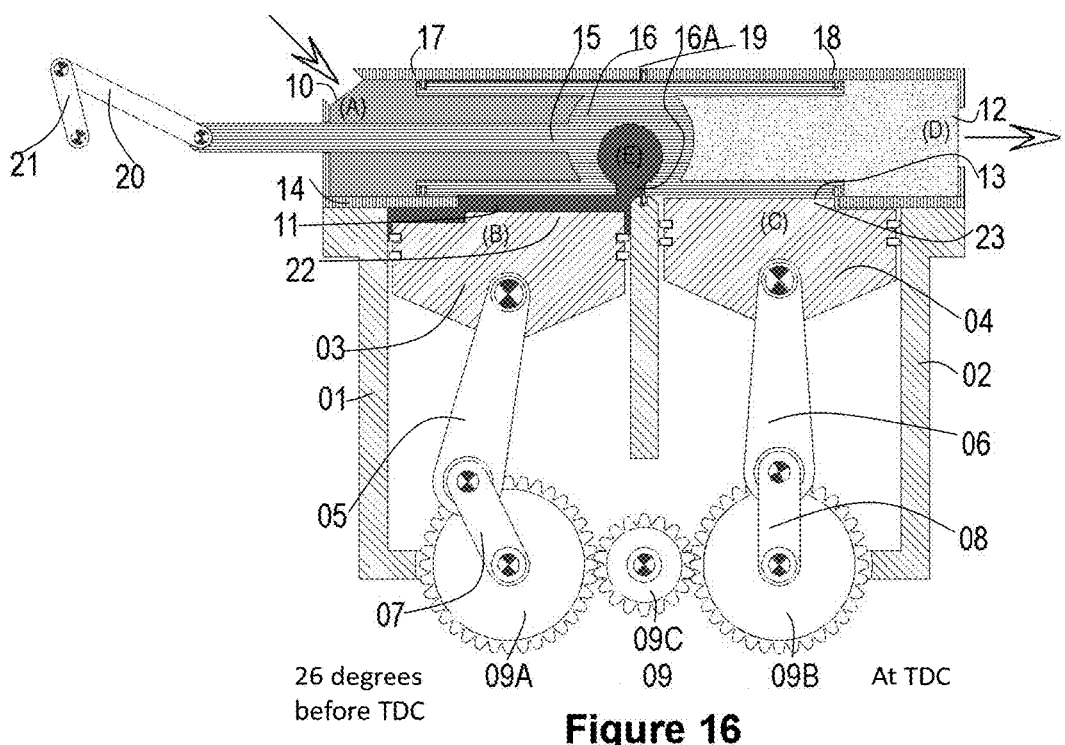
FIG. 16 is a simplified cross-sectional side view of the split-cycle SSCVCC apparatus of FIG. 1, wherein the compression crankshaft angle is illustrated at 26 degrees before its TDC, and the power crankshaft angle is illustrated at TDC, and the combustion chamber within the spool shuttle is smaller than the one shown in FIG. 1.
Figure 17:
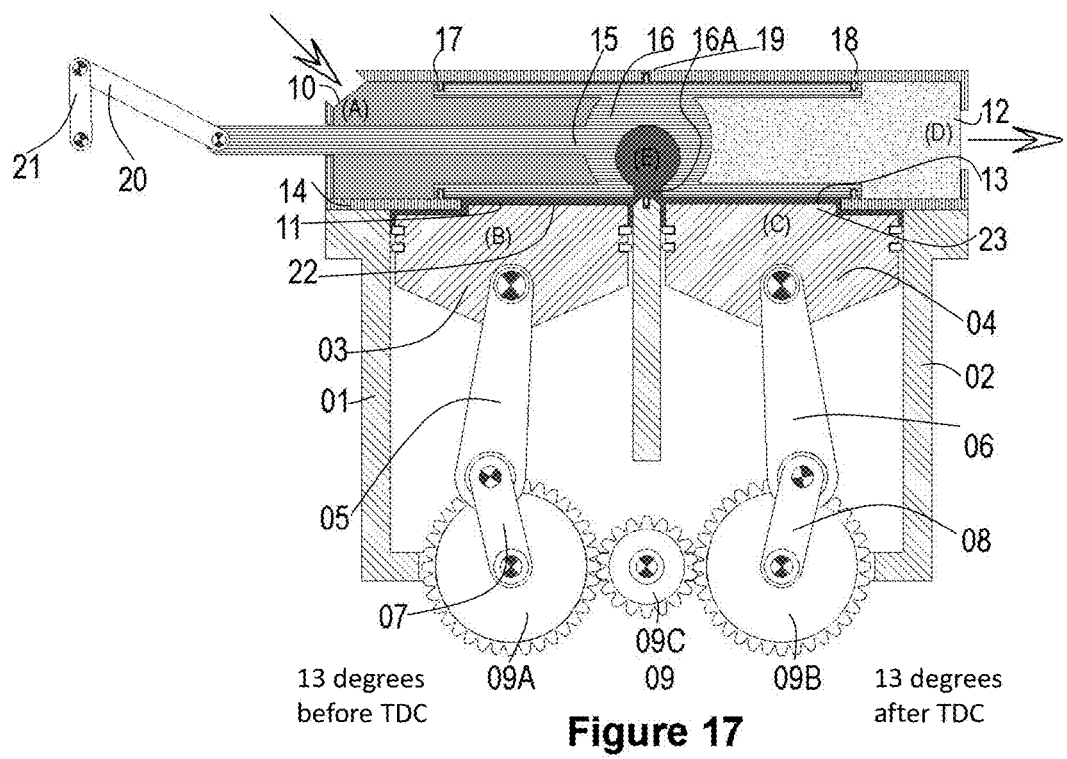
FIG. 17 is a simplified cross-sectional side view of the split-cycle SSCVCC apparatus of FIG. 1, wherein the compression crankshaft angle is illustrated at 13 degrees after its TDC, and the power crankshaft angle is illustrated at 13 degrees after its TDC, and the combustion chamber within the spool shuttle is smaller than the one shown in FIG. 1.
Figure 18:
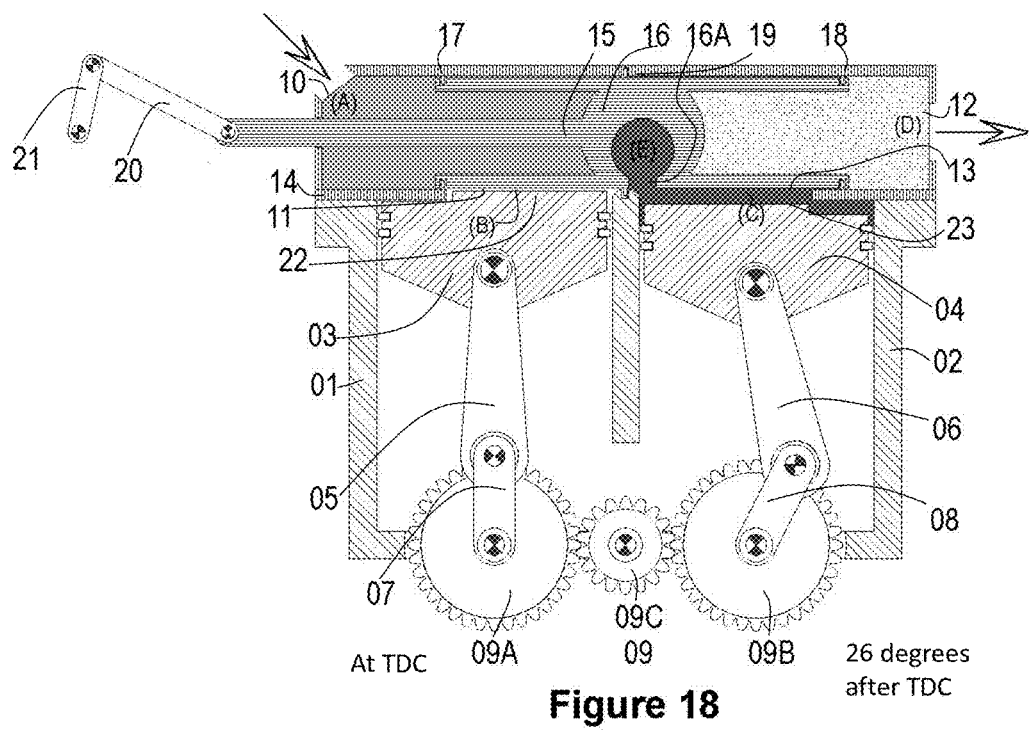
FIG. 18 is a simplified cross-sectional side view of the split-cycle SSCVCC apparatus of FIG. 1, wherein the compression crankshaft angle is illustrated at TDC, and the power crankshaft angle is illustrated at 26 degrees after its TDC, and the combustion chamber within the spool shuttle is smaller than the one shown in FIG. 1.

FIGS. 16-18 depicts another embodiment of a SSCVCC, in which all components are similar to the components depicted in FIGS. 1-15 (and are marked by the same numbers) aside from two modifications: The first modification is that the combustion chamber structure 16 and combustion chamber E volume are about a third, for example, in volume compared to the components depicted in FIGS. 1-15. For a given set of engine specifications, the sole reduction of combustion chamber structure 16 and combustion chamber E volumes may cause the engine to have a higher compression ratio. A higher compression ratio is desired when using fuels such as diesel and natural gas. In FIGS. 1-15, during engine operation, the vast majority of swept volume, which is induced during the intake stroke (FIGS. 6-12) is being compressed and transferred during the compression stroke (FIGS. 12-15 and 1-4) into chamber E (while compression piston 03 reaches its TDC with only a very small residual of working fluid in chamber B). Thus, reducing chamber E volume, for example by 50%, may almost double the compression ratio. However, the compression ratio may also be reduced by increasing the phase lag between the motions of the two pistons: The second modification depicted in FIGS. 16-18 relative to FIGS. 1-15 is that the phase lag between compression piston 03 and power piston 04 was increased to 26 degrees from 10 degrees, respectively. Thus, increasing the phase lag between the two pistons has the effect of reducing the compression ratio. Accordingly, both FIGS. 1-15 and FIGS. 16-18, as exemplary embodiments, have about the same compression ratio of 10 to 1. Thus, the volume reduction of combustion chamber structure 16 increased the compression ratio, while increasing the phase lag decreased the compression ratio. The combination of these two modifications (reduction of combustion chamber structure 16 and combustion chamber E volumes and modulation of the phase lag between the two pistons) may be useful in order to design an engine with variable compression ratio by either modulating the combustion chamber volume or the phase lag, for example.

Referring to FIG. 16, the same components are marked by the same numbers as in FIG. 3. In the exemplary embodiment depicted in FIG. 16, chamber E volume is about one third of chamber E volume in FIG. 3. In both FIG. 3 and FIG. 16 the power piston is at its TDC. In FIG. 16 the compression piston is 26 degrees crankshaft before its TDC while in FIG. 3 the compression piston is 10 degrees crankshaft before its TDC, thus FIG. 16 and FIG. 3 have a phase lag of 26 and 10 degrees crankshaft, respectively.

Referring to FIG. 17, the same components are marked by the same numbers as in FIG. 4. In FIG. 17 the power piston is at 13 degrees crankshaft after its TDC and the compression piston is 13 degrees crankshaft before its TDC. At the exemplary embodiment of FIG. 17, this is the point of maximum compression of the working fluid, which is also the point of minimum volume of the combined volume of chambers B, E and C. Notice that at this point chambers B, E and C are fluidly coupled and each chamber holds about one third of the compressed working fluid. As explained above, in some exemplary embodiments this is a preferred point for combustion to develop in order to add the combustion induced pressure to the compression pressure. FIG.

4 depicts the power piston is at 5 degrees crankshaft after its TDC and the compression piston is 5 degrees crankshaft before its TDC, and is also showing the point of maximum compression. However, decreasing the phase lag between the two pistons in the exemplary embodiment depicted in FIG. 4 may have little effect on the compression ratio as most of the working fluid is already compressed into chamber E, while decreasing the phase lag between the two pistons in the exemplary embodiment depicted in FIG. 17 could cause a significant increase in the compression ratio at chamber E, as it will force more working fluid from chambers B and C into the significantly smaller chamber E. Thus modulation of the phase lag at the exemplary embodiment of FIG. 17 may cause a modulation in the engine compression ratio. This could be an advantage when designing, for example, multi-fuel engines.

Referring to FIG. 18, the same components are marked by the same numbers as in FIG. 5 and both figures represent the end of the working fluid transfer process from chamber B via chamber E to Chamber C. In FIG. 18 the power piston is at 26 degrees crankshaft after its TDC and the compression piston is at TDC, while in FIG. 5 the power piston is at 10 degrees crankshaft after its TDC and the compression piston is at TDC.

Figures 19A, 19B:
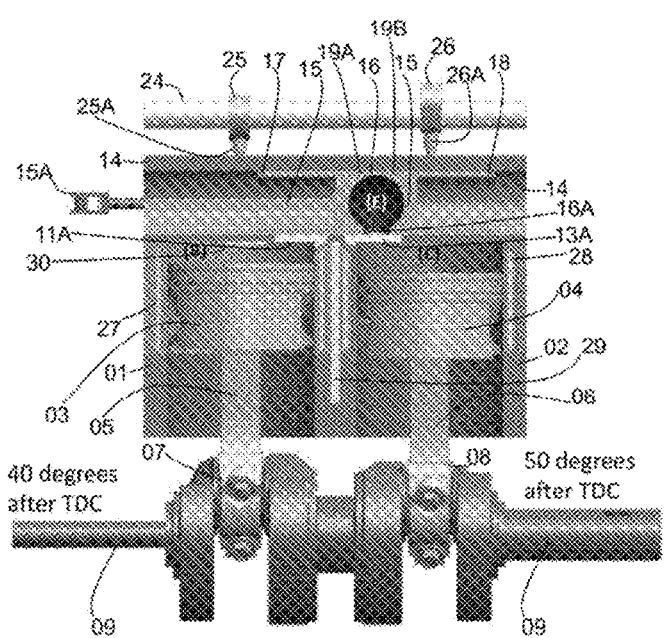
FIG. 19A is a simplified cross-sectional side view of a split-cycle SSCVCC apparatus, wherein the intake and exhaust ports on the compression and combustion chambers, respectively, are opened and closed by poppet valves, and the poppet valves are actuated by cams and a camshaft.
FIG. 19B is a transparent front view of a split-cycle SSCVCC apparatus of FIG. 19A.

FIG. 19A is a simplified cross-sectional side view of a split-cycle SSCVCC engine, wherein the intake and exhaust ports on the compression and combustion chambers, respectively, are opened and closed by poppet valves. The engine includes a compression piston 03 and a power piston 04, and a single crankshaft 09 drives the compression 03 and power 04 pistons via connecting rods (05 and 06, respectively), in accordance with an embodiment. The compression piston 03 is placed within the Cold-Cylinder 01 and forms the intake/compression chamber (B). The power piston 04 is placed within the Hot-Cylinder 02 and forms the expansion/exhaust chamber (C). The SSCVCC 15 is placed within its dedicated cylinder 14 and contains the combustion chamber (E). The SSCVCC 15 contains the combustion chamber (E) and is placed within its dedicated cylinder 14, which may also be referred to as valve chamber 14.

Compression cylinder output port 11A fluidly couples compression chamber (B) and the SSCVCC internal chamber (combustion chamber (E)). Expansion cylinder input port 13A fluidly couples expansion chamber (C) and the SSCVCC internal chamber (combustion chamber (E)). Sealing rings 17, 18, 19A, and 19B are positioned on the SSCVCC to seal the dedicated valve chamber 14 within the engine, and to seal chambers B, E and C from each other, excluding when their perspective ports align.

The SSCVCC is mechanically linked to the engine output by a connecting rod (not shown) through a connecting rod hook 15A. A common camshaft 24 with an intake cam 25 and an exhaust cam 26 actuates the intake valve (30) and an exhaust valve (not shown). To independently control the Cold- and Hot-Cylinder's respective wall temperatures, each has its own temperature regulated liquid cooling circuit (27 for the Cold-Cylinder and 28 for the Hot-Cylinder), as well as means to insulate the two cylinders from each other 29.

FIG. 19B is a transparent front view of compression cylinder of FIG. 19A, illustrating the location of the poppet valves relative to the SSCVCC. The poppet valves are located so that they do not interfere with the movement of the SSCVCC. Intake poppet valve head 30 is depicted in FIG. 19B unseated from intake poppet valve seat 31, that is, when the compression cylinder is performing its intake stroke. Rotation of crankshaft 24 causes intake valve cam 25 to move the intake valve stem 25A toward and away from compression chamber (B), seating and unseating intake valve head 30 from intake valve seat 31. In the exemplary engine of FIGS. 19A and 19B, the poppet valves are offset from center, but other arrangements are possible.

FIGS. 20-28 depicts another embodiment of a SSCVCC split-cycle engine, in which compression cylinder 101 and the power cylinder 102 are arranged in an opposed configuration (unlike FIGS. 1-18 in which the compression cylinder 01 and the power cylinder 02 are arranged in an in-line configuration). Although there are a number of similarities between the timing and positioning of components in FIGS. 1-18, a partial description of the operation of the opposed configuration SSCVCC split-cycle engine is repeated here for clarity.

Figure 20:
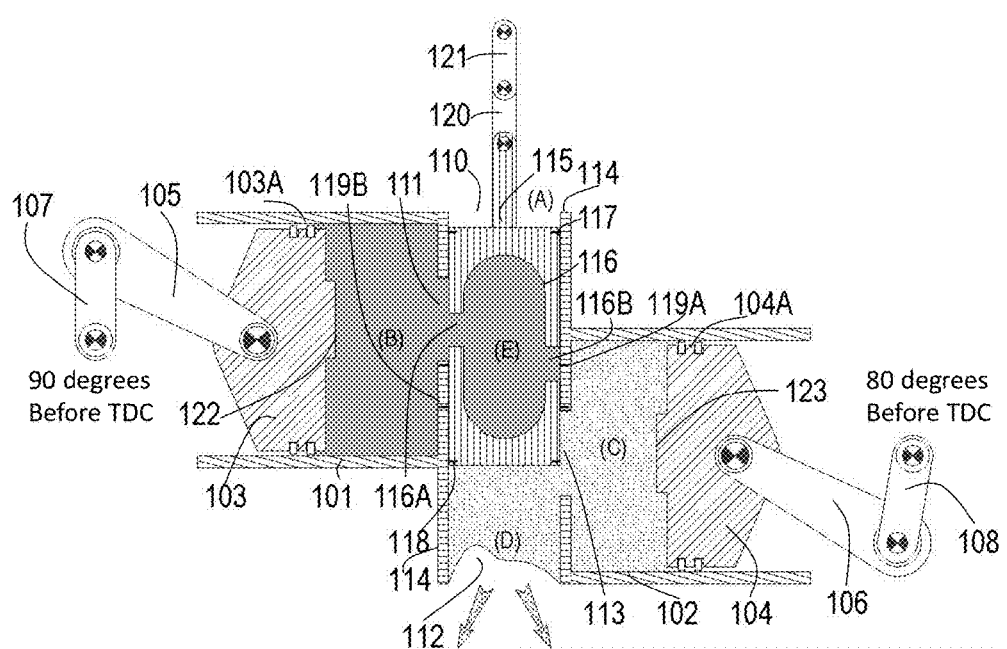
FIG. 20 is a simplified cross-sectional side view of an opposed split-cycle SSCVCC apparatus, in accordance with exemplary embodiments, wherein the compression crankshaft angle is illustrated at 90 degrees before the compression piston reaches its TDC and the power crankshaft angle is illustrated at 80 degrees before the power piston reaches its TDC, in accordance with an embodiment.

Referring to FIG. 20, in accordance with one embodiment, the opposed configuration SSCVCC split-cycle engine cylinder includes: a compression cylinder 101, a power cylinder 102, a compression piston 103, compression piston rings 103A, a power piston 104, power piston rings 104A, an intake/compression chamber B, and an expansion/exhaust chamber C. It also includes two respective piston connecting rods 105 and 106, a compression crankshaft 107 and a power crankshaft 108. A crankshaft connecting mechanism that connects power crankshaft 108 and a compression crankshaft 107 is not shown in FIGS. 20-28, but it could be, for example, a gear based mechanism similar to component 09 of FIGS. 1-18 or any other mechanical linkage mechanism, such as belts, connecting rods and chains. Still referring to FIG. 20, the split-cycle engine also includes an intake manifold 110, chamber A, an intake port 111, an exhaust manifold 112, chamber D, and an exhaust port 113. It also includes a spool cylinder 114, a spool shuttle 115, a combustion chamber 116, which is located within spool shuttle 115, a combustion chamber port 116A that may couple or decouple with compression cylinder 101, and combustion chamber port 116B that may couple or decouple with power cylinder 102. Still referring to FIG. 20, the SSCVCC split-cycle engine also includes a spool ring on the compression side 117, a spool ring on the expansion side 118, and two spool cylinder stationary (retracting) rings 119A and 119B, located in annular grooves of spool cylinder 114 close to intake port 111 and exhaust port 113, respectively. Still referring to FIG. 20, the split-cycle engine also includes a spool connecting rod 120 and a spool crankshaft 121, a compression piston protrusion 122 and a power piston protrusion 123. The compression cylinder 101 is a piston engine cylinder that houses the compression piston 103, the intake or compression chamber B, and the intake port 111. The power cylinder 102 is a piston engine cylinder that houses the power piston 104, the expansion or exhaust chamber C and the exhaust port 113. The compression piston 103 and compression chamber B serves the intake and the compression engine strokes (but not the exhaust stroke). The power piston 104 and expansion chamber C serves the power and the exhaust strokes (but not the intake stroke). The connecting rods 105 and 106 connect their respective pistons to their respective crankshafts. The compression crankshaft 107 converts rotational motion into compression piston 103 reciprocating motion. The reciprocating motion of the power piston 104 is converted into rotational motion of the power crankshaft 108, which is converted to engine rotational motion or work (e.g., the power crankshaft may also serve as the engine output shaft). The crankshaft connecting mechanism (not shown) translates the rotation of power crankshaft 108 into rotation of the compression crankshaft 107. Both compression piston 103 and power piston 104 may have or may not have irregular structure or protrusion 122 and 123, respectively. The function of these protrusions may be to decrease the dead space. In an exemplary embodiment, the spool cylinder 114 houses the spool shuttle 115 and both are placed perpendicular to both compression cylinder 101 and power cylinder 102 that are opposing each other. Spool connecting rods 120 connect spool shuttle 115 to spool crankshaft 121. Spool crankshaft 121 converts rotational motion into spool shuttle 115 reciprocating motion. Spool crankshaft 121 is connected via a mechanical linkage mechanism to power crankshaft 108, thus power crankshaft 108 drives spool crankshaft 121. In another exemplary embodiment, a swash plate mechanism or a camshaft mechanism could be used to drive spool shuttle 115, for example. Spool shuttle 115 houses an oval (could be spherical or other shape) combustion chamber structure 116, combustion chamber structure ports 116A and 116B, and combustion chamber E. During spool shuttle 115 reciprocating motion, combustion chamber E alternates between being fluidly connected to compression chamber B and expansion chamber C. During a portion of spool 115 reciprocating motion, combustion chamber E may be fluidly connected to both compression chamber B and expansion chamber C.

During spool shuttle 115 reciprocating motion, intake port 111 may open or close as spool shuttle 115 blocks or unblocks intake port 111. Thus, spool shuttle 115 reciprocating motion fluidly couples or decouples chamber A and chamber B.

During spool shuttle 115 reciprocating motion, exhaust port 113 may open or close as spool shuttle 115 blocks or unblocks exhaust port 113. Thus, spool shuttle 115 reciprocating motion fluidly couples or decouples chamber C and chamber D.

During spool shuttle 115 reciprocating motion, combustion chamber structure 116, via combustion chamber port 116A, may be fluidly couple or decouple from chamber B.

During spool shuttle 115 reciprocating motion, combustion chamber structure 116, via combustion chamber port 116B, may be fluidly couple or decouple from chamber C.

For a small predetermined portion of spool crankshaft 121 cycle, ±30 degrees, for example, from the point in which spool shuttle 115 reciprocating motion passes through its mid stroke point, chambers B, E and C may be all fluidly connected via combustion chamber ports 116A and 116B.

In exemplary embodiments, a predetermined phase delay is introduced via the crankshafts 107 and 108, such that power piston 104 leads or follows compression piston 103. FIGS. 20-28 depicts one such exemplary embodiment in which the predetermined phase delay that is introduced via the crankshafts 07 and 08 such that power piston 104 leads compression piston 103 by 10 degrees crank angle.

In exemplary embodiments, the working fluid (air-fuel charge) resides between intake manifold 110 and port 111 in chamber A. The intake port 111, located on the compression cylinder 101, may govern the flow of the naturally aspirated ambient air or the carbureted air/fuel charge, or forced induction of the charge, into the compression cylinder 101. The location of the compression piston 103 when the intake port opens and/or closes may vary. In some exemplary embodiments, the timing of the opening and/or closing of the intake port may vary. In one example, the intake port may open within the range of a few crankshaft degrees before the compression piston 103 reaches its TDC through approximately 50 crankshaft degrees after the compression piston 103 reaches its TDC. In one example, the intake port may close within the range of a few crankshaft degrees around compression piston 103 BDC through approximately 70 crankshaft degrees after the compression piston 103 reaches its BDC.

In one embodiment, the intake port may open in a range of crankshaft degrees starting when compression piston 103 reaches its TDC through approximately 10 crankshaft degrees after the compression piston 103 reaches its TDC. At BDC, which is the end of the intake stroke, working fluid may continue to enter the cylinder due to the wave dynamics in the intake system and fluid inertia. For this reason it is may be advantageous to close the intake port after the compression piston BDC. In one embodiment, the intake port 111 may close within the range of a few crankshaft degrees before the compression piston 103 reaches its BDC until approximately 70 crankshaft degrees after the compression piston 103 reaches its BDC. In one example, the intake port may close within a narrower range starting when compression piston 103 reaches its BDC until approximately 50 crankshaft degrees after the compression piston 103 reaches its TDC.

In exemplary embodiments, the exhaust port 111 located on the power cylinder 102 may govern the exhalation of burned gases. The location of the power piston 104 when the exhaust port opens may vary. In some exemplary embodiments, the exhaust port may open approximately 60 crankshaft degrees before power piston 104 reaches its BDC through approximately 20 crankshaft degrees after power piston 104 reaches its BDC. The location of the power piston 104 when the exhaust port closes may also vary. In some exemplary embodiments, the exhaust port may close approximately 15 crankshaft degrees before power piston 104 reaches its TDC until approximately 5 crankshaft degrees after power piston 104 reaches its TDC.

In one embodiment, the exhaust port may open within a range starting when power piston 104 reaches its BDC until approximately 30 crankshaft degrees after the power piston 104 reaches its BDC. In one embodiment, the exhaust port may close within a narrower preferred range starting 5 degrees before power piston 104 reaches its TDC through approximately when power piston 104 reaches its TDC.

In one embodiment, the spool cylinder 114 houses the spool shuttle 115 and both are placed perpendicular to both compression cylinder 101 and power cylinder 102. The spool connecting rods 120 connect spool shuttle 115 to spool crankshaft 121. The spool crankshaft 121 converts rotational motion into spool shuttle 115 reciprocating motion. Spool shuttle 115 houses an oval (for example) combustion chamber structure 116, combustion chamber structure ports 116A and 116B, and combustion chamber E. During spool shuttle 115 reciprocating motion, combustion chamber E alternates between being fluidly connected to compression chamber B and/or expansion chamber C. During the same spool shuttle 115 reciprocating motion, intake port 111 and exhaust port 113 may move toward open or close positions.

The detailed description of the thermodynamic cycle of the SSCVCC split-cycle engine in-line configuration (FIGS. 1-15) is very similar to the thermodynamic cycle of the SSCVCC split-cycle engine opposed configuration, and therefore the principles and valve timings described for the in-line configuration may apply to the opposed configuration as well.

The detailed description of the thermodynamic cycle of the SSCVCC split-cycle engine in-line configuration depicted in FIGS. 1-15 is very similar to the thermodynamic cycle of the SSCVCC split-cycle engine opposed configuration, depicted in FIGS. 20-28 and therefore the principles and valve timings described for the in-line configuration may apply to the opposed configuration as well.

The description of the effects of the reduction of combustion chamber E volume and modulation of the phase lag for the SSCVCC split-cycle engine in-line configuration (FIGS. 16-18) may apply to the SSCVCC split-cycle engine opposed configuration as well (FIGS. 20-28).

Figure 21:
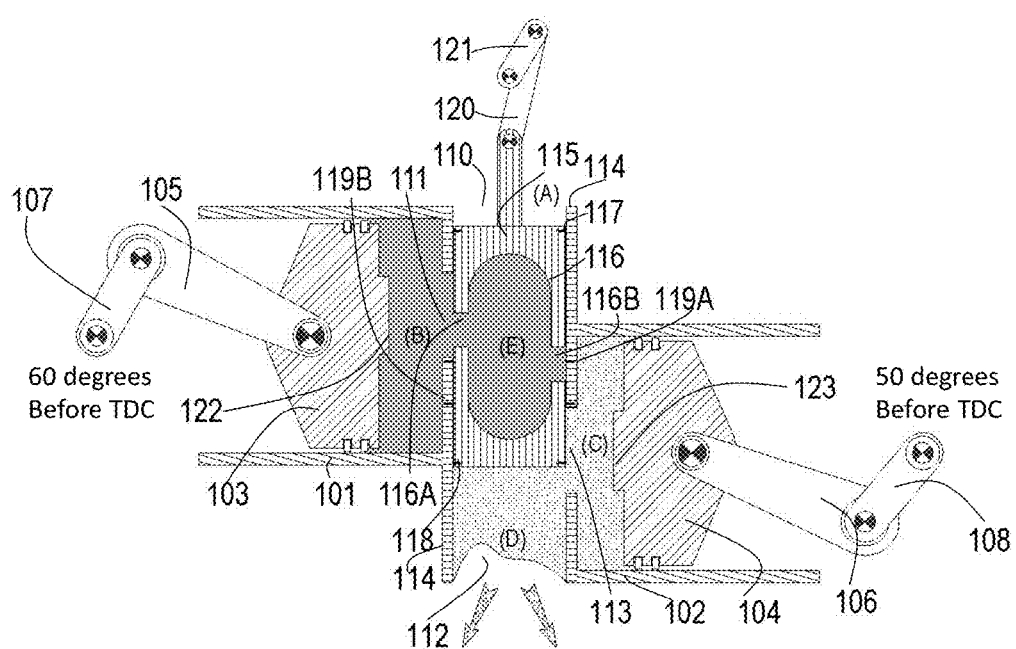
FIG. 21 is a simplified cross-sectional side view of the split-cycle SSCVCC apparatus of FIG. 20, wherein the compression crankshaft angle is illustrated at 60 degrees before its TDC and the power crankshaft angle is illustrated at 50 degrees before the power piston reaches its TDC.
Figure 22:
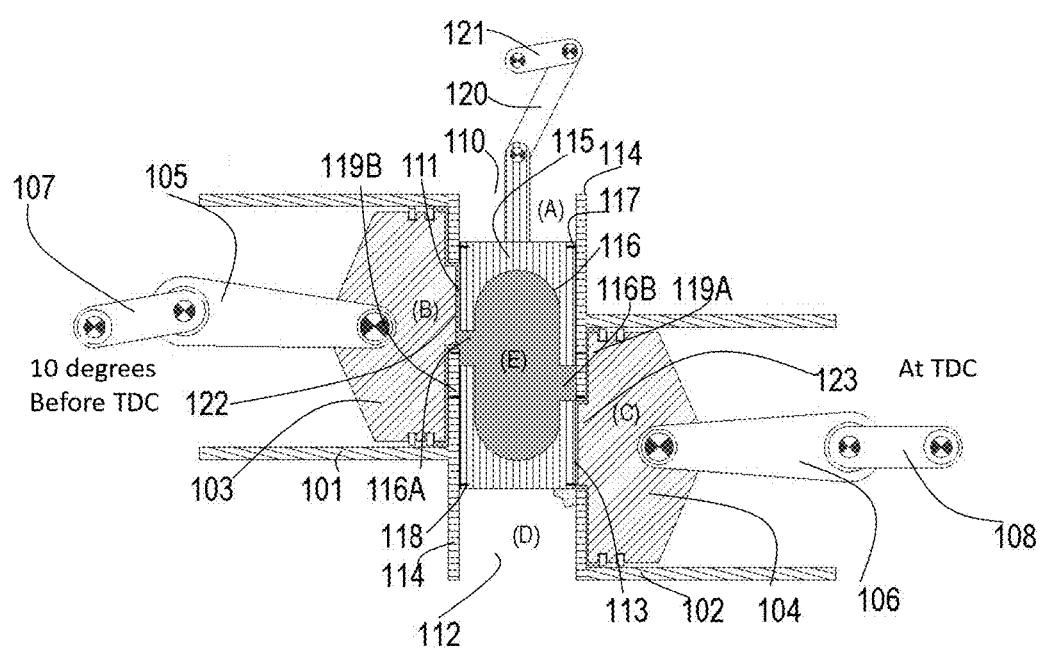
FIG. 22 is a simplified cross-sectional side view of the split-cycle SSCVCC apparatus of FIG. 20, wherein the compression crankshaft angle is illustrated at 10 degrees before its TDC and the power crankshaft angle is illustrated at its TDC.
Figure 23:
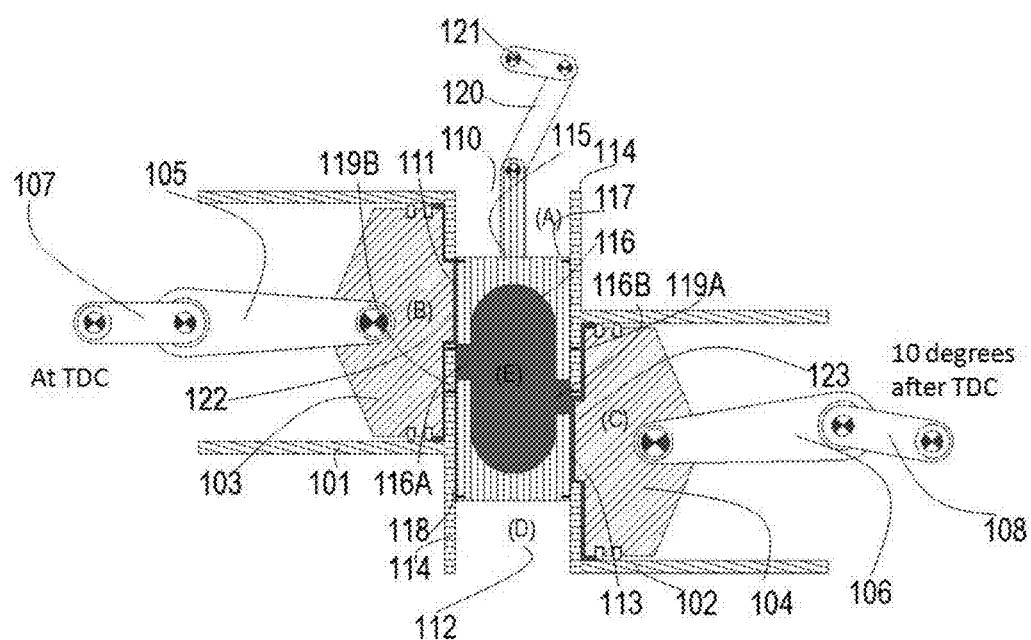
FIG. 23 is a simplified cross-sectional side view of the split-cycle SSCVCC apparatus of FIG. 20, wherein the compression crankshaft angle is illustrated at its TDC and the power crankshaft angle is illustrated at 10 degrees after the power piston reaches its TDC.
Figure 24:
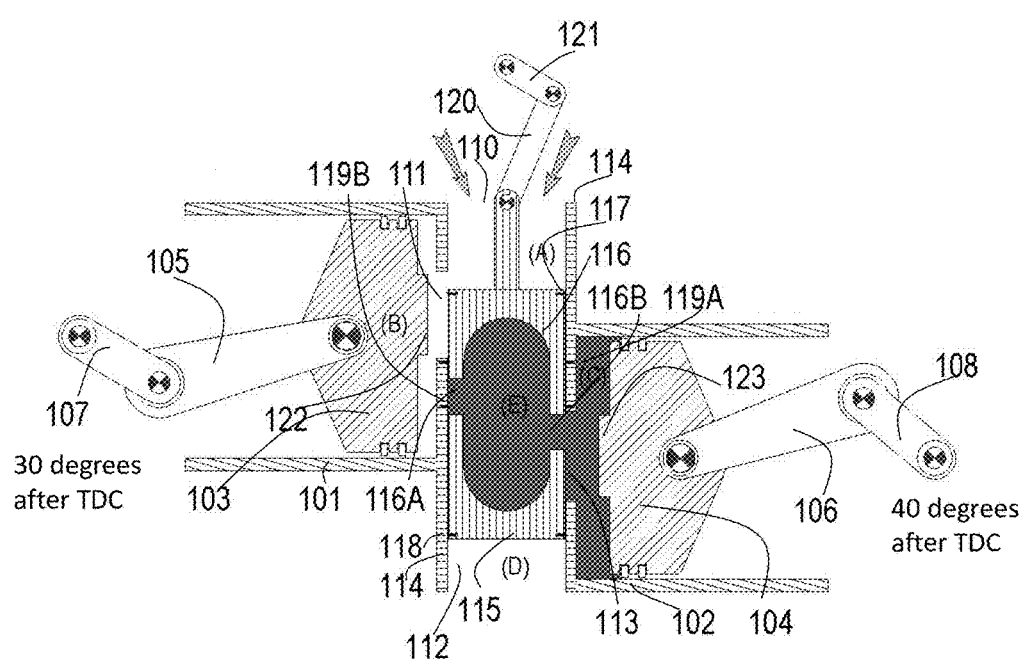
FIG. 24 is a simplified cross-sectional side view of the split-cycle SSCVCC apparatus of FIG. 20, wherein the compression crankshaft angle is illustrated at 30 degrees after the power piston reaches its TDC and the power crankshaft angle is illustrated at 40 degrees after the power piston reaches its TDC.
Figure 25:
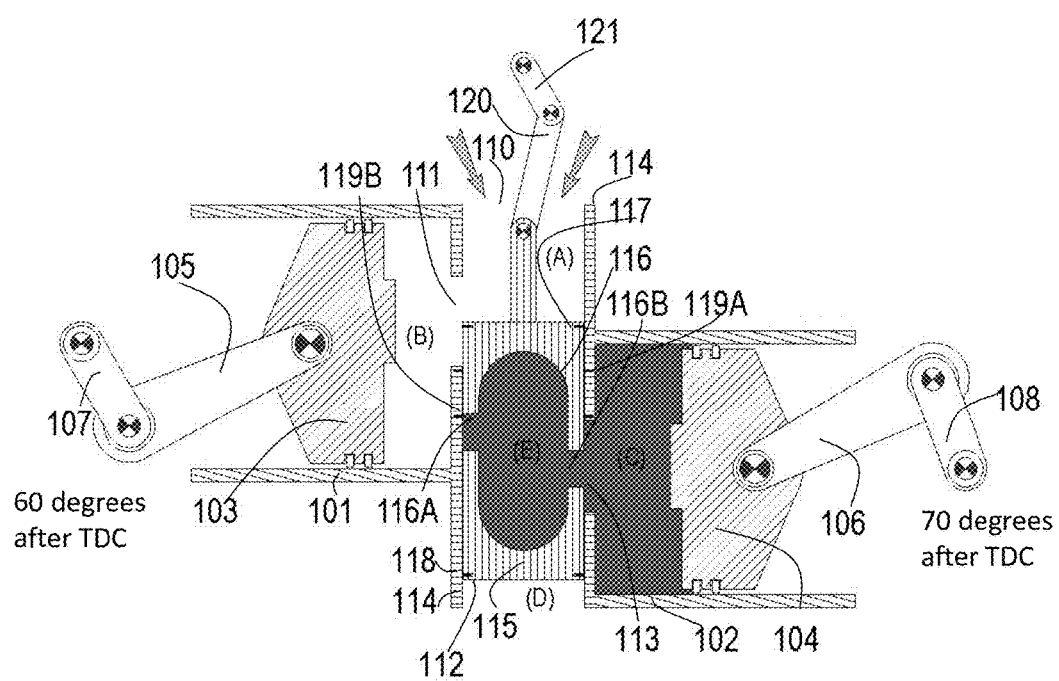
FIG. 25 is a simplified cross-sectional side view of the split-cycle SSCVCC apparatus of FIG. 20, wherein the compression crankshaft angle is illustrated at 60 degrees after the power piston reaches its TDC and the power crankshaft angle is illustrated at 70 degrees after the power piston reaches its TDC.
Figure 26:
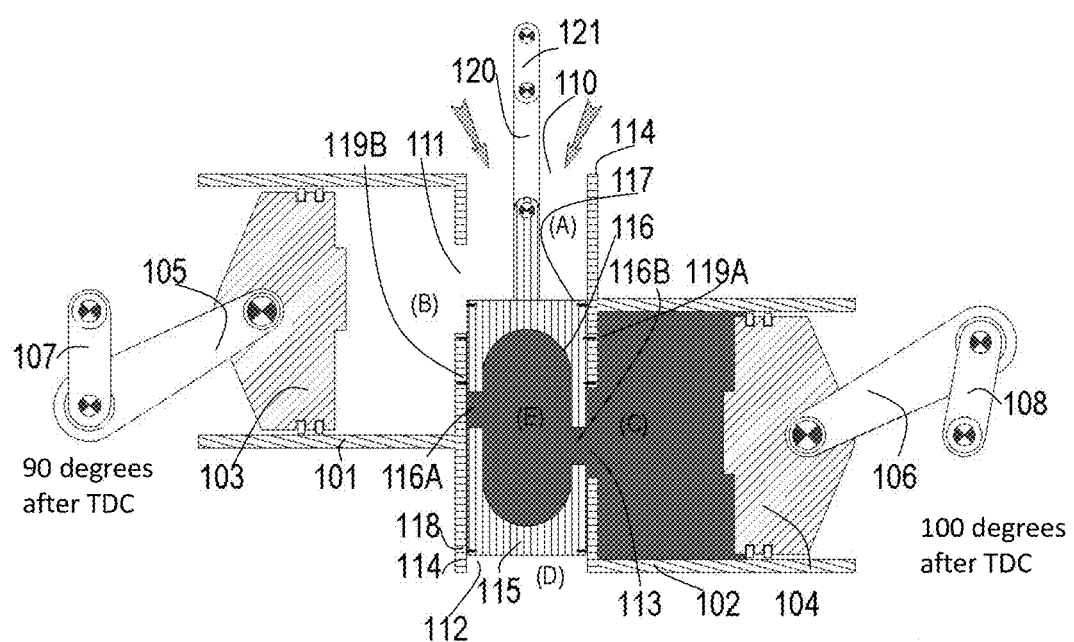
FIG. 26 is a simplified cross-sectional side view of the split-cycle SSCVCC apparatus of FIG. 20, wherein the compression crankshaft angle is illustrated at 90 degrees after the power piston reaches its TDC and the power crankshaft angle is illustrated at 100 degrees after the power piston reaches its TDC.
Figure 27:
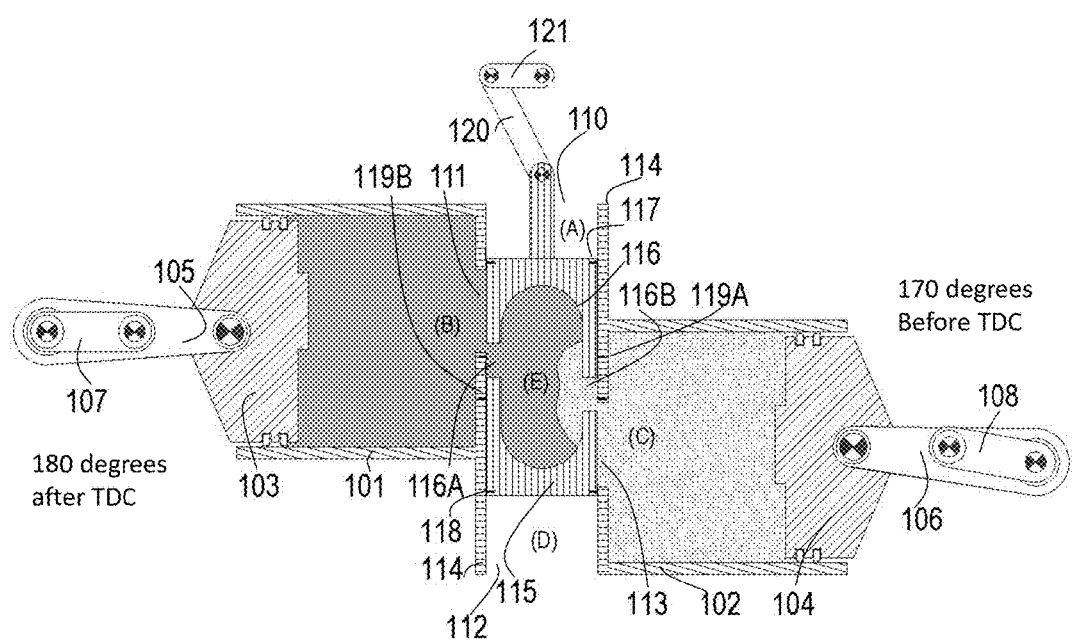
FIG. 27 is a simplified cross-sectional side view of the split-cycle SSCVCC apparatus of FIG. 20, wherein the compression crankshaft angle is illustrated at 180 degrees after the power piston reaches its TDC and the power crankshaft angle is illustrated at 170 degrees before the power piston reaches its TDC.
Figure 28:
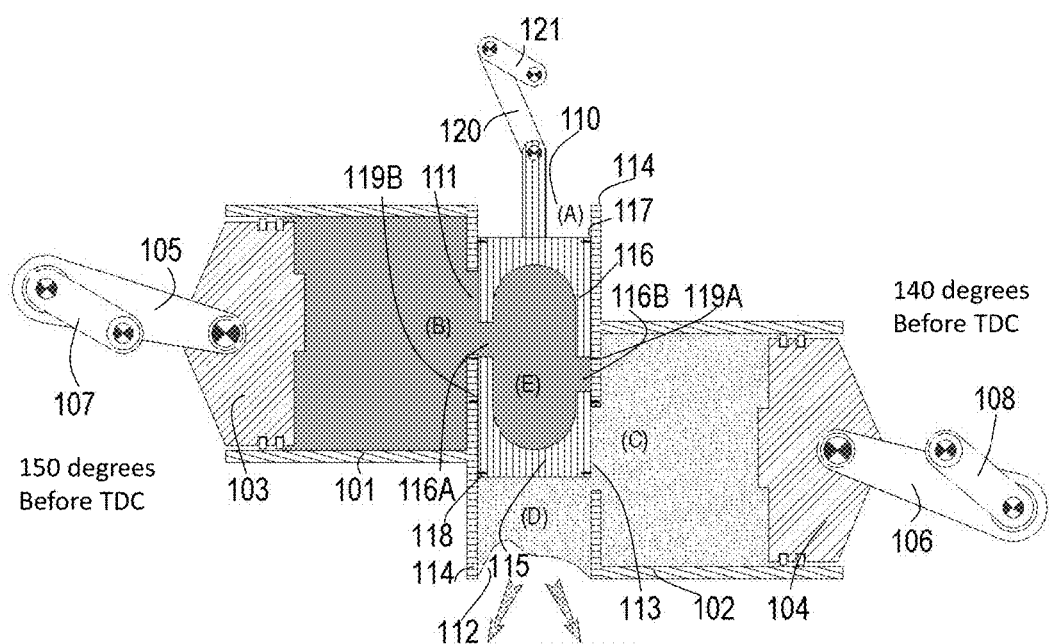
FIG. 28 is a simplified cross-sectional side view of the split-cycle SSCVCC apparatus of FIG. 20, wherein the compression crankshaft angle is illustrated at 150 degrees before the power piston reaches its TDC and the power crankshaft angle is illustrated at 140 degrees before the power piston reaches its TDC.

Referring again to FIG. 20, the SSCVCC may generally include spool cylinder 114, spool shuttle 115, combustion chamber 116, which is located within the spool shuttle 115, combustion chamber ports 116A and 116B, spool ring on the compression side 117, spool ring on the expansion side 118, spool cylinder stationary (retracting) rings 119A and 119B, spool connecting rod 120 and spool crankshaft 121. When used in the embodiments of FIGS. 20-28, the SSCVCC may separate compression chamber B and combustion chamber C. In this situation each chamber may include regions of different fluid pressure. The movement of spool shuttle 115 within spool cylinder 114 may allow the coupling or decoupling of fluid communication between chamber B and chamber C via chamber E. During the compression stroke, as illustrated in FIGS. 28, 20 and 21, the SSCVCC position within spool cylinder 114 may prevent high pressure fluid transfer from compression chamber B into power chamber C as the working fluid of the compression stroke is being restricted from passing laterally through the gaps between spool cylinder 114 and spool shuttle 115 due to spool ring 117 and spool cylinder retracting (stationary) rings 119A and 119B. During the compression stroke (FIGS. 28, 20 and 21) the working fluid is being transferred from chamber B to chamber E. Once chamber E contains the vast majority of compressed working fluid, during spool shuttle 115 reciprocating motion, combustion chamber E first couples chamber B with chamber C such that chambers B, E and C are fluidly coupled (FIGS. 22 and 23), followed by the decoupling of chamber B (FIG. 24) from chamber E and C. In one exemplary embodiment, at this part of crankshaft 108 cycle (FIG. 24), both the intake stroke (of the next cycle) begins in cylinder 101 and the power stroke continues in power cylinder 102. The SSCVCC position within spool cylinder 114 may prevent high pressure fluid transfer from power chamber C into compression chamber B as the working fluid at the power stroke is being restricted from passing laterally through the gaps between spool cylinder 114 and spool shuttle 115 due to spool ring 118 and spool cylinder retracting (stationary) rings 119A and 119B. The power stroke is depicted in FIGS. 22-26, in which the combusted working fluid in chamber E is expanding in both chamber E and chamber C (via combustion chamber port 116B). As illustrated in FIG. 27, exhaust port 113 is just about to open and as illustrated in FIG. 28 exhaust port 113 is already open and the burnt gases exhale (and chamber C high pressure diminishes). The exhaust stroke is depicted in FIGS. 28 and 20-22, in which the already expanded combusted working fluid is exhausted from chamber C via exhaust port 113 and exhaust manifold 112 (and potentially other apparatus) to ambient point D. The intake stroke is depicted in FIGS. 24-26 and ends in FIG. 27, in which the next quantum of working fluid is induced into chamber B via intake port 111. Once intake port 111 closes, (FIG. 27), the compression stroke is depicted in FIGS. 28 and 20-21, in which the next portion of working fluid is being compressed from chamber B into chamber E via combustion chamber port 116A.

The SSCVCC split-cycle engine divides the strokes performed in conventional internal combustion engines by a single piston and cylinder into two thermally differentiated cylinders in which each cylinder executes half of the four-stroke cycle. A relatively "cold" cylinder executes the intake and compression, but not the exhaust stroke, and a "hot" cylinder executes the combustion and exhaust, but not the intake stroke. A SSCVCC split-cycle engine opposed configuration, as depicted in FIGS. 20-28 for an exemplary embodiment, may more easily implement thermally differentiated cylinders compared to a SSCVCC split-cycle engine in line configuration (as depicted in FIGS. 1-15 for an exemplary embodiment), while the packaging of an SSCVCC split-cycle engine in line configuration is more conventional compared to an SSCVCC split-cycle engine opposed configuration.

FIGS. 29-34 depict another embodiment of a SSCVCC split-cycle engine, in which compression cylinder 201 and the power cylinder 202 are arranged in an opposed configuration (similar to FIGS. 20-28 in which the compression cylinder 101 and the power cylinder 102 are arranged in an opposed configuration, but unlike FIGS. 1-18 in which the compression cylinder 01 and the power cylinder 02 are arranged in an in-line configuration). The embodiment depicted in FIGS. 29-34 may enable an implementation of a near ideal thermodynamic process by completely separating the compression, combustion and expansion phases, as will be explained below. Although there are a number of similarities between the timing, mode of operation, and positioning of components in the embodiment described in FIGS. 20-28 and the embodiment described in FIGS. 29-34, a partial description of the embodiment depicted in FIGS. 29-34 is provided here for clarity with a focus on the differences between the two embodiments. FIGS. 29-34 does not describe the complete engine operation but rather focus on the unique way by which the compressed working fluid may be transferred, combusted and expanded, in this exemplary embodiment.

Figure 29:
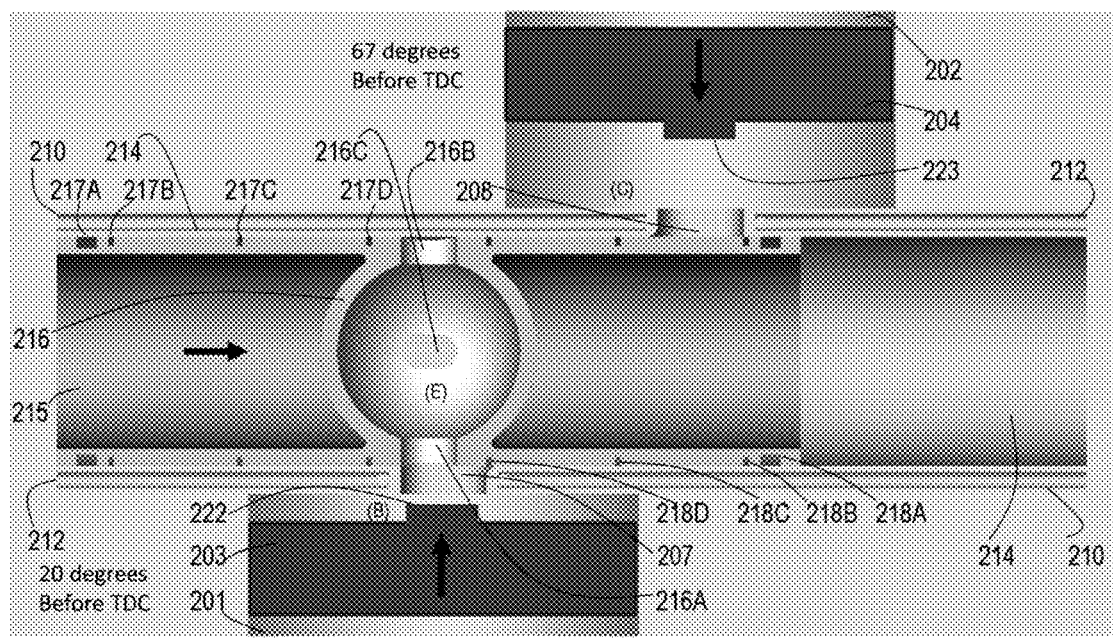
FIG. 29 is a simplified cross-sectional side view of an opposed split-cycle SSCVCC apparatus, in accordance with exemplary embodiments, wherein the compression crankshaft angle is illustrated at 20 degrees before the compression piston reaches its TDC and the power crankshaft angle is illustrated at 67 degrees before the power piston reaches its TDC.
Figure 30:
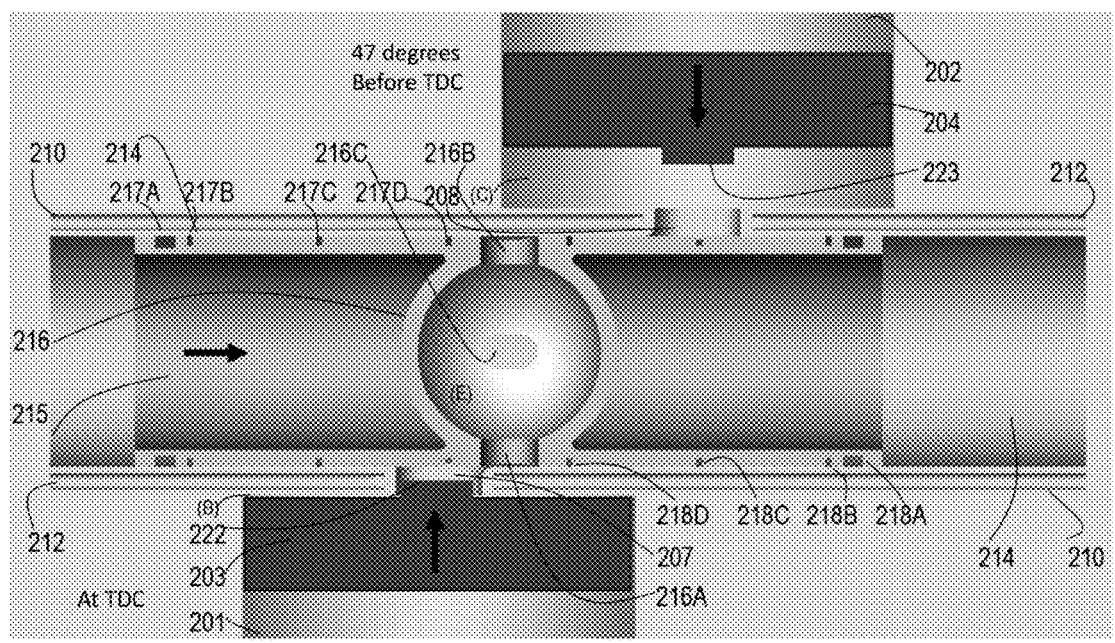
FIG. 30 is a simplified cross-sectional side view of the split-cycle SSCVCC apparatus of FIG. 29, wherein the compression crankshaft angle is illustrated at TDC and the power crankshaft angle is illustrated at 47 degrees before the power piston reaches its TDC.
Figure 31:
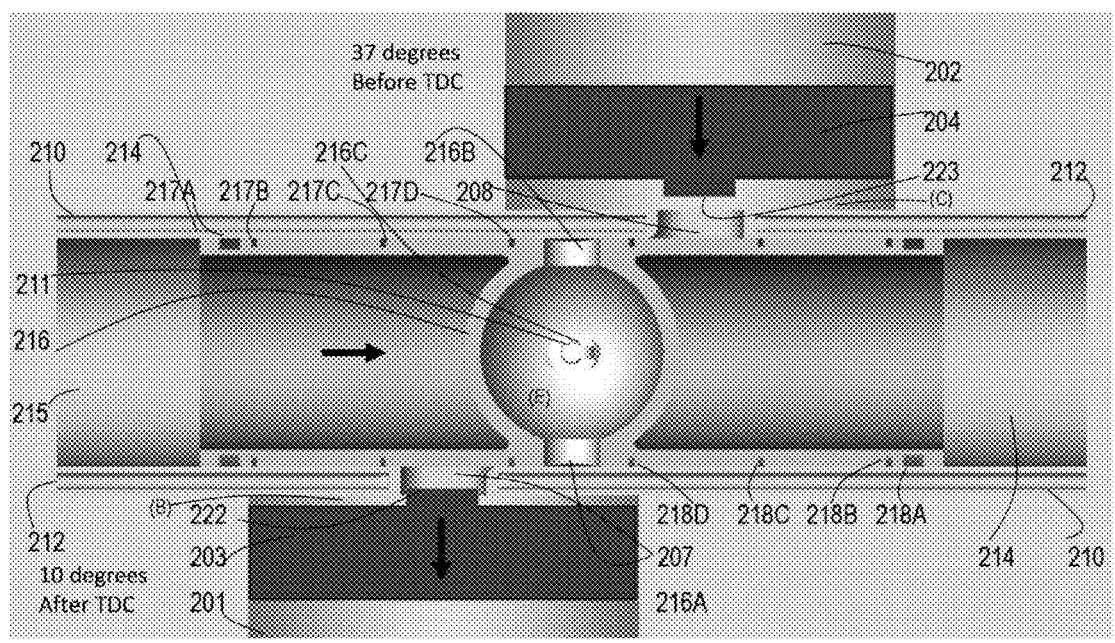
FIG. 31 is a simplified cross-sectional side view of the split-cycle SSCVCC apparatus of FIG. 29, wherein the compression crankshaft angle is illustrated at 10 degrees after the compression piston reaches its TDC and the power crankshaft angle is illustrated at 37 degrees before the power piston reaches its TDC.

Referring to FIG. 29, in accordance with one embodiment, the opposed configuration SSCVCC split-cycle engine cylinder includes: a compression cylinder 201, a power cylinder 202, a compression piston 203 (the black arrow represents the direction of the piston 203 movement), a power piston 204 (the black arrow represent the direction of the piston 204 movement), an compression chamber B, and an expansion chamber C, a compression port 207 and an expansion port 208. The design also include the following components that are not depicted in FIG. 29 but are similar in structure and function to the corresponding components that are depicted in FIGS. 1-28: Two respective piston connecting rods, a compression crankshaft and a power crankshaft, a crankshaft connecting mechanism that connects the power crankshaft, a compression crankshaft, an intake poppet valve and an exhaust poppet valve (the intake and exhaust poppet valves are depicted in FIG. 34 as components 205 and 206, respectively), a spool connecting rod and a spool crankshaft. Still referring to FIG. 29, the split-cycle engine also includes a spool cylinder 214, a spool shuttle 215 (the black arrow represent the direction of the spool shuttle 215 movement), a combustion chamber 216, which is located within spool shuttle 215, a combustion chamber port 216A that may couple or decouple with compression cylinder 201, and combustion chamber port 216B that may couple or decouple with power cylinder 202 and combustion chamber port 216C that may couple or decouple with a spark plug (the spark plug is not shown in FIG. 29 but is shown as component 211 in FIGS. 31 and 34). Still referring to FIG. 29, the SSCVCC split-cycle engine also includes the following rings on the part of the spool which is closer to compression cylinder 201: A lateral spool oil control ring 217A, a spool compression ring 217B, which is located more central than oil control ring 217A but in close proximity to spool oil control ring 217A, a second more central spool compression ring 217C, and a third spool compression ring 217D in relative close proximity to combustion chamber ports 216A and 216B. Still referring to FIG. 29, the SSCVCC split-cycle engine also includes the following rings on the part of the spool which is closer to expansion cylinder 202: A lateral spool oil control ring 218A, a spool compression ring 218B, which is located more central than oil control ring 218A but in close proximity to spool oil ring 218A, a second more central spool compression ring 218C and a third spool compression ring 218D in a relative close proximity to combustion chamber ports 216A and 216B, but on the opposite side of ports 216A and 216B relative to spool compression ring 217D. Still referring to FIG. 29, the SSCVCC split-cycle engine also employs a compression piston protrusion 222 and a power piston protrusion 223. The compression cylinder 201 is a piston engine cylinder that houses compression piston 203, compression chamber B, and intake valve (the intake valve is not shown in FIG. 29 but is shown as component 205 in FIG. 34). The power cylinder 202 is a piston engine cylinder that houses power piston 204, expansion chamber C and the exhaust valve (the exhaust valve is not shown in FIG. 29 but is shown as component 206 in FIG. 34). The compression piston 203 and compression chamber B serves the intake and the compression engine strokes. The power piston 204 and expansion chamber C serves the power and the exhaust strokes. The connecting rods connect their respective pistons to their respective crankshafts (not shown). The compression crankshaft converts rotational motion into compression piston reciprocating motion (not shown). The reciprocating motion of the power piston 204 is converted into rotational motion of the power crankshaft, which is converted to engine rotational motion or work (not shown; e.g., the power crankshaft may also serve as the engine output shaft and may actuate spool shuttle 215). The crankshaft connecting mechanism (e.g. gear train, chain drive, belt drive, etc.) translates the rotation of power crankshaft into rotation of the compression crankshaft (not shown). Both compression piston 203 and power piston 204 may have or may not have irregular structure or protrusion 222 and 223, respectively. The function of these protrusions may be to decrease the dead space. In an exemplary embodiment, the spool cylinder 214 houses the spool shuttle 215 and both are placed perpendicular to both compression cylinder 201 and power cylinder 202 that are opposing each other. A spool connecting rod (not shown) connects spool shuttle 215 to a spool crankshaft (not shown). The spool crankshaft (not shown) converts rotational motion into spool shuttle 215 reciprocating motion. Spool crankshaft is connected via a mechanical linkage mechanism (e.g. gear train, chain drive, belt drive, etc.) to the power crankshaft, thus the power crankshaft drives the spool crankshaft (not shown). Spool shuttle 215 houses a spherical (could be oval or any other shape) combustion chamber structure 216, combustion chamber structure ports 216A, 216B, and 216C, and combustion chamber E. At one exemplary embodiment depicted in FIGS. 29-34, during spool shuttle 215 reciprocating motion, combustion chamber E alternates between being fluidly coupled or decoupled to compression chamber B and expansion chamber C. During spool shuttle 215 reciprocating motion, in the exemplary embodiments depicted in FIGS. 29-34, combustion chamber E may also be fluidly decoupled from both compression chamber B and expansion chamber C for a limited portion of the cycle (as shown in FIG. 31). In other exemplary embodiments, during spool 215 reciprocating motion, combustion chamber E may or may not be fluidly connected to both compression chamber B and expansion chamber C (similar to the embodiment depicted in FIGS. 1-28).

Referring to FIGS. 29-33, during spool shuttle 215 reciprocating motion, chamber E and combustion chamber structure 216, via combustion chamber port 216A and compression port 207, may be fluidly coupled or decoupled from chamber B.

Referring to FIGS. 29-33, during spool shuttle 215 reciprocating motion, combustion chamber E and combustion chamber structure 216, via combustion chamber port 216B, may be fluidly coupled or decoupled from chamber C.

Referring to FIGS. 29-33, during spool shuttle 215 reciprocating motion, combustion chamber structure 216, via combustion chamber port 216C, may be directly exposed or unexposed to a spark plug (the spark plug is not shown in FIG. 29 but is shown as component 211 in FIGS. 31 and 34).

For a small predetermined portion of spool crankshaft cycle, ±30 degrees, for example, from the point in which spool shuttle 215 reciprocating motion passes through its mid stroke point, chambers E may be decoupled from both chamber B and C and may have combustion initiated and developed solely in chamber E. The combustion may continue to develop and occur in both chamber E and chamber C once they are fluidly coupled.

In exemplary embodiments, predetermined phase delay is introduced via the compression piston and the power piston crankshafts, such that power piston 204 leads or follows compression piston 203. FIGS. 29-33 depicts one such exemplary embodiment in which the predetermined phase delay that is introduced via the compression piston and the power piston crankshafts, is such that compression piston 203 leads the power piston 204 by 47 degrees crank angle.

In exemplary embodiments, the intake valve (the intake valve is not shown in FIG. 29 but is shown as component 205 in FIG. 34) is composed of a shaft having a conically shaped sealing surface, as is commonly known in the art as a poppet valve. The intake valve, located on the compression cylinder 201, controls the flow of the naturally aspirated ambient air, or the carbureted air/fuel charge, or forced induction of the charge, into the compression cylinder 201. The compression cylinder 201 has at least one intake valve. In some exemplary embodiments, the intake valve location, relative to the position of compression piston 203, function, and operation may be similar or identical to the intake valves of conventional four-stroke internal combustion engines. The location of the compression piston 203 when the intake valve opens and/or closes may vary. In some exemplary embodiments, the timing of the opening and/or closing of the intake valve may vary. In one example, the intake valve may open within the range of a few crankshaft degrees before the compression piston 203 reaches its TDC until approximately 40 crankshaft degrees after the compression piston 203 reaches its TDC. In one example, the intake valve may close within the range of a few crankshaft degrees after the compression piston 203 reaches its BDC until approximately 70 crankshaft degrees after the compression piston 203 reaches its BDC.

In one embodiment, the intake valve may open when compression piston 203 reaches its TDC through approximately 10 crankshaft degrees after the compression piston 203 reaches its TDC. At BDC, which is the end of the intake stroke, working fluid continues to enter the cylinder due to the inertia of the charge. For this reason it is may be advantageous to close the intake valve after the compression piston BDC. In one embodiment, the intake valve may close within the range of a few crankshaft degrees before the compression piston 203 reaches its BDC until approximately 70 crankshaft degrees after the compression piston 203 reaches its BDC. In one example, the intake valve may close within a narrower range starting when compression piston 203 reaches its BDC until approximately 50 crankshaft degrees after the compression piston 203 reaches its TDC.

In exemplary embodiments, the exhaust valve (the exhaust valve is not shown in FIG. 29 but is shown as component 206 in FIG. 34) is composed of a shaft having a conically shaped sealing surface, as is commonly known in the art as a poppet valve. The exhaust valve, located on the power cylinder 202 may govern the exhalation of burned gases. The power cylinder 202 has at least one exhaust valve. In some exemplary embodiments, the exhaust valve location, function and operation may be similar or identical to exhaust valves of conventional four-stroke internal combustion engines. The location of the power piston 204 when the exhaust valve opens may vary. In some exemplary embodiments, the exhaust valve may open approximately 60 crankshaft degrees before power piston 204 reaches its BDC until approximately 20 crankshaft degrees after power piston 204 reaches its BDC. The location of the power piston 204 when the exhaust valve closes may also vary. In some exemplary embodiments, the exhaust valve may close approximately 15 crankshaft degrees before power piston 204 reaches its TDC until approximately 5 crankshaft degrees after power piston 204 reaches its TDC.

In one embodiment, the exhaust valve may open within a range starting when power piston 204 reaches its BDC until approximately 30 crankshaft degrees after the power piston 204 reaches its BDC. In one embodiment, the exhaust valve may close within a narrower preferred range starting 5 degrees before power piston 04 reaches its TDC until approximately when power piston 204 reaches its TDC.

In one embodiment, the spool cylinder 214 houses the spool shuttle 215 and both are placed perpendicular to both compression cylinder 201 and power cylinder 202. The spool connecting rods connect spool shuttle 215 to a spool crankshaft. The spool crankshaft converts rotational motion into spool shuttle 215 reciprocating motion. Spool shuttle 215 houses a spherical (for example) combustion chamber structure 216, combustion chamber structure ports 216A, 216B, 216C, and combustion chamber E. During spool shuttle 215 reciprocating motion, combustion chamber E alternates between being fluidly connected to compression chamber B or expansion chamber C.

Figure 32:
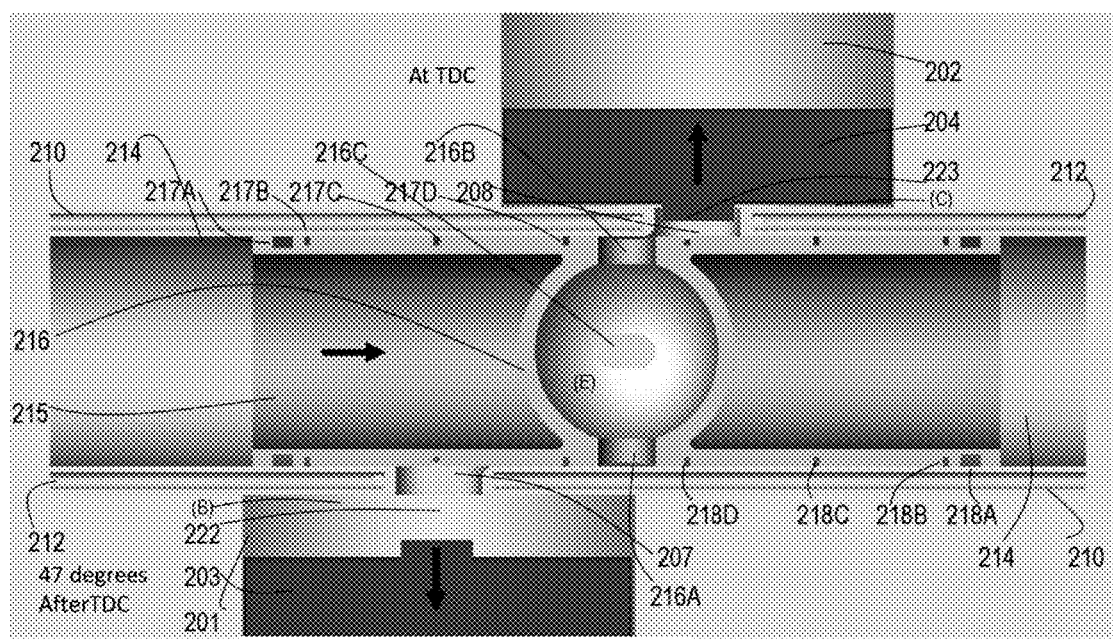
FIG. 32 is a simplified cross-sectional side view of the split-cycle SSCVCC apparatus of FIG. 29, wherein the compression crankshaft angle is illustrated at 47 degrees after the compression piston reaches its TDC and the power crankshaft angle is illustrated at TDC.
Figure 33:
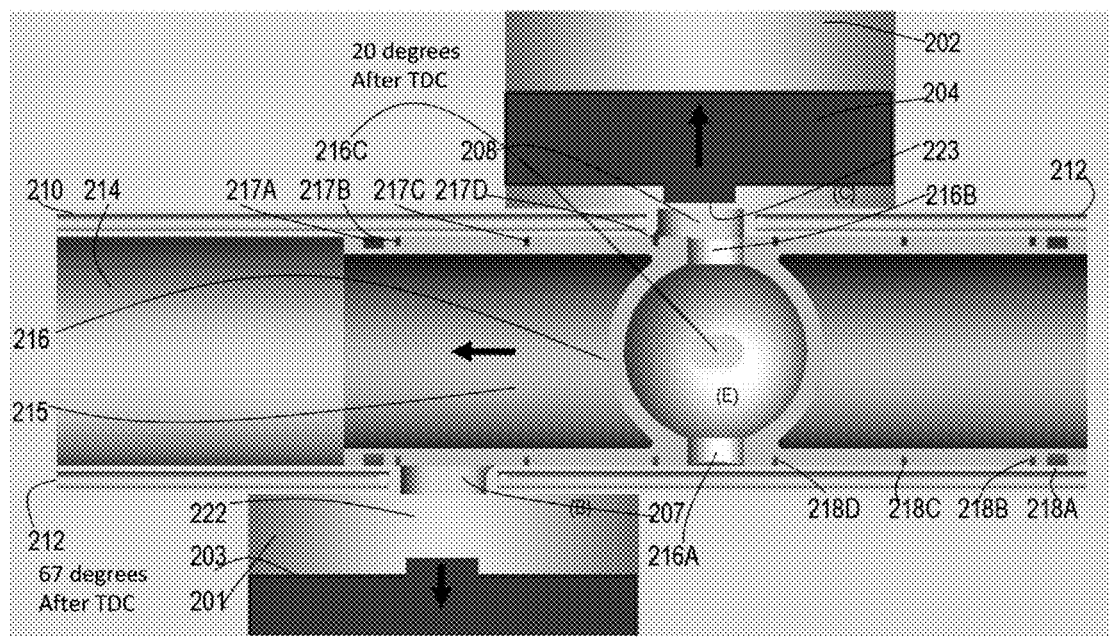
FIG. 33 is a simplified cross-sectional side view of the split-cycle SSCVCC apparatus of FIG. 29, wherein the compression crankshaft angle is illustrated at 67 degrees after the compression piston reaches its TDC and the power crankshaft angle is illustrated at 20 degrees after the power piston reaches its TDC.
Figure 34:
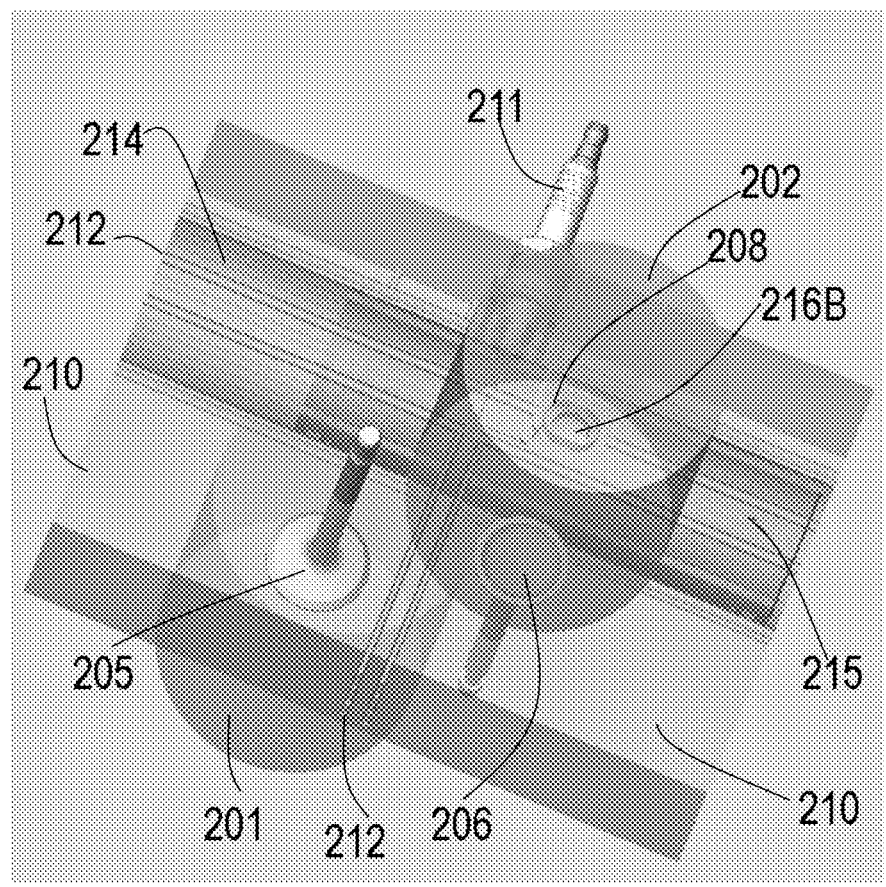
FIG. 34 is a simplified semi transparent 3D view of the split-cycle SSCVCC apparatus of FIG. 33.

Referring again to the embodiment of FIGS. 29-33, which depict in more detail the portion of the SSCVCC cycle that includes the transfer of the working fluid from chamber B via chamber E to chamber C. Referring to FIG. 29, the SSCVCC may separate compression chamber B and combustion chamber C, such that each chamber may include regions of different working fluid pressure. During the compression stroke the working fluid is being transferred from chamber B to chamber E. A few crankshaft degrees before compression piston 203 reaches TDC (FIG. 29), spool shuttle 215 position within spool cylinder 214 may prevent high pressure fluid transfer from compression chamber B into power chamber C due to spool ring 218C. As compression piston 203 reaches its TDC (FIG. 30), which is the end of the compression stroke, almost the entire compressed working fluid is transferred from chamber B to chamber E via compression port 207 and combustion chamber port 216A. Spool shuttle 215 position within spool cylinder 214 may prevent high pressure fluid transfer from compression chamber B and chamber E into expansion chamber C due to spool ring 218D. This is because that at the time compression piston 203 is at TDC (FIG. 30) the compressed working fluid is being restricted from passing laterally through the gaps between spool cylinder 214 and spool shuttle 215 due to spool ring 218D and spool ring 217C. Once chamber E contains the vast majority of compressed working fluid, during spool shuttle 215 continued reciprocating motion (FIG. 31), combustion chamber E decouples from chamber B due to spool ring 217D, while still being decoupled from chamber C, due to spool ring 218D. Thus, chamber E contains the vast majority of compressed working fluid that may be ignited by spark plug 211, which is located on spool cylinder 214 and is in alignment with combustion chamber port 216C (FIG. 31). In one exemplary embodiment, at this part of the cycle (FIG. 31), the intake stroke of the next cycle begins in cylinder 201 as the intake valve opens (not shown) and compression piston 203 starts its movement toward its BDC. Also, at this part of the cycle (FIG. 31), power piston 204 is getting closer to its TDC, pushing the final portion of the burnt working fluid through the open exhaust valve (not shown). Following that, once the power piston reaches its TDC (FIG. 32) the exhaust valve closes (not shown). During spool shuttle 215 continued reciprocating motion (black arrow) chamber E is coupled to chamber C via combustion chamber port 216B and expansion port 208, as depicted in FIG. 32. Consequently, the combusting working fluid is expanded in both chamber E and chamber C, which increases its volume due to power piston 204 movement away from its TDC (black arrow on piston 204). The undesired transfer of high pressure working fluid from combustion chamber E and power chamber C back into compression chamber B is being restricted due to spool ring 217D (FIG. 32). Spool ring 218C restricts undesired leakage of high pressure working fluid from combustion chamber E and power chamber C laterally through the gaps between spool cylinder 214 and spool shuttle 215. The beginning of the power stroke is depicted in FIGS. 32 and 33, in which the combusted working fluid is chamber E is expanding in both chamber E and chamber C (via combustion chamber port 216B and expansion port 208). FIGS. 32 and 33 depict also the continued intake stroke, in which the next load of working fluid is induced into chamber B.

The description of the portion of the SSCVCC thermodynamic cycle that includes first the transfer of the working fluid from chamber B to chamber E, and only after chamber E decouples from chamber B the working fluid is transferred, as a second step, from chamber E to chamber C, is provided above for the exemplary embodiment depicted in FIGS. 29-33. For this exemplary embodiment, the rest of the engine cycle (the continuation of the intake stroke followed by a compression stroke in cylinder 201 and the continuation of the power stokes followed by an exhaust stroke in cylinder 202) may be similar to the thermodynamic cycles and processes depicted in FIGS. 1-28.

FIG. 34 is a 3D drawing in accordance with one embodiment (that is also depicted in FIGS. 29-33 in 2D) that depicts a way to arrange the SSCVCC together with conventional intake and exhaust poppet valves. FIG. 34 depicts only a partial selection of the embodiment components which includes: a compression cylinder 201, a power cylinder 202, an intake poppet valve 205, an exhaust poppet valve 206, an expansion port 208, and an engine connecting plate 210, which serves as a cylinder head for both cylinders. Still referring to FIG. 34, the split-cycle engine also includes a spark plug 211, several connecting plate cooling channels 212 (in which oil or coolant is being circulated), a spool cylinder 214, a spool shuttle 215, a combustion chamber located within spool shuttle 215 (not shown) and combustion chamber port 216A. The engine connecting plate 210 also serves as the engine head for both compression cylinder 201 and power cylinder 202. The engine connecting plate 210 also houses spool cylinder 214 and spool shuttle 215.

FIG. 34 depicts combustion chamber port 216B in full alignment with expansion port 208, which enable the coupling of combustion chamber E with power chamber C. FIG. 34 depicts in 3D the same part of the engine cycle that is depicted in 2D in FIG. 33, in which the combusted working fluid in chamber E is expanding in both chamber E and chamber C.

FIG. 34 also depicts, in accordance with one embodiment, a way to arrange the spool cylinder 214 and spool shuttle 215 together with conventional intake and exhaust poppet valves 205 and 206, respectively. Connecting plate 210 may, for example, house spool cylinder 214 and spool shuttle 215 in such a way that they cover only half of compression cylinder 201 and power cylinder 202 heads. This may allow spool shuttle 215 reciprocating motion to couple or decouple combustion chamber ports 216A and 216B with compression port 207 and expansion port 208, respectively. The remaining half of compression cylinder 201 head, which is not covered by spool cylinder 214, may house intake valve 205. The remaining half of power cylinder 202 head, which is not covered by spool cylinder 214, may house exhaust valve 206. The exemplary embodiment depicted in FIGS. 29-34 describes the complete decoupling of chambers B, E and C into three separate chambers, during a finite crank angle interval (the transfer of the working fluid from compression cylinder 01 to power cylinder 02). This may be used to implement a thermodynamic cycle with true isochoric combustion in chamber E. If, in addition, chamber E may be constructed from materials of low thermal conductivity (e.g. ceramics), the resulting thermodynamic cycle closely approximates the ideal adiabatic cycle which is known to maximize thermal efficiency. After compression piston 203 reaches TDC, the working fluid almost completely resides within chamber E. As the spool shuttle 215 continues to travel towards the power cylinder 202 (FIGS. 30 and 31), chamber E decouples from the compression cylinder (chamber B). At this point, ignition may be initiated (via sparkplug 211 through spark plug port 216C) while the spool shuttle 215 continues to travel towards the power cylinder (chamber C). If combustion completes (or almost completes) before spool shuttle 215 reaches expansion port 208 (FIG. 32), then the combustion closely approximates isochoric combustion. If combustion does not complete before spool shuttle 215 reaches expansion port 208, then combustion continues in both chamber E and chamber C.

The SSCVCC split-cycle engine and the exemplary embodiments depicted in FIGS. 1-34 divides the strokes performed by a single piston and cylinder of conventional internal combustion engines into two thermally differentiated cylinders in which each cylinder executes half of the four-stroke cycle. A relatively "cold" cylinder executes the intake and compression, but not the exhaust stroke, and a thermally insulated "hot" cylinder executes the combustion (or part of the combustion) and exhaust, but not the intake stroke. Chamber E may be thermally insulated as well. Compared to conventional engines, this advantageous system may enable the split-cycle engine to work at higher combustion chamber wall temperatures and at lower intake and compression chamber wall temperatures. Utilizing higher combustion chamber wall temperatures reduces engine cooling requirements while maintaining lower intake and compression chamber wall temperatures lowers compression energy requirements, and thus boost engine efficiency. Additionally, thermally insulating chamber E (combustion chamber structures 16, 116, and 216 from the external environment) and the power cylinder, according to exemplary embodiments, may reduce external heat losses and thus enables a larger portion of the fuel heat energy to be converted into useful work. The power cylinder may be thermally insulated or may not be thermally isolated.

The SSCVCC split-cycle engine and the exemplary embodiments depicted in FIGS. 1-34 may use exhaust heat capture and heat reutilization during exhaust, in accordance with some exemplary embodiments (not shown; further details are described within U.S. Pat. No. 7,273,023, the disclosure of which is incorporated by reference herein in its entirety). The exhaust gas travels through passages, thereby conducting heat back into the power cylinder walls. Passages may circumvent the chamber in a helical manner, travelling the length of the chamber and back again to the ambient exhaust. The power cylinder 01, 101, and 201 may also utilize an external isolation cover 38 (e.g., honeycomb structure or equivalent), which prevents heat leakage. Meanwhile, compression cylinder 02, 102 and 202 temperatures may be reduced by utilizing heat diffusers (cooling fins if air-cooled).

The SSCVCC split-cycle engine and the exemplary embodiments depicted in FIGS. 1-34 may be designed to have improved efficiency by having the first cylinder smaller than the second cylinder (not shown; Further details are described within U.S. Patent 2010/0186689 A1 the disclosure of which is incorporated by reference herein in its entirety), in accordance with exemplary embodiments. Greater volume in power cylinder 02, 102 and 202 (the second cylinder) relative to compression cylinder 01, 101 and 201 (the first cylinder) enables a larger expansion ratio than compression ratio, respectively. The added expansion volume enables additional conversion of heat and pressure to mechanical work. A larger expansion ratio than compression ratio may greatly increase engine efficiency in an internal combustion engine, similar to Miller and Atkinson cycles performed in conventional engines, for example. Having a larger expansion ratio than compression ratio could be better design with split-cycle engines than in conventional engines as the size and shape of each cylinder (both the compression cylinder and expansion cylinder) could be designed independently of each other.

The SSCVCC split-cycle engine and the exemplary embodiments depicted in FIGS. 1-34 may be designed to have supercharged capabilities, in accordance with exemplary embodiments (not shown; further details are described within U.S. Patent 2010/0186689 A1 the disclosure of which is incorporated by reference herein in its entirety). Accordingly, the volume of the compression cylinder is designed to be larger than the volume of power cylinder, thereby allowing a greater volume of air/fuel mixture to be received and compressed in the compression chamber B. During the compression stroke, the larger volume and increased pressure of compressed air/fuel mixture (i.e., "supercharged" fuel mixture) in the compression chamber B is transferred into the combustion chamber C via chamber E. Alternatively, when using direct injection, a greater amount of fuel may be injected into the combustion chamber C of the power cylinder. Both approaches provide more power and torque (higher power density), during the power stroke.

Figure 35:
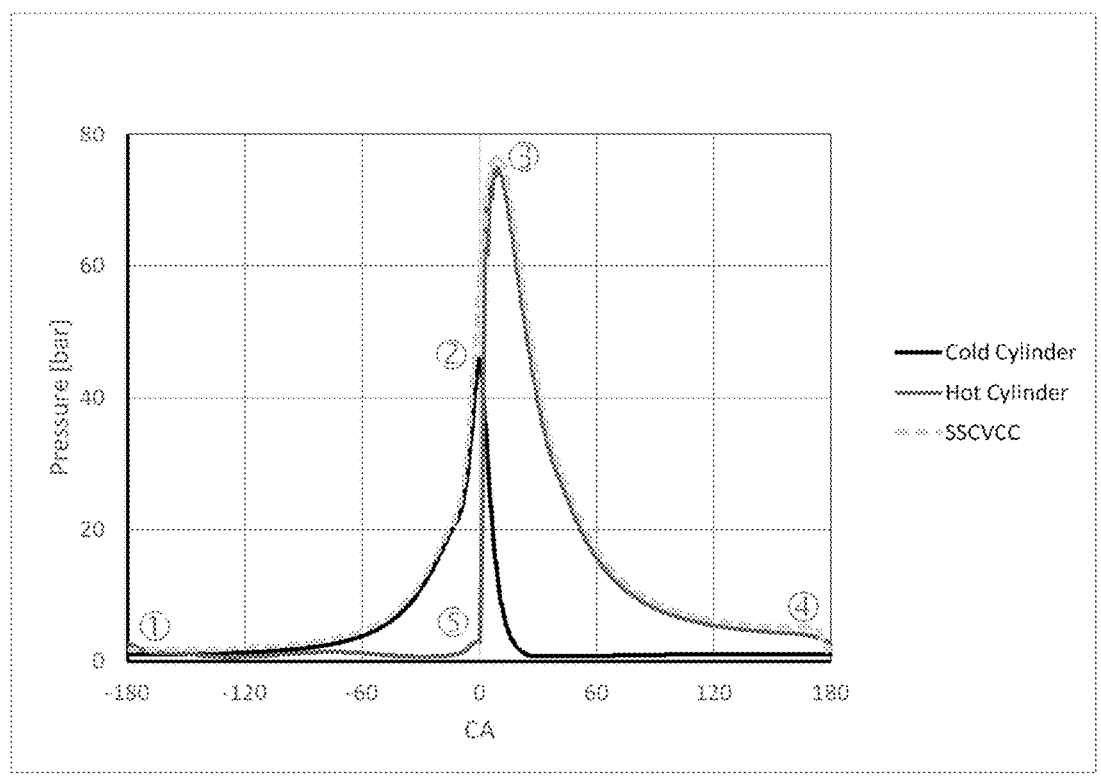
FIG. 35 is a graph illustrating pressure profiles for an exemplary split-cycle engine incorporating a SSCVCC.

FIG. 35 is a graph illustrating pressure profiles for an exemplary split-cycle engine incorporating a SSCVCC. A simulation was performed for an engine with zero phase-lag and each cylinder having a capacity of 500 cc. The engine was operated at 2400 RPM during a single cycle. The pressure (unit: bar) is represented on the y-axis and crankshaft angle is represented along the x-axis. The pressures in each of the Hot-Cylinder or power chamber (dark gray line), Cold-Cylinder or compression chamber (black line), and SSCVCC (gray dashed line) are represented on the graph.

The thermodynamic cycle is also represented: the compression stroke of the Cold-Cylinder is depicted by the black line between points 1 and 2 and the gray dashed line represents the pressure in the SSCVCC which is fluidly connected with the Cold-Cylinder during this part of the cycle; combustion within the SSCVCC and the Hot-Cylinder is depicted by the gray dashed line and dark gray line between points 2 and 3; expansion (power stroke) of the combusting working fluid in the SSCVCC, while being fluidly coupled to the Hot-Cylinder is depicted by the light gray dashed line and dark gray line between points 3 and 4; The intake stroke of the next cycle is shown by the black line between points 2 and 4; and, the exhaust stroke is shown by the dark gray line between points l and 5.

It should be noted that, for clarity, the gray dashed line (SSCVCC pressure) has been shifted upward slightly so that it does not overlap other lines in FIG. 35. However, the gray dashed line between points 1 and 2 is the same as the black line (cold cylinder) and between points 3 and 4 is the largely the same as the dark gray line.

Referring again to FIG. 35, the pressure in the Cold-Cylinder is low at 180 crankshaft degrees (point 1) and slowly rises as the compression stroke continues. At point 2, the compression stroke is almost complete and the working fluid has been transferred to the SSCVCC. After 0 crankshaft degrees, the compression piston moves away from top dead center and the pressure within the Cold-Cylinder begins to drop quickly. The intake valve/port opens and working fluid is being drawn in during this period.

Referring again to FIG. 35, the pressure in the Hot-Cylinder is also low at −180 crankshaft degrees (point 1) and continues to stay low during the exhaust phase and until the hot cylinder is fluidly coupled to the SSCVCC (point 5). At or before that point, the exhaust valve/port closes. At that point (point 5), the pressure in the Hot-Cylinder suddenly rises as the compressed fluid in the SSCVCC fills the available combustion chamber volume. As the SSCVCC couples with the Hot-Cylinder (point 2), compressed and combusted working fluid fills any small volume existing (Chamber C) in the Hot-Cylinder, when the power piston is in its top dead center. Combustion occurs at point 2 and onward, the pressure within the SSCVCC and the Hot-Cylinder continues to rise due to the expansion of the working fluid. The power stroke begins at point 3 and pressure drops until the combustion piston reaches bottom dead center (point 4). The exhaust valve/port may open at point 4.

A negligible pressure drop across the SSCVCC ports is demonstrated by the closely matching yellow dashed curve and blue curve in FIG. 35 (while the SSCVCC input port is aligned with the compression cylinder output port; between points 1 and 2), and while the SSCVCC output port is open and coupled with the expansion cylinder input port (between points 3 and 4) as seen by the closely matching red and yellow dashed curves. The output SSCVCC port is the same port as the SSCVCC input port in an inline configuration (FIG. 1-19) and a second input port in an opposed configuration (FIGS. 20-33). Accordingly, using an SSCVCC may not cause substantial pressure loss and may ensure the efficient transfer of the compressed intake charge from the Cold-Cylinder to the Hot-Cylinder. One of skill in the art will also notice that the split-cycle engine in FIG. 35 closely emulates the thermodynamic cycle of traditional 4-stroke engines (integrated cycle), with no energy losses (due to the transfer of the working fluid between Cold- and Hot-Cylinder) that may be suffered by prior art split-cycle engines.

The pressure profile of FIG. 35 is offered for exemplary purposes. It should be noted that these curves may change when using different cylinders size. For example, the curves may be different when implementing a split-cycle engine having a larger expansion ratio than compression ratio, with the area under the curve between points 3 and 4 increasing, indicating higher efficiency.

Minimizing the dead volume may be beneficial in split-cycle engines in general and in split-cycle engine with a SSCVCC, in particular. In a typical split-cycle engine there are at least 3 potential instances of dead volume, and for ease of description the current SSCVCC split-cycle engine design will be used as an example. The 3 potential instances of dead volume are: 1) When compression piston 03 is at its TDC (FIG. 5), any residual volume at chamber B is considered dead volume since it will hold compressed working fluid that would not be transferred to chambers E and C to participate in the power (combustion) stroke; 2) When power piston 04 is at its TDC (FIG. 3), any residual volume at chamber C is considered dead volume since it will cause a partial decompression of the working fluid at chamber E when the combustion chamber structure 16 (see also structures 116 and 216) via combustion chamber port 16A fluidly connects with expansion chamber C (decompression of the working fluid without doing any work reduces efficiency); and 3) Any portion of the volume within chamber E that holds working fluid that is being prevented to participate in the power (combustion) stroke is considered dead volume as not having this working fluid combusted reduces efficiency. This third type of dead volume is less applicable for a SSCVCC split-cycle engine, and is more relevant to other split-cycle engine that have connecting tubes between chamber B and chamber C, in which the connecting tube holds working fluid that is not combusted. The spool shuttle crossover valve and combustion chamber as illustrated in its various embodiments in FIGS. 1 through 33 reduces all the 3 sources of dead volume that were described above: 1) When compression piston 03 is at its TDC (FIG. 5) in maximal proximity to the cylinder head, almost all the working fluid has been transferred from compression cylinder 01 and chamber B to chamber E. Protrusion 22 further eliminates any residual dead volume. Almost all of the working fluid is transferred to chamber E to participate in the subsequent power (combustion) stroke; 2) When power piston 04 is at its TDC (FIG. 3), in closest proximity to its cylinder head, the combustion chamber protrusion 23 eliminates any residual dead volume at chamber C. Therefore, when spool shuttle 15 and combustion chamber structure 16 become fluidly connected to expansion chamber C (FIGS. 4 and 5), almost no decompression of the working fluid at chamber C occurs. Avoiding decompression of the working fluid at this stage of the cycle prevents reduced efficiency; and, 3) Throughout the power stroke (FIGS. 4 through 12), chamber E is in direct fluid connection with chamber C. Therefore, all the working fluid within chamber E is participating in the combustion (power) stroke. Using protrusion 22 and 23 is one example of how to eliminate any residual dead volume at chambers B and C, respectively. There are other methods known to the art to eliminate any residual dead volume, for example by having the two piston heads shaped with an outward curve profile.

An exemplary embodiment of a SSCVCC will now be discussed with reference to FIGS. 1-35. The SSCVCC may be used as a crossover valve and combustion chamber in the embodiments described above with respect to FIGS. 1-15. It should be understood that use of the SSCVCC is not limited to the embodiments described above with respect to FIGS. 1-15, but may be used in other applications, including other types of split-cycle engines, four-stroke engines, rotary engines and compressors, for example. The properties of the SSCVCC are particularly advantageous for situations where conventional poppet valves would require overly aggressive cam profiles to satisfy the flow requirements. The properties of a SSCVCC may be advantageous as it substitutes the need to use very fast conventional poppet valves. Since any known split-cycle engine uses at least one crossover valve, and since other split-cycle crossover valve cam profile operation requirements are about 2-6 times steeper than common IC engine valves, the use of a SSCVCC as part of any split-cycle engine is of great value.

The spool connecting rods 20 connect spool shuttle 15 to spool crankshaft 21, which converts rotational motion into spool shuttle 15 reciprocating motion. Spool shuttle 15 velocities (reciprocating velocity) are the highest at the end of the compression stroke and at the beginning of the power stroke (FIGS. 3-7). This high velocity is beneficial since once almost all the compressed working fluid has been transferred from chamber B to chamber E, chamber E needs to be rapidly decoupled from chamber B and shuttled to combust and expand while becoming coupled with chamber C. In contrast, spool shuttle 15 velocities are the lowest during the majority of the compression stroke and the power stroke (FIGS. 12-15 and 1-2 for the compression stroke, and FIGS. 8-12 for the power stroke). This low spool shuttle velocity is beneficial since it provides ample time for the compressed working fluid to be transferred from chamber B to chamber E during the compression stroke (FIGS. 12-15 and 1-2), and it also provides ample time for the combusting working fluid to expand from chamber E while coupled with chamber C (FIGS. 8-12). Thus, spool shuttle 15 reciprocating motion that may be governed by crankshaft-connecting rod motion equations (in one exemplary embodiment, crankshaft 21 and connecting rod 20) is advantageous for use in a split-cycle engine. However, other actuation mechanisms, as known to the art, could be used to convey spool shuttle 15 reciprocating motion, such as the use of camshafts and cam mechanisms, swash plate mechanisms (as utilized in hydraulic pumps and helicopter rotor angle mechanisms), hydraulic and pneumatic actuation, or electric actuation and electronic control mechanisms, for example. Such mechanisms could add variable timing to spool shuttle 15 reciprocating motion.

Referring to FIGS. 1-18, in accordance with one embodiment, an in-line configuration of a split-cycle engine is depicted in which spool shuttle 15 reciprocating motion is used to transfer the compressed working fluid from compression chamber B to expansion chamber C. Spool shuttle 15 reciprocating motion is also used to open and close intake port 11 and exhaust port 13 and by that couple and decouple incoming working fluid chamber A and compression chamber B, and couple and decouple expansion camber C and exhausted working fluid Chamber D, respectively. However, other actuation mechanisms, as known to the art, could be used to open and close an intake and exhaust ports, such as intake and exhaust poppet valves actuated by known to the art mechanisms such as camshafts, for example, as depicted in FIG. 19A-B. Other actuation mechanisms, as known to the art, could be a second spool shuttle that opens and closes intake and exhaust ports, for example. An in-line configuration of a split-cycle engine may have a spool cylinder 14 and a spool shuttle 15 that may be both placed on top and perpendicular to both compression cylinder 01 and power cylinder 02 in such a way that they overlap (cover) only part of compression cylinder 01 and power cylinder 02 heads, leaving ample room (surface) for other actuation mechanisms to open and close intake and exhaust ports, such as intake and exhaust poppet valves (for example, FIG. 19A-B), or a second spool (not shown). Similar modifications could also be made to the opposed configuration embodiments, such as those depicted in FIGS. 20-34.

In accordance with an exemplary embodiment, the crossover valve may include rotational movement within the dedicated valve chamber, or a combination of both linear and rotational movements. Using the nomenclature of FIGS. 1-34 for exemplary purposes, this rotational movement may be used to couple chamber B to chamber E during the compression stroke and couple chamber E to chamber C during the expansion (power) stroke. Spool rings and spool cylinder stationary (retracting) rings and other rings and sealing mechanisms optimized to seal rotational mechanical elements, may be all lubricated and cooled as needed to ensure their durability as known to the art. In these embodiments, the dedicated valve chamber in the engine may or may not be a cylinder, as may be used in the embodiments described above with reference to FIGS. 1-34. The rotational movement may be a continuous rotation in a single direction or the direction of rotation may alternate between clockwise to counter clockwise in order to couple chamber B to chamber E during the compression stroke and couple chamber E to chamber C during the expansion (power) stroke.

Referring to FIGS. 1-34, in accordance with an exemplary embodiment, spool cylinders 14, 114 and 124, and spool shuttles 15, 115 and 225, and any spool rings and spool cylinder stationary (retracting) rings, may be all lubricated and cooled as needed to ensure their durability as known to the art. In addition, it needs to be understood that the geometry and relative positioning of the various elements as shown in FIGS. 1-34 are exemplary and that, for example, other sealing and lubrication elements could be added to other engine components, as known in the art.

In accordance with an exemplary embodiment, a combustion chamber 16, which is located within the spool shuttle 15, has combustion chamber port 16A. Combustion chamber 16 may have an additional port (not shown in FIGS. 1-15) facing the opposite side of combustion chamber 16 (180 degrees relative to port 16A). The function of this second port (not shown) is to minimize side forces (perpendicular to spool 15 reciprocating motion) to spool shuttle 15 at the time of combustion. Combustion chamber 16 may have more than one such additional port. Selected surfaces of spool cylinder 14 may have ceramic coating to prevent overheating of spool cylinder 14 surfaces that are exposed to combustion via such ports. Such ports are not aligned with chambers B and C (combustion chamber port 16A may be aligned with chambers B and C). Other ports may be added to combustion chamber 16 in order to enable the delivery of fuel when these ports are aligned with fuel injector nozzles located on spool cylinder 14 (during spool shuttle 15 reciprocating motion).

In accordance with an exemplary embodiment spool shuttle 15 may have two or more linear bearings, (not shown) at both sides of spool shuttle 15 and in line with its reciprocating motion.

Although the embodiment above is described with respect to gears, other rotational energy connecting elements, such as belts, connecting rods and chains, for example, could be used to synchronize the motion of the compression piston and the combustion piston.

In some exemplary embodiments, engine performance data may be collected and processed to further optimize performance of the SSCVCC described herein. More specifically, additional mechanical elements or electromagnetic elements may be used to fine-tune all (or part) of the SSCVCC actuation timings and transitions between open and closed states, including variable valve timing of all engine valves. These elements could be subjected to engine control systems (not shown in the figures), as is commonly known in the art.

In some exemplary embodiments the SSCVCC may be actuated by two driveshafts or camshafts acting from both sides of the SSCVCC. At a point during the cycle where the first driveshaft pulls the SSCVCC, the second driveshaft pushes the SSCVCC. In some exemplary embodiments, having two such camshafts balance the forces acting on SSCVCC.

In the embodiments described herein in FIGS. 1-34, a spark plug may be located on the engine compression cylinder head, on the expansion cylinder head, on both the compression and expansion cylinder head (two spark plug units), on spool cylinder 14, 114 and 214, or in spool shuttle 15, 115 and 215. As an example, referring to FIGS. 1-15 but also applicable to FIGS. 16-34, if a spark plug is located on the spool cylinder 14, then combustion chamber structure 16 may have a port that would be aligned with the spark plug at the time of discharge (sparking). In that way, the spark could penetrate chamber E through this port and initiate the combustion of the compressed working fluid within combustion chamber E. If the spark plug is located on spool shuttle 15, then an apparatus to transfer the high voltage from spool cylinder 14 to the spark plug on spool shuttle 15 may be used (with the location of the high voltage terminal within spool cylinder 14 dictating spark timing, similar to high voltage supply to spark plug by a common IC engine spark distributor). Having the spark plug located in the compression cylinder head enables to further advance ignition timing, which may be beneficial during high speed engine rotation. Having the spark plug located in the expansion cylinder head may ensure continued combustion as the fuel may not burn entirely in the SSCVCC. Having the spark plug located within spool cylinder 14 may initiate combustion in the SSCVCC. Placing one or more plugs at one or more locations may provide any of the above advantages and gives the operator more options.

Figure 36:
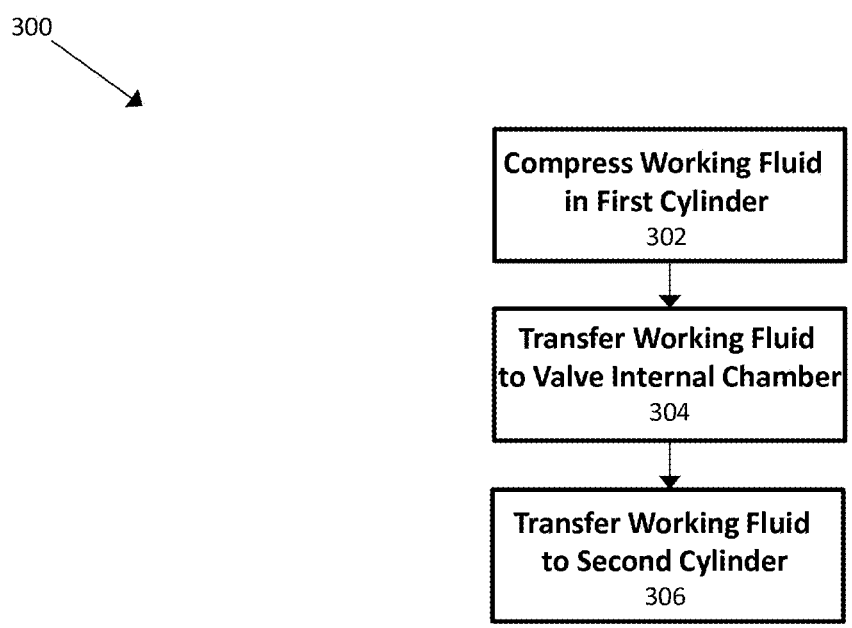
FIG. 36 illustrates a method of operating a combustion engine, in accordance with exemplary embodiments.

FIG. 36 illustrates a method 300 of operating a combustion engine, in accordance with exemplary embodiments. Method 300 includes compressing a working fluid in a first cylinder, transferring the working fluid to a valve internal chamber, and transferring the working fluid to a second cylinder. In some exemplary embodiments, the first cylinder houses a first piston that piston performs an intake stroke and a compression stroke, but does not perform an exhaust stroke. In some exemplary embodiments, the second cylinder houses that performs an expansion stroke and an exhaust stroke, but does not perform an intake stroke.

In some exemplary embodiments, transferring the working fluid to a valve internal chamber includes transferring the compressed working fluid from the first cylinder to the internal chamber. The valve is housed in a valve chamber of the engine. The valve and internal chamber move within the valve chamber of the engine and relative to the first and second cylinders.

In some exemplary embodiments, the valve and internal chamber move linearly and reciprocally within the valve chamber and relative to the first and second cylinders. In some exemplary embodiments, the valve has a port that fluidly couples the internal chamber to the first and second cylinder simultaneously.

In some exemplary embodiments, method 300 further includes, during movement of the valve, fluidly coupling the first cylinder and the internal chamber without fluidly coupling the internal chamber and the second cylinder.

In some exemplary embodiments of method 300, the valve and internal chamber include a maximum velocity and a minimum acceleration within 30 crankshaft degrees of when the internal chamber is fluidly coupled to the first and second cylinders simultaneously.

In some exemplary embodiments of method 300, the valve and internal chamber include a maximum velocity and a minimum acceleration when the internal chamber is fluidly coupled to the first and second cylinders simultaneously.

In some exemplary embodiments of method 300, the first cylinder has an intake port, and method 300 includes receiving an air/fuel mixture through the intake port. In some exemplary embodiments, method 300 further includes closing the intake port with a surface of the valve. In some exemplary embodiments, method 300 further includes closing the intake port with a poppet valve.

In some exemplary embodiments of method 300, the second cylinder has an exhaust port, and method 300 includes expelling combusted gases through the exhaust port. In some exemplary embodiments, method 300 further includes closing the exhaust port with a surface of the valve. In some exemplary embodiments, method 300 further includes closing the exhaust port with a poppet valve.

In some exemplary embodiments, method 300 further includes initiating combustion with a spark plug. In some exemplary embodiments of method 300, the spark plug is positioned on the valve and method 300 includes creating, with the spark plug, a spark within the internal chamber. In some exemplary embodiments of method 300, the spark plug is positioned in the valve chamber and the valve includes a combustion port that aligns with the spark plug to initiate combustion within the internal chamber.

In some exemplary embodiments, method 300 further includes initiating combustion by compressing the fluid.

In some exemplary embodiments of method 300, the first piston reaches its top-dead center before the second piston reaches its top-dead center. In some exemplary embodiments of method 300, the second piston reaches its top-dead center before the first piston reaches its top-dead center. In some exemplary embodiments of method 300, the first and second piston reach their respective top-dead centers concurrently.

In some exemplary embodiments of method 300, the engine includes sealing rings between the valve and the valve chamber. In some further embodiments of method 300, the sealing rings do not move relative to the valve chamber. In some further embodiments of method 300, the sealing rings move relative to the valve chamber. In some further embodiments of method 300, the sealing rings include a first sealing ring that does not move relative to the valve chamber and a second sealing ring that moves relative to the valve chamber.

In some exemplary embodiments of method 300, an internal volume of the first cylinder when the first piston is at its bottom dead center is greater than an internal volume of the second cylinder when the second piston is at its bottom dead center. In some further embodiments of method 300, an internal volume of the first cylinder when the first piston is at its bottom dead center is less than an internal volume of the second cylinder when the second piston is at its bottom dead center.

In some exemplary embodiments of method 300, the engine includes: a first crankshaft coupled to the first piston; a second crankshaft coupled to the second piston; a crankshaft connecting mechanism coupled to the first and second crankshafts and configured to translate motion between the first and second crankshafts, the crankshaft connecting mechanism including a crankshaft connecting rod having first and second ends coupled to the first and second crankshafts, respectively.

In some exemplary embodiments of method 300, the engine includes a single crankshaft coupled to the first and second pistons.

In some exemplary embodiments of method 300, the engine includes: a first crankshaft coupled to the first piston; a first gearwheel coupled to the first crankshaft; a second crankshaft coupled to the second piston; a second gearwheel coupled to the second crankshaft; and a third gearwheel coupled to the first and second gearwheels and configured to translate motion between the first and second gearwheels.

In some exemplary embodiments of method 300, the internal chamber, a compression chamber, and an expansion chamber are sized to minimize dead space.

In some exemplary embodiments of method 300, an internal volume of the first cylinder at top dead center is less than one fiftieth an internal volume of the first cylinder at bottom dead center. In some exemplary embodiments of method 300, an internal volume of the second cylinder at top dead center is less than one fiftieth an internal volume of the second cylinder at bottom dead center.

In some exemplary embodiments of method 300, the first and second cylinders are arranged in a configuration selected from an inline configuration, an opposed configuration, and V configuration.

In some exemplary embodiments of method 300, the valve is a spool valve.

In some exemplary embodiments of method 300, the first and second cylinders are thermally isolated from one another and method 300 includes maintaining the first cylinder at a cooler temperature than the second cylinder.

In some exemplary embodiments of method 300, the first cylinder includes a plurality of air cooling ribs located on an external surface of the first cylinder and a plurality of liquid cooling passages within its housing. In some exemplary embodiments of method 300, the engine further includes liquid coolant within the air cooling ribs and liquid cooling passages, and method 300 includes mechanically or electrically controlling a temperature of the liquid coolant.

In some exemplary embodiments of method 300, the second cylinder includes a plurality of exhaust heating passages for utilizing heat provided by exhaust gases expelled by the second piston to further heat the second cylinder and is thermally isolated from the surrounding environment so as to reduce leakage of thermal energy from the second cylinder.

In some exemplary embodiments of method 300, the engine includes a third cylinder housing a third piston, where the third piston performs an expansion stroke and an exhaust stroke, but does not perform an intake stroke, and the internal chamber selectively fluidly couples to the first, second, and third cylinders, and the valve and internal chamber move relative to the third cylinder.

Although some exemplary embodiments herein describe an SSCVCC with a single port, it should be noted that two or more openings may be used. In some exemplary embodiments, the additional openings may participate in the transfer of a compressed working fluid from a compression chamber to an expansion chamber. In some exemplary embodiments, the additional openings may provide an access port for a spark plug.

Although some exemplary embodiments herein describe an engine with an opposed (180 degree) or inline (90 degree) configuration, other embodiments may include engines of other offset angles, such as V configurations with a offset angle between 90 and 180 degrees.

Although some exemplary embodiments herein describe one expansion cylinder for one compression cylinder, it should be noted that other embodiments may include multiple expansion cylinders for each compression cylinder, such as 2:1 or 3:1 ratios, for example. Multiple expansion cylinders to compression cylinders are described in U.S. patent application Ser. No. 14/362,101, the content of which is incorporated by reference herein in its entirety.

As used herein, the term "dead space" (or "dead volume" or "crevice volume") can be understood to refer to an area of the compression chamber or the combustion chamber or between a compression chamber and a combustion chamber in a split-cycle engine, wherein the space holds compressed working fluid that does not participate in combustion. Such dead space can be a transfer valve or a connecting tube, or other structure that prevents fluid from being transferred and combusted. Other terms could be also used to describe such structures. Specific instances of dead space are discussed throughout this disclosure, but may not necessarily be limited to such instances.

As used herein, the term "fluid" can be understood to include both liquid and gaseous states.

As used herein, "crankshaft degrees" can be understood to refer to a portion of a crankshaft rotation, where a full rotation equals 360-degrees.

Any variations in font in the diagrams or figures is accidental is not intended to signify a distinction or emphasis.

Although the present invention has been fully described in connection with embodiments thereof with reference to the accompanying drawings, it is to be noted that various changes and modifications will become apparent to those skilled in the art. Such changes and modifications are to be understood as being included within the scope as defined by the appended claims. The various embodiments of the invention should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

What is claimed is:

1. A method of operating a combustion engine comprising
compressing a working fluid in a first cylinder housing a first piston, wherein the first piston performs an intake stroke and a compression stroke, but does not perform an exhaust stroke;
transferring the working fluid from the first cylinder to an internal chamber of a valve, wherein the valve is housed in a valve cylinder of the engine; and
transferring the working fluid from the internal chamber to a second cylinder housing a second piston, wherein the second piston performs an expansion stroke and an exhaust stroke, but does not perform an intake stroke,
fluidly coupling the internal chamber to the first and second cylinders, and
moving the valve and internal chamber linearly and reciprocally within the valve cylinder and relative to the first and second cylinders.

2. The method of claim 1, wherein fluidly coupling the internal chamber to the first and second cylinders comprises no simultaneous fluid coupling of the internal chamber, the first cylinder, and the second cylinder throughout the cycle.

3. The method of claim 1, wherein fluidly coupling the internal chamber to the first and second cylinders comprises fluidly coupling the internal chamber to the first and second cylinder simultaneously.

4. The method of claim 1, wherein the valve and internal chamber comprise a maximum velocity and a minimum acceleration within 15 crankshaft degrees of when the internal chamber is fluidly coupled to the second cylinder.

5. The method of claim 4, wherein the valve and internal chamber comprise a maximum velocity and a minimum acceleration when the internal chamber is fluidly coupled to the second cylinder.

6. The method of claim 1, wherein the first cylinder has an intake port, and wherein the method further comprises receiving an air/fuel mixture through the intake port.

7. The method of claim 6, further comprising closing the intake port with a surface of the valve.

8. The method of claim 7, further comprising closing the intake port with a poppet valve.

9. The method of claim 1, wherein the second cylinder has an exhaust port, and wherein the method further comprises expelling combusted gases through the exhaust port.

10. The method of claim 9, further comprising closing the exhaust port with a surface of the valve.

11. The method of claim 9, further comprising closing the exhaust port with a poppet valve.

12. The method of claim 1, further comprising initiating combustion with a spark plug.

13. The method of claim 12, wherein the spark plug is positioned on the valve and wherein the method further comprises creating, with the spark plug, a spark within the internal chamber.

14. The method of claim 12, wherein the spark plug is positioned in the valve cylinder and the valve comprises a combustion port that aligns with the spark plug to initiate combustion within the internal chamber.

15. The method of claim 1, further comprising initiating combustion by compressing the fluid.

16. The method of claim 1, wherein the first piston reaches its top-dead center before the second piston reaches its top-dead center.

17. The method of claim 1, wherein the second piston reaches its top-dead center before the first piston reaches its top-dead center.

18. The method of claim 1, wherein the first and second piston reach their respective top-dead centers concurrently.

19. The method of claim 1, wherein the engine further comprises sealing rings between the valve and the valve cylinder.

20. The method of claim 19, wherein the sealing rings do not move relative to the valve cylinder.

21. The method of claim 19, wherein the sealing rings move relative to the valve cylinder.

22. The engine of claim 19, wherein the sealing rings comprises a first sealing ring that does not move relative to the valve cylinder and a second sealing ring that moves relative to the valve cylinder.

23. The method of claim 1, wherein an internal volume of the first cylinder when the first piston is at its bottom dead center is greater than an internal volume of the second cylinder when the second piston is at its bottom dead center.

24. The method of claim 1, wherein an internal volume of the first cylinder when the first piston is at its bottom dead center is less than an internal volume of the second cylinder when the second piston is at its bottom dead center.

25. The method of claim 1, wherein the engine further comprises:
- a first crankshaft coupled to the first piston;
- a second crankshaft coupled to the second piston;
- a crankshaft connecting mechanism coupled to the first and second crankshafts and configured to translate motion between the first and second crankshafts, the crankshaft connecting mechanism comprising a crankshaft connecting rod having first and second ends coupled to the first and second crankshafts, respectively.

26. The method of claim 1, wherein the engine further comprises a single crankshaft coupled to the first and second pistons.

27. The method of claim 1, the engine further comprising:
- a first crankshaft coupled to the first piston;
- a first gearwheel coupled to the first crankshaft;
- a second crankshaft coupled to the second piston;
- a second gearwheel coupled to the second crankshaft; and
- a third gearwheel coupled to the first and second gearwheels and configured to translate motion between the first and second gearwheels.

28. The method of claim 1, wherein an internal volume of the first cylinder at top dead center is less than one fiftieth an internal volume of the first cylinder at bottom dead center.

29. The method of claim 1, wherein an internal volume of the second cylinder at top dead center is less than one fiftieth an internal volume of the second cylinder at bottom dead center.

30. The method of claim 1, wherein the first and second cylinders are arranged in a configuration selected from an inline configuration, an opposed configuration, and V configuration.

31. The method of claim 1, wherein the valve is a spool valve.

32. The method of claim 1, wherein the first and second cylinders are thermally isolated from one another and the method further comprises maintaining the first cylinder at a cooler temperature than the second cylinder.

33. The method of claim 1, wherein the first cylinder further comprises a plurality of air cooling ribs located on an external surface of the first cylinder and a plurality of liquid cooling passages within its housing.

34. The method of claim 33, wherein the engine further comprises liquid coolant within the air cooling ribs and liquid cooling passages, and wherein the method further comprises mechanically or electrically controlling a temperature of the liquid coolant.

35. The method of claim 1, wherein the second cylinder further comprises a plurality of exhaust heating passages for utilizing heat provided by exhaust gases expelled by the second piston to further heat the second cylinder and is thermally isolated from the surrounding environment so as to reduce leakage of thermal energy from the second cylinder.

36. The method of claim 1, wherein the engine further comprises a third cylinder housing a third piston, wherein the third piston performs an expansion stroke and an exhaust stroke, but does not perform an intake stroke, and wherein the internal chamber selectively fluidly couples to the first, second, and third cylinders, and wherein the valve and internal chamber move relative to the third cylinder.

* * * * *